United States Patent
Bonalle et al.

(10) Patent No.: US 7,768,379 B2
(45) Date of Patent: Aug. 3, 2010

(54) METHOD AND SYSTEM FOR A TRAVEL-RELATED MULTI-FUNCTION FOB

(75) Inventors: David S. Bonalle, New Rochelle, NY (US); Carl Larkin, Bognore Regis (GB); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 1335 days.

(21) Appl. No.: 10/710,567

(22) Filed: Jul. 21, 2004

(65) Prior Publication Data

US 2005/0038741 A1  Feb. 17, 2005

Related U.S. Application Data

(63) Continuation of application No. 10/340,352, filed on Jan. 10, 2003, which is a continuation of application No. 10/192,488, filed on Jul. 9, 2002, now Pat. No. 7,239,226, and a continuation of application No. 10/318,432, filed on Dec. 13, 2002, and a continuation of application No. 10/318,480, filed on Dec. 13, 2002, now Pat. No. 7,249,112.

(60) Provisional application No. 60/304,216, filed on Jul. 10, 2001, provisional application No. 60/396,577, filed on Jul. 16, 2002.

(51) Int. Cl.
 *G06F 19/00* (2006.01)
(52) U.S. Cl. ...................... 340/5.92; 340/10.1; 235/383; 235/385

(58) Field of Classification Search ................ 340/5.92, 340/573.1, 5.91, 10.1, 10.31, 10.32; 235/375, 235/376, 380, 382, 383, 385
See application file for complete search history.

(56) References Cited

U.S. PATENT DOCUMENTS

| 4,072,930 A | * | 2/1978 | Lucero et al. ................. 463/47 |
| 4,303,904 A | | 12/1981 | Chasek |
| 4,443,027 A | | 4/1984 | McNeely et al. |

(Continued)

FOREIGN PATENT DOCUMENTS

CH        689070        8/1998

(Continued)

OTHER PUBLICATIONS

"What's New: Timex Watch Features Speedpass System", http://www.speedpass.com/news/article.jsp?id=51 (1 page).

(Continued)

*Primary Examiner*—Andrew Joseph Rudy
(74) *Attorney, Agent, or Firm*—Snell & Wilmer L.L.P.

(57) ABSTRACT

The present invention provides a system and methods for a radio frequency identification (RFID) system which securely and conveniently integrates important travel-related applications. In accordance with one aspect of the present invention, an RFID system comprises a transponder identification application and various additional applications useful in particular travel contexts; for example, airline, hotel, rental car, and payment-related applications. In accordance with another aspect of the present invention, an RFID system further comprises space and security features within specific applications which provide partnering organizations the ability to construct custom and secure file structures.

9 Claims, 22 Drawing Sheets

U.S. PATENT DOCUMENTS

| | | | |
|---|---|---|---|
| 4,450,535 A | 5/1984 | de Pommery et al. | |
| 4,475,308 A | 10/1984 | Heise et al. | |
| 4,583,766 A | 4/1986 | Wessel | |
| 4,639,765 A | 1/1987 | dHont | |
| 4,672,021 A | 6/1987 | Blumel et al. | |
| 4,700,055 A | 10/1987 | Kashkashian, Jr. | |
| 4,736,094 A | 4/1988 | Yoshida | |
| 4,739,328 A | 4/1988 | Koelle et al. | |
| 4,837,422 A | 6/1989 | Dethloff et al. | |
| 4,839,504 A | 6/1989 | Nakano | |
| 4,868,849 A | 9/1989 | Tamaoki | |
| 4,961,142 A | 10/1990 | Elliott et al. | |
| 5,006,983 A * | 4/1991 | Wayne et al. | 705/8 |
| 5,016,274 A | 5/1991 | Micali et al. | |
| 5,023,782 A | 6/1991 | Lutz et al. | |
| 5,023,908 A | 6/1991 | Weiss | |
| 5,025,372 A | 6/1991 | Burton et al. | |
| 5,053,774 A | 10/1991 | Schuermann et al. | |
| 5,099,226 A | 3/1992 | Andrews | |
| 5,101,200 A | 3/1992 | Swett | |
| 5,197,140 A | 3/1993 | Balmer | |
| 5,202,826 A | 4/1993 | McCarthy | |
| 5,212,777 A | 5/1993 | Gove et al. | |
| 5,221,838 A | 6/1993 | Gutman et al. | |
| 5,222,282 A | 6/1993 | Sukonnik et al. | |
| 5,226,989 A | 7/1993 | Sukonnik | |
| 5,231,273 A * | 7/1993 | Caswell et al. | 235/385 |
| 5,239,654 A | 8/1993 | IngSimmons et al. | |
| 5,247,304 A | 9/1993 | dHont | |
| 5,274,392 A | 12/1993 | dHont et al. | |
| 5,276,311 A | 1/1994 | Hennige | |
| 5,285,100 A | 2/1994 | Byatt | |
| 5,305,002 A | 4/1994 | Holodak et al. | |
| 5,326,964 A | 7/1994 | Risser | |
| 5,329,617 A | 7/1994 | Asal | |
| 5,331,138 A | 7/1994 | Saroya | |
| 5,339,447 A | 8/1994 | Balmer | |
| 5,349,357 A | 9/1994 | Schurmann et al. | |
| 5,350,906 A | 9/1994 | Brody et al. | |
| 5,351,052 A | 9/1994 | dHont et al. | |
| 5,365,551 A | 11/1994 | Snodgrass et al. | |
| 5,371,896 A | 12/1994 | Gove et al. | |
| 5,373,303 A | 12/1994 | dHont | |
| 5,397,881 A | 3/1995 | Mannik | |
| 5,407,893 A | 4/1995 | Koshizuka et al. | |
| 5,408,243 A | 4/1995 | dHont | |
| 5,410,649 A | 4/1995 | Gove | |
| 5,428,363 A | 6/1995 | dHont | |
| 5,453,601 A | 9/1995 | Rosen | |
| 5,453,747 A | 9/1995 | dHont et al. | |
| 5,461,217 A | 10/1995 | Claus | |
| 5,471,592 A | 11/1995 | Gove et al. | |
| 5,485,510 A | 1/1996 | Colbert | |
| 5,488,376 A | 1/1996 | Hurta et al. | |
| 5,489,411 A | 2/1996 | Jha et al. | |
| 5,489,908 A | 2/1996 | Orthmann et al. | |
| 5,490,079 A | 2/1996 | Sharpe et al. | |
| 5,491,483 A | 2/1996 | dHont | |
| 5,491,484 A | 2/1996 | Schuermann | |
| 5,491,715 A | 2/1996 | Flaxl | |
| 5,493,312 A | 2/1996 | Knebelkamp | |
| 5,497,121 A | 3/1996 | dHont | |
| 5,500,513 A | 3/1996 | Langhans et al. | |
| 5,500,651 A | 3/1996 | Schuermann | |
| 5,504,808 A | 4/1996 | Hamrick, Jr. | |
| 5,513,525 A | 5/1996 | Schurmann | |
| 5,519,381 A | 5/1996 | Marsh et al. | |
| 5,522,083 A | 5/1996 | Gove et al. | |
| 5,525,992 A | 6/1996 | Froschermeier | |
| 5,525,994 A | 6/1996 | Hurta et al. | |
| 5,530,232 A | 6/1996 | Taylor | |
| 5,537,314 A | 7/1996 | Kanter | |
| 5,541,604 A | 7/1996 | Meier | |
| 5,543,798 A | 8/1996 | Schuermann | |
| 5,544,246 A | 8/1996 | Mandelbaum et al. | |
| 5,548,291 A | 8/1996 | Meier et al. | |
| 5,550,536 A | 8/1996 | Flaxl | |
| 5,550,548 A | 8/1996 | Schuermann | |
| 5,552,789 A | 9/1996 | Schuermann | |
| 5,557,279 A | 9/1996 | dHont | |
| 5,557,516 A | 9/1996 | Hogan | |
| 5,561,430 A | 10/1996 | Knebelkamp | |
| 5,563,582 A | 10/1996 | dHont | |
| 5,569,187 A | 10/1996 | Kaiser | |
| 5,572,226 A | 11/1996 | Tuttle | |
| 5,577,109 A | 11/1996 | Stimson et al. | |
| 5,577,120 A | 11/1996 | Penzias | |
| 5,578,808 A | 11/1996 | Taylor | |
| 5,581,630 A | 12/1996 | Bonneau, Jr. | |
| 5,585,787 A | 12/1996 | Wallerstein | |
| 5,590,038 A | 12/1996 | Pitroda | |
| 5,592,150 A | 1/1997 | dHont | |
| 5,592,405 A | 1/1997 | Gove et al. | |
| 5,594,227 A | 1/1997 | Deo | |
| 5,594,233 A | 1/1997 | Kenneth et al. | |
| 5,594,448 A | 1/1997 | dHont | |
| 5,597,534 A | 1/1997 | Kaiser | |
| 5,600,175 A | 2/1997 | Orthmann | |
| 5,602,538 A | 2/1997 | Orthmann et al. | |
| 5,602,919 A | 2/1997 | Hurta et al. | |
| 5,604,342 A | 2/1997 | Fujioka | |
| 5,606,520 A | 2/1997 | Gove et al. | |
| 5,606,594 A | 2/1997 | Register et al. | |
| 5,607,522 A | 3/1997 | McDonnell | |
| 5,608,406 A | 3/1997 | Eberth et al. | |
| 5,608,778 A | 3/1997 | Partridge, III | |
| 5,613,146 A | 3/1997 | Gove et al. | |
| 5,614,703 A | 3/1997 | Martin et al. | |
| 5,619,207 A | 4/1997 | dHont | |
| 5,621,396 A | 4/1997 | Flaxl | |
| 5,621,411 A | 4/1997 | Hagl et al. | |
| 5,621,412 A | 4/1997 | Sharpe et al. | |
| 5,625,366 A | 4/1997 | dHont | |
| 5,625,370 A | 4/1997 | dHont | |
| 5,625,695 A | 4/1997 | MRaihi et al. | |
| 5,629,981 A | 5/1997 | Nerlikar | |
| 5,638,080 A | 6/1997 | Orthmann et al. | |
| 5,640,002 A | 6/1997 | Ruppert et al. | |
| 5,641,050 A | 6/1997 | Smith et al. | |
| 5,646,607 A | 7/1997 | Schurmann et al. | |
| 5,649,118 A | 7/1997 | Carlisle | |
| 5,657,388 A | 8/1997 | Weiss | |
| 5,660,319 A | 8/1997 | Falcone et al. | |
| 5,673,106 A | 9/1997 | Thompson | |
| 5,675,342 A | 10/1997 | Sharpe | |
| 5,686,920 A | 11/1997 | Hurta et al. | |
| 5,689,100 A | 11/1997 | Carrithers | |
| 5,691,731 A | 11/1997 | vanErven | |
| 5,692,132 A | 11/1997 | Hogan | |
| 5,696,913 A | 12/1997 | Gove et al. | |
| 5,698,837 A | 12/1997 | Furuta | |
| 5,699,528 A | 12/1997 | Hogan | |
| 5,701,127 A | 12/1997 | Sharpe | |
| 5,704,046 A | 12/1997 | Hogan | |
| 5,705,798 A | 1/1998 | Tarbox | |
| 5,715,399 A | 2/1998 | Bezos | |
| 5,721,781 A | 2/1998 | Deo et al. | |
| 5,724,424 A | 3/1998 | Gifford | |
| 5,729,053 A | 3/1998 | Orthmann | |
| 5,729,236 A | 3/1998 | Flaxl | |
| 5,731,957 A | 3/1998 | Brennan | |
| 5,732,579 A | 3/1998 | dHont et al. | |
| 5,734,838 A | 3/1998 | Robinson et al. | |
| 5,742,756 A | 4/1998 | Dillaway et al. | |

| | | |
|---|---|---|
| 5,742,845 A | 4/1998 | Wagner |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,385 A | 6/1998 | Simon |
| 5,768,609 A | 6/1998 | Gove et al. |
| 5,770,843 A | 6/1998 | Rose |
| 5,774,882 A | 6/1998 | Keen et al. |
| 5,777,903 A | 7/1998 | Piosenka et al. |
| 5,778,067 A | 7/1998 | Jones et al. |
| 5,778,069 A | 7/1998 | Thomlinson |
| 5,785,680 A | 7/1998 | Niezink et al. |
| 5,792,337 A | 8/1998 | Padovani et al. |
| 5,793,324 A | 8/1998 | Aslanidis et al. |
| 5,794,095 A | 8/1998 | Thompson |
| 5,797,060 A | 8/1998 | Thompson |
| 5,797,085 A | 8/1998 | Buek et al. |
| 5,797,133 A | 8/1998 | Jones et al. |
| 5,798,709 A | 8/1998 | Flaxl |
| 5,809,142 A | 9/1998 | Hurta et al. |
| 5,809,288 A | 9/1998 | Balmer |
| 5,809,633 A | 9/1998 | Mundigl et al. |
| 5,825,007 A | 10/1998 | Jesadanont |
| 5,825,302 A | 10/1998 | Stafford |
| 5,826,077 A | 10/1998 | Blakeley et al. |
| 5,826,241 A | 10/1998 | Stein |
| 5,826,242 A | 10/1998 | Montulli |
| 5,826,243 A | 10/1998 | Musmanno et al. |
| 5,828,044 A | 10/1998 | Jun et al. |
| 5,834,756 A | 11/1998 | Gutman et al. |
| 5,835,894 A | 11/1998 | Adcock et al. |
| 5,841,364 A | 11/1998 | Hagl et al. |
| 5,842,088 A | 11/1998 | Thompson |
| 5,844,218 A | 12/1998 | Kawan et al. |
| 5,844,230 A | 12/1998 | Lalonde |
| 5,845,267 A | 12/1998 | Ronen |
| 5,851,149 A | 12/1998 | Xidos et al. |
| 5,852,812 A | 12/1998 | Reeder |
| 5,854,891 A | 12/1998 | Postlewaite et al. |
| 5,858,006 A | 1/1999 | Van der AA et al. |
| 5,859,419 A | 1/1999 | Wynn |
| 5,859,779 A | 1/1999 | Giordano et al. |
| 5,862,325 A | 1/1999 | Reed et al. |
| 5,864,306 A | 1/1999 | Dwyer et al. |
| 5,864,323 A | 1/1999 | Berthon |
| 5,864,830 A | 1/1999 | Armetta et al. |
| 5,867,100 A | 2/1999 | dHont |
| 5,870,031 A | 2/1999 | Kaiser et al. |
| 5,870,915 A | 2/1999 | dHont |
| 5,878,138 A | 3/1999 | Yacobi |
| 5,878,141 A | 3/1999 | Daly et al. |
| 5,878,215 A | 3/1999 | Kling et al. |
| 5,878,337 A | 3/1999 | Joao et al. |
| 5,878,403 A | 3/1999 | DeFrancesco et al. |
| 5,880,675 A | 3/1999 | Trautner |
| 5,881,272 A | 3/1999 | Balmer |
| 5,883,810 A | 3/1999 | Franklin et al. |
| 5,884,280 A | 3/1999 | Yoshioka et al. |
| 5,887,266 A | 3/1999 | Heinonen et al. |
| 5,890,137 A | 3/1999 | Koreeda |
| 5,897,622 A | 4/1999 | Blinn et al. |
| 5,898,783 A | 4/1999 | Rohrbach |
| 5,898,838 A | 4/1999 | Wagner |
| 5,903,830 A | 5/1999 | Joao et al. |
| 5,903,875 A | 5/1999 | Kohara |
| 5,903,880 A | 5/1999 | Biffar |
| 5,905,798 A | 5/1999 | Nerlikar et al. |
| 5,905,908 A | 5/1999 | Wagner |
| 5,909,492 A | 6/1999 | Payne et al. |
| 5,912,678 A | 6/1999 | Saxena et al. |
| 5,913,203 A | 6/1999 | Wong et al. |
| 5,914,472 A | 6/1999 | Foladare et al. |
| 5,915,023 A | 6/1999 | Bernstein |
| 5,917,168 A | 6/1999 | Nakamura et al. |
| 5,918,216 A | 6/1999 | Miksovsky et al. |
| 5,920,628 A | 7/1999 | Indeck et al. |
| 5,923,734 A | 7/1999 | Taskett |
| 5,929,801 A | 7/1999 | Aslanidis et al. |
| 5,930,767 A | 7/1999 | Reber et al. |
| 5,930,777 A | 7/1999 | Barber |
| 5,931,917 A | 8/1999 | Nguyen et al. |
| 5,933,624 A | 8/1999 | Balmer |
| 5,943,624 A | 8/1999 | Fox et al. |
| 5,948,116 A | 9/1999 | Aslanidis et al. |
| 5,949,044 A | 9/1999 | Walker et al. |
| 5,949,876 A | 9/1999 | Ginter et al. |
| 5,953,512 A | 9/1999 | Cai et al. |
| 5,953,710 A | 9/1999 | Fleming |
| 5,955,717 A | 9/1999 | Vanstone |
| 5,955,969 A | 9/1999 | dHont |
| 5,956,024 A | 9/1999 | Strickland et al. |
| 5,956,699 A | 9/1999 | Wong et al. |
| 5,958,004 A | 9/1999 | Helland et al. |
| 5,960,411 A | 9/1999 | Hartman et al. |
| 5,963,915 A | 10/1999 | Kirsch |
| 5,963,924 A | 10/1999 | Williams et al. |
| 5,966,697 A | 10/1999 | Fergerson et al. |
| 5,970,148 A | 10/1999 | Meier |
| 5,970,471 A | 10/1999 | Hill |
| 5,970,472 A | 10/1999 | Allsop et al. |
| 5,970,473 A | 10/1999 | Gerszberg et al. |
| 5,970,475 A | 10/1999 | Barnes et al. |
| RE36,365 E | 11/1999 | Levine et al. |
| 5,978,840 A | 11/1999 | Nguyen et al. |
| 5,979,757 A | 11/1999 | Tracy et al. |
| 5,982,293 A | 11/1999 | Everett et al. |
| 5,983,207 A | 11/1999 | Turk et al. |
| 5,983,208 A | 11/1999 | Haller et al. |
| 5,987,140 A | 11/1999 | Rowney et al. |
| 5,987,155 A | 11/1999 | Dunn et al. |
| 5,987,498 A | 11/1999 | Athing et al. |
| 5,989,950 A | 11/1999 | Wu |
| 5,991,413 A | 11/1999 | Arditti et al. |
| 5,991,608 A | 11/1999 | Leyten |
| 5,991,748 A | 11/1999 | Taskett |
| 5,991,750 A | 11/1999 | Watson |
| 5,996,076 A | 11/1999 | Rowney et al. |
| 5,999,914 A | 12/1999 | Blinn et al. |
| 6,000,832 A | 12/1999 | Franklin et al. |
| 6,002,438 A | 12/1999 | Hocevar et al. |
| 6,002,767 A | 12/1999 | Kramer |
| 6,003,014 A | 12/1999 | Lee et al. |
| 6,005,942 A | 12/1999 | Chan et al. |
| 6,006,216 A | 12/1999 | Griffin et al. |
| 6,009,412 A | 12/1999 | Storey |
| 6,011,487 A | 1/2000 | Plocher |
| 6,012,039 A | 1/2000 | Hoffman et al. |
| 6,012,049 A | 1/2000 | Kawan |
| 6,012,143 A | 1/2000 | Tanaka |
| 6,012,636 A | 1/2000 | Smith |
| 6,014,634 A | 1/2000 | Scroggie et al. |
| 6,014,635 A | 1/2000 | Harris et al. |
| 6,014,636 A | 1/2000 | Reeder |
| 6,014,645 A | 1/2000 | Cunningham |
| 6,014,646 A | 1/2000 | Vallee et al. |
| 6,014,648 A | 1/2000 | Brennan |
| 6,014,650 A | 1/2000 | Zampese |
| 6,014,748 A | 1/2000 | Tushi et al. |
| 6,016,482 A | 1/2000 | Molinari et al. |
| 6,016,484 A | 1/2000 | Williams et al. |
| 6,018,717 A | 1/2000 | Lee et al. |
| 6,018,718 A | 1/2000 | Walker et al. |
| 6,021,943 A | 2/2000 | Chastain |
| 6,023,510 A | 2/2000 | Epstein |

| Patent | Kind | Date | Inventor |
|---|---|---|---|
| 6,024,286 | A | 2/2000 | Bradley et al. |
| 6,029,147 | A | 2/2000 | Horadan et al. |
| 6,029,149 | A | 2/2000 | Dykstra et al. |
| 6,029,150 | A | 2/2000 | Kravitz |
| 6,029,890 | A | 2/2000 | Austin |
| 6,029,892 | A | 2/2000 | Miyake |
| 6,032,136 | A | 2/2000 | Brake et al. |
| 6,038,292 | A | 3/2000 | Thomas |
| 6,038,551 | A | 3/2000 | Barlow et al. |
| 6,038,584 | A | 3/2000 | Balmer |
| 6,041,308 | A | 3/2000 | Walker et al. |
| 6,044,360 | A | 3/2000 | Picciallo |
| 6,047,888 | A | 4/2000 | Dethloff |
| 6,052,675 | A | 4/2000 | Checchio |
| 6,058,418 | A | 5/2000 | Kobata |
| 6,061,344 | A | 5/2000 | Wood, Jr. |
| 6,061,789 | A | 5/2000 | Hauser et al. |
| 6,064,320 | A | 5/2000 | dHont et al. |
| 6,064,981 | A | 5/2000 | Barni et al. |
| 6,070,003 | A | 5/2000 | Gove et al. |
| 6,070,150 | A | 5/2000 | Remington et al. |
| 6,070,154 | A | 5/2000 | Tavor et al. |
| 6,070,156 | A * | 5/2000 | Hartsell, Jr. .................. 705/413 |
| 6,072,870 | A | 6/2000 | Nguyen et al. |
| 6,073,840 | A | 6/2000 | Marion |
| 6,076,078 | A | 6/2000 | Camp et al. |
| 6,078,888 | A | 6/2000 | Johnson, Jr. |
| 6,078,906 | A | 6/2000 | Huberman |
| 6,078,908 | A | 6/2000 | Schmitz |
| 6,081,790 | A | 6/2000 | Rosen |
| RE36,788 | E | 7/2000 | Mansvelt et al. |
| 6,088,683 | A | 7/2000 | Jalili |
| 6,088,686 | A | 7/2000 | Walker et al. |
| 6,088,717 | A | 7/2000 | Reed et al. |
| 6,088,797 | A | 7/2000 | Rosen |
| 6,089,284 | A * | 7/2000 | Kaehler et al. .................. 141/94 |
| 6,092,057 | A | 7/2000 | Zimmerman et al. |
| 6,092,198 | A | 7/2000 | Lanzy et al. |
| 6,098,053 | A | 8/2000 | Slater |
| 6,098,879 | A * | 8/2000 | Terranova .................... 235/384 |
| 6,101,174 | A | 8/2000 | Langston |
| 6,102,162 | A | 8/2000 | Teicher |
| 6,102,672 | A | 8/2000 | Woollenweber |
| 6,105,008 | A | 8/2000 | Davis et al. |
| 6,105,013 | A | 8/2000 | Curry et al. |
| 6,105,865 | A | 8/2000 | Hardesty |
| 6,108,641 | A | 8/2000 | Kenna et al. |
| 6,109,525 | A | 8/2000 | Blomqvist et al. |
| 6,112,152 | A | 8/2000 | Tuttle |
| 6,112,191 | A | 8/2000 | Burke |
| 6,115,360 | A | 9/2000 | Quay et al. |
| 6,115,458 | A | 9/2000 | Taskett |
| 6,116,423 | A | 9/2000 | Troxtell, Jr. et al. |
| 6,116,505 | A | 9/2000 | Withrow |
| 6,118,189 | A | 9/2000 | Flaxl |
| 6,121,544 | A | 9/2000 | Petsinger |
| 6,122,625 | A | 9/2000 | Rosen |
| 6,123,223 | A | 9/2000 | Watkins |
| 6,125,352 | A | 9/2000 | Franklin et al. |
| 6,129,274 | A | 10/2000 | Suzuki |
| 6,133,834 | A | 10/2000 | Eberth et al. |
| 6,141,651 | A | 10/2000 | Riley et al. |
| 6,141,752 | A | 10/2000 | Dancs et al. |
| 6,163,771 | A | 12/2000 | Walker et al. |
| 6,167,236 | A | 12/2000 | Kaiser et al. |
| 6,173,269 | B1 | 1/2001 | Sokol et al. |
| 6,173,272 | B1 | 1/2001 | Thomas et al. |
| 6,177,860 | B1 | 1/2001 | Cromer et al. |
| 6,179,205 | B1 | 1/2001 | Sloan |
| 6,179,206 | B1 | 1/2001 | Matsumori |
| 6,188,994 | B1 | 2/2001 | Egendorf |
| 6,189,787 | B1 | 2/2001 | Dorf |
| 6,192,255 | B1 | 2/2001 | Lewis et al. |
| 6,198,728 | B1 | 3/2001 | Hulyalkar et al. |
| 6,198,875 | B1 | 3/2001 | Edenson et al. |
| 6,202,927 | B1 | 3/2001 | Bashan et al. |
| 6,205,151 | B1 | 3/2001 | Quay et al. |
| 6,206,293 | B1 | 3/2001 | Gutman et al. |
| 6,213,390 | B1 | 4/2001 | Oneda |
| 6,215,437 | B1 | 4/2001 | Schurmann et al. |
| 6,216,219 | B1 | 4/2001 | Cai et al. |
| 6,219,439 | B1 | 4/2001 | Burger |
| 6,220,510 | B1 | 4/2001 | Everett et al. |
| 6,222,914 | B1 | 4/2001 | McMullin |
| D442,627 | S | 5/2001 | Webb et al. |
| D442,629 | S | 5/2001 | Webb et al. |
| 6,223,984 | B1 | 5/2001 | Renner et al. |
| 6,226,382 | B1 | 5/2001 | MRaihi et al. |
| 6,227,447 | B1 | 5/2001 | Campisano |
| 6,230,270 | B1 | 5/2001 | Laczko, Sr. |
| 6,232,917 | B1 | 5/2001 | Baumer et al. |
| 6,233,683 | B1 | 5/2001 | Chan et al. |
| 6,237,848 | B1 | 5/2001 | Everett |
| 6,239,675 | B1 | 5/2001 | Flaxl |
| 6,240,187 | B1 | 5/2001 | Lewis |
| 6,248,199 | B1 | 6/2001 | Smulson |
| 6,257,486 | B1 | 7/2001 | Teicher et al. |
| 6,259,769 | B1 | 7/2001 | Page |
| 6,260,026 | B1 | 7/2001 | Tomida et al. |
| 6,260,088 | B1 | 7/2001 | Gove et al. |
| 6,263,316 | B1 | 7/2001 | Khan et al. |
| 6,263,319 | B1 * | 7/2001 | Leatherman .................. 705/30 |
| 6,264,106 | B1 | 7/2001 | Bridgelall |
| 6,266,754 | B1 | 7/2001 | Laczko, Sr. et al. |
| 6,267,292 | B1 | 7/2001 | Walker et al. |
| 6,269,348 | B1 | 7/2001 | Pare, Jr. et al. |
| 6,273,335 | B1 | 8/2001 | Sloan |
| 6,282,522 | B1 | 8/2001 | Davis et al. |
| D447,515 | S | 9/2001 | Faenza, Jr. et al. |
| 6,286,763 | B1 | 9/2001 | Reynolds et al. |
| 6,289,324 | B1 | 9/2001 | Kawan |
| 6,293,462 | B1 | 9/2001 | Gangi |
| 6,315,193 | B1 | 11/2001 | Hogan |
| 6,315,195 | B1 | 11/2001 | Ramachandran |
| 6,317,721 | B1 | 11/2001 | Hurta et al. |
| 6,318,636 | B1 | 11/2001 | Reynolds et al. |
| 6,323,566 | B1 | 11/2001 | Meier |
| 6,325,285 | B1 | 12/2001 | Baratelli |
| 6,325,293 | B1 | 12/2001 | Moreno |
| 6,326,934 | B1 | 12/2001 | Kinzie |
| 6,327,573 | B1 | 12/2001 | Walker et al. |
| 6,330,544 | B1 | 12/2001 | Walker et al. |
| 6,332,193 | B1 * | 12/2001 | Glass et al. .................. 713/170 |
| 6,336,095 | B1 | 1/2002 | Rosen |
| 6,342,844 | B1 | 1/2002 | Rozin |
| 6,353,811 | B1 | 3/2002 | Weissman |
| 6,364,208 | B1 | 4/2002 | Stanford et al. |
| 6,367,011 | B1 | 4/2002 | Lee et al. |
| 6,374,245 | B1 | 4/2002 | Park |
| 6,377,034 | B1 | 4/2002 | Ivanov |
| 6,378,073 | B1 | 4/2002 | Davis et al. |
| 6,388,533 | B2 | 5/2002 | Swoboda |
| 6,390,375 | B2 | 5/2002 | Kayanakis |
| 6,400,272 | B1 | 6/2002 | Holtzman et al. |
| 6,402,026 | B1 | 6/2002 | Schwier |
| 6,402,028 | B1 | 6/2002 | Graham, Jr. et al. |
| 6,411,611 | B1 | 6/2002 | Van der Tuijn |
| 6,415,978 | B1 | 7/2002 | McAllister |
| 6,422,464 | B1 | 7/2002 | Terranova |
| 6,424,029 | B1 | 7/2002 | Giesler |
| RE37,822 | E | 8/2002 | Anthonyson |
| 6,427,910 | B1 | 8/2002 | Barnes et al. |
| 6,438,235 | B2 | 8/2002 | Sims, III |
| 6,439,455 | B1 | 8/2002 | Everett et al. |
| 6,442,532 | B1 | 8/2002 | Kawan |
| 6,445,794 | B1 | 9/2002 | Shefi |

| Patent | Date | Name | | Patent | Date | Name |
|---|---|---|---|---|---|---|
| 6,457,996 B1 | 10/2002 | Shih | | 7,003,501 B2 | 2/2006 | Ostroff |
| 6,466,804 B1 | 10/2002 | Pecen et al. | | 7,069,444 B2 | 6/2006 | Lowensohn et al. |
| 6,473,500 B1 | 10/2002 | Risafi et al. | | 7,096,204 B1 | 8/2006 | Chen et al. |
| 6,480,100 B1 | 11/2002 | Frieden et al. | | 7,100,821 B2 | 9/2006 | Rasti |
| 6,480,101 B1 | 11/2002 | Kelly et al. | | 7,103,575 B1 | 9/2006 | Linehan |
| 6,481,621 B1 | 11/2002 | Herrendoerfer et al. | | 7,110,880 B2 * | 9/2006 | Breed et al. ............ 701/207 |
| 6,481,632 B2 | 11/2002 | Wentker et al. | | 7,136,835 B1 | 11/2006 | Flitcroft et al. |
| 6,483,427 B1 | 11/2002 | Werb | | 7,213,748 B2 | 5/2007 | Tsuei et al. |
| 6,483,477 B1 | 11/2002 | Plonka | | 2001/0013542 A1 | 8/2001 | Horowitz et al. |
| 6,483,929 B1 | 11/2002 | Murakami et al. | | 2001/0024157 A1 | 9/2001 | Hansmann et al. |
| 6,484,937 B1 | 11/2002 | Devaux et al. | | 2001/0034565 A1 | 10/2001 | Leatherman |
| 6,490,443 B1 | 12/2002 | Freeny, Jr. | | 2001/0034720 A1 | 10/2001 | Armes |
| 6,491,229 B1 | 12/2002 | Berney | | 2001/0039617 A1 | 11/2001 | Buhrlen et al. |
| 6,494,380 B2 | 12/2002 | Jarosz | | 2001/0049628 A1 | 12/2001 | Icho |
| 6,507,762 B1 | 1/2003 | Amro et al. | | 2002/0011519 A1 | 1/2002 | Shults |
| 6,509,829 B1 * | 1/2003 | Tuttle ............ 340/10.1 | | 2002/0026419 A1 | 2/2002 | Maritzen et al. |
| 6,510,983 B2 | 1/2003 | Horowitz et al. | | 2002/0028704 A1 | 3/2002 | Bloomfield et al. |
| 6,510,998 B1 | 1/2003 | Stanford et al. | | 2002/0035548 A1 | 3/2002 | Hogan et al. |
| 6,513,015 B2 | 1/2003 | Ogasawara | | 2002/0046341 A1 | 4/2002 | Kazaks et al. |
| 6,519,565 B1 | 2/2003 | Clements et al. | | 2002/0052839 A1 | 5/2002 | Takatori |
| 6,520,542 B2 | 2/2003 | Thompson et al. | | 2002/0062284 A1 | 5/2002 | Kawan |
| 6,529,880 B1 | 3/2003 | McKeen et al. | | 2002/0074398 A1 | 6/2002 | Lancos et al. |
| 6,535,726 B1 | 3/2003 | Johnson | | 2002/0077837 A1 | 6/2002 | Krueger et al. |
| 6,546,373 B1 | 4/2003 | Cerra | | 2002/0077895 A1 | 6/2002 | Howell |
| 6,547,133 B1 | 4/2003 | DeVries, Jr. et al. | | 2002/0077992 A1 | 6/2002 | Tobin |
| 6,549,912 B1 | 4/2003 | Chen | | 2002/0079367 A1 | 6/2002 | Montani |
| 6,560,581 B1 | 5/2003 | Fox et al. | | 2002/0092914 A1 | 7/2002 | Pentz et al. |
| 6,577,229 B1 | 6/2003 | Bonneau et al. | | 2002/0095298 A1 | 7/2002 | Ewing |
| 6,578,768 B1 | 6/2003 | Binder et al. | | 2002/0095343 A1 | 7/2002 | Barton et al. |
| 6,581,839 B1 | 6/2003 | Lasch et al. | | 2002/0095389 A1 | 7/2002 | Gaines |
| 6,587,835 B1 | 7/2003 | Treyz et al. | | 2002/0095587 A1 | 7/2002 | Doyle et al. |
| 6,588,660 B1 | 7/2003 | Buescher et al. | | 2002/0097144 A1 | 7/2002 | Collins et al. |
| 6,589,119 B1 | 7/2003 | Orus et al. | | 2002/0107007 A1 | 8/2002 | Gerson |
| 6,598,024 B1 | 7/2003 | Walker et al. | | 2002/0107742 A1 | 8/2002 | Magill |
| 6,608,995 B1 | 8/2003 | Kawasaki et al. | | 2002/0109580 A1 | 8/2002 | Shreve et al. |
| 6,609,655 B1 | 8/2003 | Harrell | | 2002/0111210 A1 | 8/2002 | Luciano, Jr. et al. |
| 6,623,039 B2 | 9/2003 | Thompson et al. | | 2002/0111917 A1 | 8/2002 | Hoffman et al. |
| 6,626,356 B2 | 9/2003 | Davenport et al. | | 2002/0113082 A1 | 8/2002 | Leatherman et al. |
| 6,628,961 B1 | 9/2003 | Ho et al. | | 2002/0116274 A1 | 8/2002 | Hind et al. |
| 6,629,591 B1 * | 10/2003 | Griswold et al. ............ 194/205 | | 2002/0120584 A1 | 8/2002 | Hogan et al. |
| 6,636,833 B1 | 10/2003 | Flitcroft et al. | | 2002/0126010 A1 | 9/2002 | Trimble et al. |
| 6,650,887 B2 | 11/2003 | McGregor et al. | | 2002/0131567 A1 | 9/2002 | Maginas |
| 6,662,166 B2 | 12/2003 | Pare, Jr. et al. | | 2002/0138438 A1 | 9/2002 | Bardwell |
| 6,665,405 B1 | 12/2003 | Lenstra | | 2002/0140542 A1 | 10/2002 | Prokoski et al. |
| 6,669,086 B2 | 12/2003 | Abdi et al. | | 2002/0145043 A1 | 10/2002 | Challa et al. |
| 6,671,358 B1 | 12/2003 | Seidman et al. | | 2002/0147913 A1 | 10/2002 | Yip |
| 6,674,786 B1 | 1/2004 | Nakamura et al. | | 2002/0148892 A1 | 10/2002 | Bardwell |
| 6,679,427 B1 | 1/2004 | Kuroiwa | | 2002/0152123 A1 | 10/2002 | Giordano et al. |
| 6,681,328 B1 | 1/2004 | Harris et al. | | 2002/0154795 A1 | 10/2002 | Lee et al. |
| 6,684,269 B2 | 1/2004 | Wagner | | 2002/0166891 A1 | 11/2002 | Stoutenburg et al. |
| 6,687,714 B1 | 2/2004 | Kogen et al. | | 2002/0174067 A1 | 11/2002 | Hoffman et al. |
| 6,690,930 B1 | 2/2004 | Dupre | | 2002/0176522 A1 | 11/2002 | Fan |
| 6,693,513 B2 | 2/2004 | Tuttle | | 2002/0178063 A1 | 11/2002 | Gravelle et al. |
| 6,703,918 B1 * | 3/2004 | Kita ............ 340/5.52 | | 2002/0178369 A1 | 11/2002 | Black |
| 6,705,530 B2 | 3/2004 | Kiekhaefer | | 2002/0185543 A1 | 12/2002 | Pentz et al. |
| 6,711,262 B1 | 3/2004 | Watanen | | 2002/0188501 A1 | 12/2002 | Lefkowith |
| 6,732,936 B1 | 5/2004 | Kiekhaefer | | 2002/0190125 A1 | 12/2002 | Stockhammer |
| 6,742,120 B1 | 5/2004 | Markakis et al. | | 2002/0194303 A1 | 12/2002 | Suila et al. |
| 6,747,546 B1 | 6/2004 | Hikita et al. | | 2002/0194503 A1 | 12/2002 | Faith et al. |
| 6,760,581 B2 | 7/2004 | Dutta | | 2002/0196963 A1 | 12/2002 | Bardwell |
| 6,769,718 B1 | 8/2004 | Warther et al. | | 2003/0009382 A1 | 1/2003 | DArbelott et al. |
| 6,771,981 B1 | 8/2004 | Zalewski et al. | | 2003/0014307 A1 | 1/2003 | Heng |
| 6,789,012 B1 | 9/2004 | Childs et al. | | 2003/0014357 A1 | 1/2003 | Chrisekos et al. |
| 6,834,270 B1 | 12/2004 | Pagani et al. | | 2003/0014891 A1 | 1/2003 | Nelms et al. |
| 6,851,617 B2 | 2/2005 | Saint et al. | | 2003/0018532 A1 | 1/2003 | Dudek et al. |
| 6,853,087 B2 | 2/2005 | Neuhaus et al. | | 2003/0018567 A1 | 1/2003 | Flitcroft et al. |
| 6,853,894 B1 | 2/2005 | Kolls | | 2003/0025600 A1 | 2/2003 | Blanchard |
| 6,853,987 B1 | 2/2005 | Cook | | 2003/0028481 A1 | 2/2003 | Flitcroft et al. |
| 6,857,566 B2 | 2/2005 | Wankmueller | | 2003/0046228 A1 | 3/2003 | Berney |
| 6,859,672 B2 | 2/2005 | Roberts et al. | | 2003/0054836 A1 | 3/2003 | Michot |
| 6,895,310 B1 | 5/2005 | Kolls | | 2003/0055727 A1 | 3/2003 | Walker et al. |
| 6,952,156 B2 * | 10/2005 | Arshad et al. ............ 340/5.6 | | 2003/0057226 A1 | 3/2003 | Long |
| 6,994,262 B1 | 2/2006 | Warther | | 2003/0057278 A1 | 3/2003 | Wong |

| | | | |
|---|---|---|---|
| 2003/0069828 A1 | 4/2003 | Blazey et al. | |
| 2003/0069846 A1 | 4/2003 | Marcon | |
| 2003/0112972 A1 | 6/2003 | Hattick et al. | |
| 2003/0120554 A1 | 6/2003 | Hogan et al. | |
| 2003/0121969 A1 | 7/2003 | Wankmueller | |
| 2003/0130820 A1 | 7/2003 | Lane, III | |
| 2003/0132284 A1 | 7/2003 | Reynolds et al. | |
| 2003/0140228 A1 | 7/2003 | Binder | |
| 2003/0163699 A1 | 8/2003 | Pailles et al. | |
| 2003/0167207 A1 | 9/2003 | Berardi et al. | |
| 2003/0177347 A1 | 9/2003 | Schneier et al. | |
| 2003/0183689 A1 | 10/2003 | Swift et al. | |
| 2003/0183699 A1 | 10/2003 | Masui | |
| 2003/0187786 A1 | 10/2003 | Swift et al. | |
| 2003/0187787 A1 | 10/2003 | Freund | |
| 2003/0187790 A1 | 10/2003 | Swift et al. | |
| 2003/0187796 A1 | 10/2003 | Swift et al. | |
| 2003/0195037 A1 | 10/2003 | Vuong et al. | |
| 2003/0195842 A1 | 10/2003 | Reece | |
| 2003/0195843 A1 | 10/2003 | Matsuda et al. | |
| 2003/0200184 A1 | 10/2003 | Dominguez et al. | |
| 2003/0218066 A1 | 11/2003 | Fernandes et al. | |
| 2003/0220876 A1 | 11/2003 | Burger et al. | |
| 2003/0222153 A1 | 12/2003 | Pentz et al. | |
| 2003/0225623 A1 | 12/2003 | Wankmueller | |
| 2003/0225713 A1 | 12/2003 | Atkinson et al. | |
| 2003/0227550 A1 | 12/2003 | Manico et al. | |
| 2003/0233334 A1 | 12/2003 | Smith | |
| 2004/0006539 A1 | 1/2004 | Royer et al. | |
| 2004/0010462 A1 | 1/2004 | Moon et al. | |
| 2004/0015451 A1 | 1/2004 | Sahota et al. | |
| 2004/0016796 A1 | 1/2004 | Hann et al. | |
| 2004/0020982 A1 | 2/2004 | Hoffman et al. | |
| 2004/0029569 A1 | 2/2004 | Khan et al. | |
| 2004/0030601 A1 | 2/2004 | Pond et al. | |
| 2004/0039814 A1 | 2/2004 | Crabtree et al. | |
| 2004/0039860 A1 | 2/2004 | Mills et al. | |
| 2004/0044627 A1 | 3/2004 | Russell et al. | |
| 2004/0083184 A1 | 4/2004 | Tsuei et al. | |
| 2004/0139021 A1 | 7/2004 | Reed et al. | |
| 2005/0017068 A1 | 1/2005 | Zalewski et al. | |
| 2005/0038718 A1 | 2/2005 | Barnes et al. | |
| 2005/0040272 A1 | 2/2005 | Argumedo et al. | |
| 2005/0119978 A1 | 6/2005 | Ates | |
| 2005/0121512 A1 | 6/2005 | Wankmueller | |

FOREIGN PATENT DOCUMENTS

| | | |
|---|---|---|
| EP | 0 358 525 A2 | 3/1990 |
| EP | 0 424 726 A1 | 10/1990 |
| EP | 0 484 726 A1 | 5/1992 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 115 095 A2 | 7/2001 |
| EP | 1 199 684 A2 | 4/2002 |
| EP | 1 251 450 A1 | 10/2002 |
| GB | 2347537 | 9/2000 |
| GB | 2 361 790 A | 10/2001 |
| JP | 2000-1109 A | 1/2000 |
| JP | 2000-015288 A | 1/2000 |
| JP | 2000011109 A | 1/2000 |
| JP | 2000-40181 A | 2/2000 |
| JP | 2000-67312 A | 3/2000 |
| JP | 2000-207641 A | 7/2000 |
| JP | 2001-5931 A | 1/2001 |
| JP | 2001-283122 A | 10/2001 |
| WO | WO 95/32919 | 12/1995 |
| WO | 97/09688 A3 | 3/1997 |
| WO | WO 99/03057 A1 | 1/1999 |
| WO | 99/49424 A1 | 9/1999 |
| WO | WO 00/10144 A1 | 2/2000 |
| WO | WO 00/38088 A1 | 6/2000 |
| WO | 00/49586 A1 | 8/2000 |
| WO | WO 01/04825 A1 | 1/2001 |
| WO | WO 01/15098 A1 | 3/2001 |
| WO | WO 01/43095 A2 | 6/2001 |
| WO | WO 01/72224 A1 | 10/2001 |
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/21903 A1 | 3/2002 |
| WO | WO 02/063545 A2 | 8/2002 |
| WO | WO 02/065246 A2 | 8/2002 |
| WO | WO 02/065404 A2 | 8/2002 |
| WO | WO 02/069221 A1 | 9/2002 |
| WO | WO 02/073512 A1 | 9/2002 |
| WO | WO 02/086665 A2 | 10/2002 |
| WO | WO 02/091281 A2 | 11/2002 |
| WO | WO 02/097575 A2 | 12/2002 |
| WO | WO 02/101670 A2 | 12/2002 |
| WO | 03/007623 A3 | 1/2003 |

OTHER PUBLICATIONS

"Physical Reality: A Second Look", Ken Sharp, Senior Technical Editor, http://www.idsystems.com/reader/1999_03/phys0399_pt2/phys0399_pt2.htm (6 pages).

"'Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", Jun. 4, 2002 http://www.cardweb.com/cardtrak/news/cf2_20a_97.html (2 pages).

Prophecy Central Update #9, Oct. 10, 1997, http://www.bible-prophecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.inforworld.com/articles/hn/xml/03/01/10/0301 10hnspot.xml?s=IDGNS (3 pages).

"Microsoft: See SPOT Run On Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=435-61,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its Quick Wave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A national ticket seller and phone company are teaming up to create an electronic ticket", RFID Journal, Aug. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embarces Prox Card Standard: Texas Instruments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 IC S50, Philips Semiconductors, Product Specification Rev. 5.1 May 2001.

"Biometrics: Speaker Verification", by Kulkarni, et al., http://biometrics.cse.msu.edu/speaker.html, Mar. 8, 2004, 5 pages.

"Judge Dismisses FTC Suit Against Rambus ," Evers, IDG New Service, http://www.infoworld.com/article/04/02/18/HNjudgedismisses_1.html, Feb. 18, 2004, 3 pages.

"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.

"The Evolution of Mobile Payment", by McPherson, Financial Insights, Feb. 2, 2004, http://www.banktech.com./story/mews/showArticle/jhtml?article ID=17601432, 2 pages.

"RFID Take Priority With Wal-Mart", by DocMemory, http://www.simmtester.com/page/news/shownews.asp?num=6550, Feb. 9, 2004, 2 pages.

"Microsoft, IBM and Phillips Test RFID Technology", by Rohde, IDG New Service, http:www.computerweekly.com/Article127889.htm, Feb. 9, 2004, 3 pages.

"Pay by Touch Press Releases", http://www.paybytouch.com/press.html, Feb. 10, 2004, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.

"Putting Their Finger on It", by Wilson, http://sanfrancisco.bizjournals.com/sanfrancisco/stories/2003/10/20/story6.html?t=printable, Feb. 9, 2004, 2 pages.

"TI Embraces Prox Card Standard", by Roberti, Mar. 6, 2003, http://www.ti.com/tiris/docs/in-the-news/2003/3-6-03.shtml, 2 pages.

"Fingerprint Technology—Indentix Inc.—Empowering Identification™—Understanding Biometrics", http://www.identix.com/newsroom/news_biometrics_finger.html, Feb. 18, 2004, 1 page.

"Individual Biometrics—Facial Recognition", http:ctl.ncsc.dni.us/biomet%20web/BMfacial.html, Feb. 18, 2004, 2 pages.

"Fingerprint Analysis—The Basics", http://www.crimtrac.gov.au/fingerprintanalysis.htm, Feb. 18, 2004, 3 pages.

"Visual Speech and Speaker Recognition", by Luettin, Jun. 30, 2000, http://herens.idiap.ch/~luettin/luettin-thesis.bib.abs.html, 1 page.

"Automatic Ear Recognition by Force Field Transformations", by Hurley, et al., The Institution of Electrical Engineers, 2000, pp. 7/1-7/5.

"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.

"How Facial Recognition Systems Work", by Bonsor, http://computer.howstuffworks.com/facial-recognition.htm/printable, Feb. 18, 2004, 6 pages.

"Biometrics: Hand Geometry", by Ross, et al., http://biometrics.cse.msu.edu/hand_geometry.html, Feb. 26, 2004, 2 pages.

"Biometric Person Authentication: Odor", by Korotkaya, Department of Information Technology, Laboratory of Applied Mathematics, Lappeenranta University of Technology, 18 pages.

"ISO Magnetic Stripe Card Standards", http://www.cyberd.co.uk/support./technotes/ioscards.htm, Feb. 9, 2004, 4 pages.

"Smart Card Developer's Kit: Some Basic Standards for Smart Cards", http:unix.be.eu.org/docs/smart-card-developer-kit/ch03/033-035.html, Feb. 9, 2004, 2 pages.

International Search Report and Written Opinion of the International Searching Authority, PCT/US05/26067, May 23, 2007.

"Credit Card Offer Travelers New Benefit", PR Newswire, Aug. 5, 1987.

"New Evidence about Positive Three-Tier Co-pay Performance Presented at Express Scripts 2000 Outcomes Conference", PR Newswire Association, Inc., Jun. 28, 2000.

"Prestige Credit Cards: Those Pricey Plastics", Changing Times, Apr. 1986.

"Shell Introduces Optional Credit Card", The Associated Press, Sep. 3, 1985.

"Shell Introducing Expanded 'Signature' Credit Card", Tulsa Business Chronicle, Sep. 5, 1985.

"Shell-Oil: Introduces Shell Signature Travel and Entertainment Credit Card", Business Wire, Sep. 3, 1985.

"The Chase Manhattan Bank Today Announced a Comprehensive Program to Enhance the Value of All its Credit Cards", PR Newswire, Dec. 18, 1986.

American Express to offer disposable credit card numbers, CNN.com. U.S. News, www.cnn.com/2000/US/09/08/online.payments.ap/, Sep. 8, 2000.

American Express, Private Payments SM: A New Level of Security from American Express, American Express Website, Cards.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy of CardRatings.org, The Dollar Stretcher, www.stretcher.com/stories/01/010212e.cfm, Jan. 2001.

Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.

Greene, Thomas C., American Express offers temporary CC numbers for the Web, The Register, www.theregister.com.uk/content/1/13132.html, Sep. 9, 2000.

http://www.palowireless.com/infotooth/tutorial.asp, Apr. 28, 2003.

http://www.palowireless.com/infotooth/tutorial/12cap.asp, Apr. 28, 2003.

http://www.palowireless.com/infotooth/tutorial/baseband.asp, Apr. 28, 2003.

http://www.palowireless.com/infotooth/tutorial/hci.asp, Apr. 28, 2003.

http://www.palowireless.com/infotooth/tutorial/lmp.asp, Apr. 28, 2003.

http://www.palowireless.com/infotooth/tutorial/k1_gap.asp, Apr. 28, 2003.

http://www.palowireless.com/infotooth/tutorial/profiles.asp, Apr. 28, 2003.

http://www.palowireless.com/infotooth/tutorial/radio.asp, Apr. 28, 2003.

http://www.palowireless.com/infotooth/tutorial/rfcomm.asp, Apr. 28, 2003.

http://www.palowireless.com/infotooth/tutorial/sdp.asp, Apr. 28, 2003.

http://www.palowireless.com/infotooth/whatis.asp, Apr. 28, 2003.

http://www.semiconductors.philips.com/news/content/file_878.html, Apr. 7, 2003.

International Search Report and Written Opinion of the International Searching Authority, PCT/US05/26101, May 13, 2008.

Kuntz, Mary, "Credit Cards as Good as Gold", Forbes, Nov. 4, 1985.

Lahey, Liam, "Microsoft Bolsters Rebate Structure", Computer Dealer News, Feb. 8, 2002.

Lamond, "Credit Card Transactions Real World and Online" © 1996.

Martin, Zack, One-Time Numbers Stop Web Hackers From Pilfering Data, Card Marketing, Thomson Financial, www.cardforum.com/html/cardmark/jan01_c3.htm, Jan. 2001.

Nyman, Judy, "Free Income Tax Clinics are Opening as Apr. 30 Deadline Draws Nearer", The Toronto Star, Final Edition, Mar. 25, 1986.

Obel, Michael, "Oil Companies Push Marketing, Cost Cutting to Fortify Earnings", Oil & Gas Journal, Sep. 16, 1985.

Schmuckler, Eric, "Playing Your Cards Right", Forbes, Dec. 28, 1987.

Sony, Philips to Test RFID Platform, RFID Journal, May 8, 2003, 2 pages.

"Core One Credit Union- Discover the Advantage", http://coreone.org/2visa.html, Copyright 2001, (Last Visited Oct. 9, 2002).

"Paying It By Ear", The Guardian, Jan. 18, 2003, http://money.guardian.co.uk/creditanddebt/creditcards/story/0,1456,876908,00.html, 3 pages.

Pay By Touch—Company, http://www.paybytouch.com/company.html.

"Identix Inc.—Empowering Identification™ Understanding Biometrics", http://www.identix.com/newsroom/news_biometrics_face.html, 1 page.

"International Biometric Group—Signature Biometrics: How It Works", http://www.ibgweb.com./reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"The Henry Classification System", International Biometric Group, 7 pages.

"Individual Biometrics—Hand Geometry", http://ctl.ncsc.dni.us/biomet%20web/BMHand.html, Feb. 18, 2004, 2 pages.

"Individual Biometrics—Retinal Scan", http:ctl.ncsc.dni.us/biomet%20web/BMRetinal.html, Feb. 18, 2004, 2 pages.

"Individual Biometrics—Iris Scan", http:ctl.ncsc.dni.us/biomet%20web/BMIris.html, Feb. 18, 2004, 2 pages.

"Individual Biometrics—Vascular Patterns", http:ctl.ncsc.dni.us/biomet%20web/BMVascular.html, Feb. 14, 2004, 1 page.

"Individual Biometrics—Fingerprint", http:ctl.ncsc.dni.us/biomet%20web/BMFingerprint.html, Feb. 18, 2004, 3 pages.

\* cited by examiner

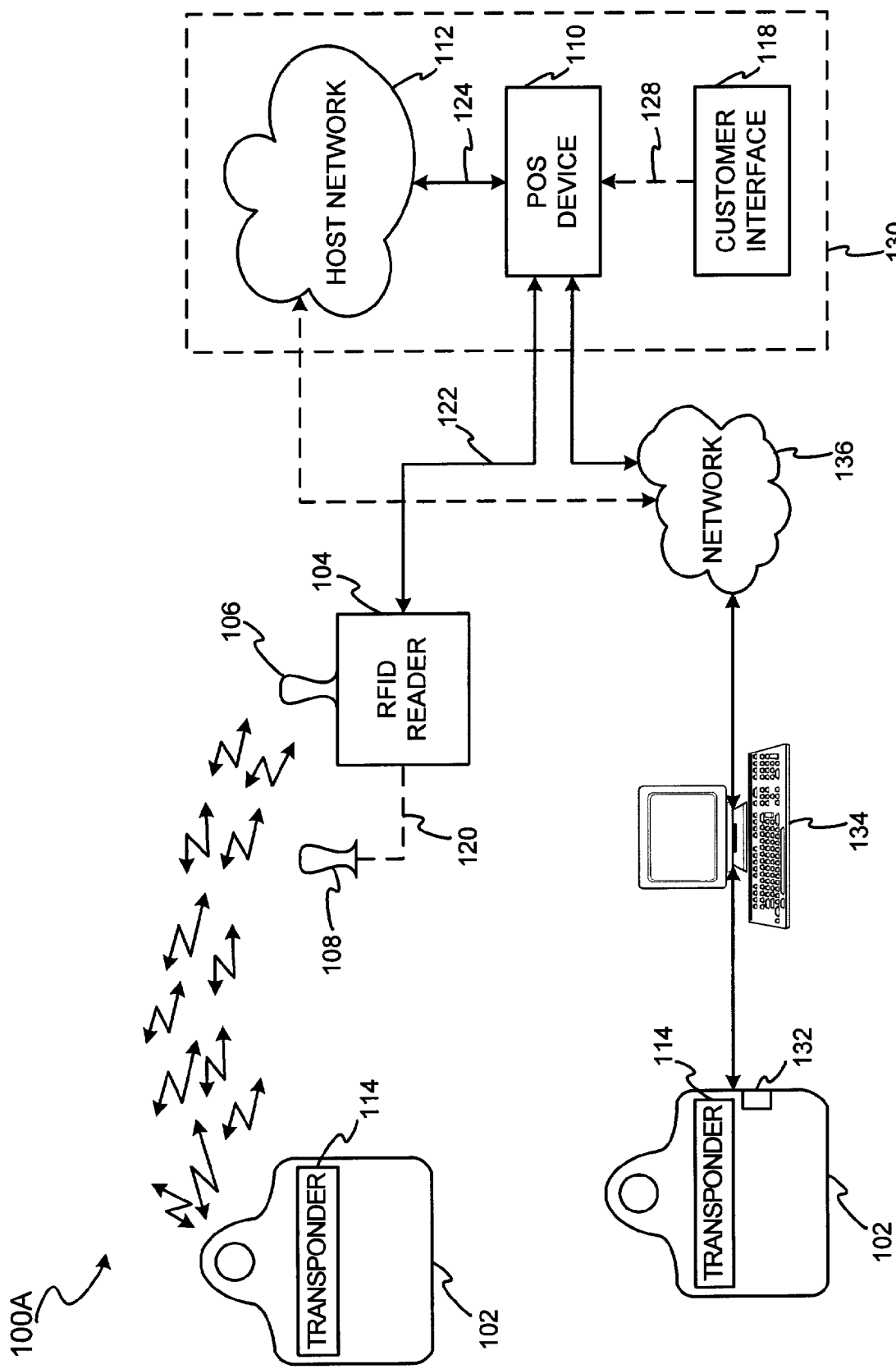

*MasterCard Track Layout in Track 2*

| SS | PAN | FS | ADDITIONAL DATA | ES | LRC |
|---|---|---|---|---|---|
| ; | 3111222233334444 | = | 9912101000000000 | ? | |

FIG. 12

METHOD AND SYSTEM FOR A TRAVEL-RELATED MULTI-FUNCTION FOB

CROSS REFERENCE TO RELATED APPLICATIONS

This invention may be a continuation in part of U.S. Ser. No. 10/340,352, filed on Jan. 10, 2003, and entitled "SYSTEM AND METHOD FOR INCENTING PAYMENT USING RADIO FREQUENCY IDENTIFICATION IN CONTACT AND CONTACTLESS TRANSACTIONS." The '352 application itself claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional No. 60/304,216, filed on Jul. 10, 2001); U.S. patent application Ser. No. 10/318,432, entitled "SYSTEM AND METHOD FOR SELECTING LOAD OPTIONS FOR USE IN RADIO FREQUENCY IDENTIFICATION IN CONTACT AND CONTACTLESS TRANSACTIONS," filed Dec. 13, 2002; U.S. patent application Ser. No. 10/318,480, entitled "SYSTEM AND METHOD FOR PAYMENT USING RADIO FREQUENCY IDENTIFICATION IN CONTACT AND CONTACTLESS TRANSACTIONS," filed Dec. 13, 2002; and, U.S. Provisional Patent Application Ser. No. 60/396,577, filed Jul. 16, 2002. All of the above applications are hereby incorporated by reference.

FIELD OF INVENTION

The present invention relates generally to the use of Radio Frequency Identification (RFID) in contactless environments, for commercial transactions and, more particularly, to a method and system for conveniently storing, retrieving, and updating data related to a fob user's travel information in the context of contactless environments.

BACKGROUND OF INVENTION

Despite advances in information technology and process streamlining with respect to travel arrangements, the modern traveler may be often subjected to unnecessary delays, petty inconveniences, and oppressive paperwork. These travel burdens are most evident in the airline, hotel, and rental car industries, where arranging and paying for services and accommodations can involve significant time delays due to miscommunication, poor record-keeping, and a host of other administrative inefficiencies.

Like barcode and voice data entry, RFID is a contactless information acquisition technology. RFID systems are wireless, and are usually extremely effective in hostile environments where conventional acquisition methods fail. RFID has established itself in a wide range of markets, such as, for example, the high-speed reading of railway containers, tracking moving objects such as livestock or automobiles, and retail inventory applications. As such, RFID technology has become a primary focus in automated data collection, identification and analysis systems worldwide.

Of late, companies are increasingly embodying RFID data acquisition technology in a fob or tag for use in completing financial transactions. A typical fob includes a transponder and is ordinarily a self-contained device which may be contained on any portable form factor. In some instances, a battery may be included with the fob to power the transponder. In which case the internal circuitry of the fob (including the transponder) may draw its operating power from the battery power source. Alternatively, the fob may exist independent of an internal power source. In this instance the internal circuitry of the fob (including the transponder) may gain its operating power directly from an RF interrogation signal. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

In the conventional fob powering technologies used, the fob is typically activated upon presenting the fob in an interrogation signal. In this regard, the fob may be activated irrespective of whether the user desires such activation. Inadvertent presentation of the fob may result in initiation and completion of an unwanted transaction. Thus, a fob system is needed which allows the fob user to control activation of the fob to limit transactions being undesirably completed.

One of the more visible uses of the RFID technology is found in the introduction of Exxon/Mobil's Speedpass® and Shell's EasyPay® products. These products use transponders placed in a fob or tag which enables automatic identification of the user when the fob is presented at a Point of Sale (POS) device. Fob identification data is typically passed to a third party server database, where the identification data is referenced to a customer (e.g., user) credit or debit account. In an exemplary processing method, the server seeks authorization for the transaction by passing the transaction and account data to an authorizing entity. Once authorization is received by the server, clearance is sent to the point of sale device for completion of the transaction. In this way, the conventional transaction processing method involves an indirect path which causes undue overhead due to the use of the third-party server.

A need exists for a transaction authorization system which allows Fob transactions, particularly travel-related transactions, to be authorized while eliminating the cost associated with using third-party servers.

SUMMARY OF INVENTION

The present invention provides a system and methods for an RFID system which securely and conveniently integrates important travel-related applications. In accordance with one aspect of the present invention, an RFID system comprises a RFID fob identification application and various additional applications useful in particular travel contexts; for example, airline, hotel, rental car, and payment-related applications. In accordance with another aspect of the present invention, an RFID system further comprises space and security features within specific applications which provide partnering organizations the ability to construct custom and secure file structures.

BRIEF DESCRIPTION OF DRAWINGS

The accompanying drawings, wherein like numerals depict like elements, illustrate exemplary embodiments of the present invention, and together with the description, serve to explain the principles of the invention. In the drawings:

FIG. 1A illustrates an exemplary RFID-based system in accordance with the present invention, wherein exemplary components used for fob transaction completion are depicted;

FIG. 12 is an example of a conventional magnetic stripe track 2 layout for MasterCard;

DETAILED DESCRIPTION

Figure 1B:
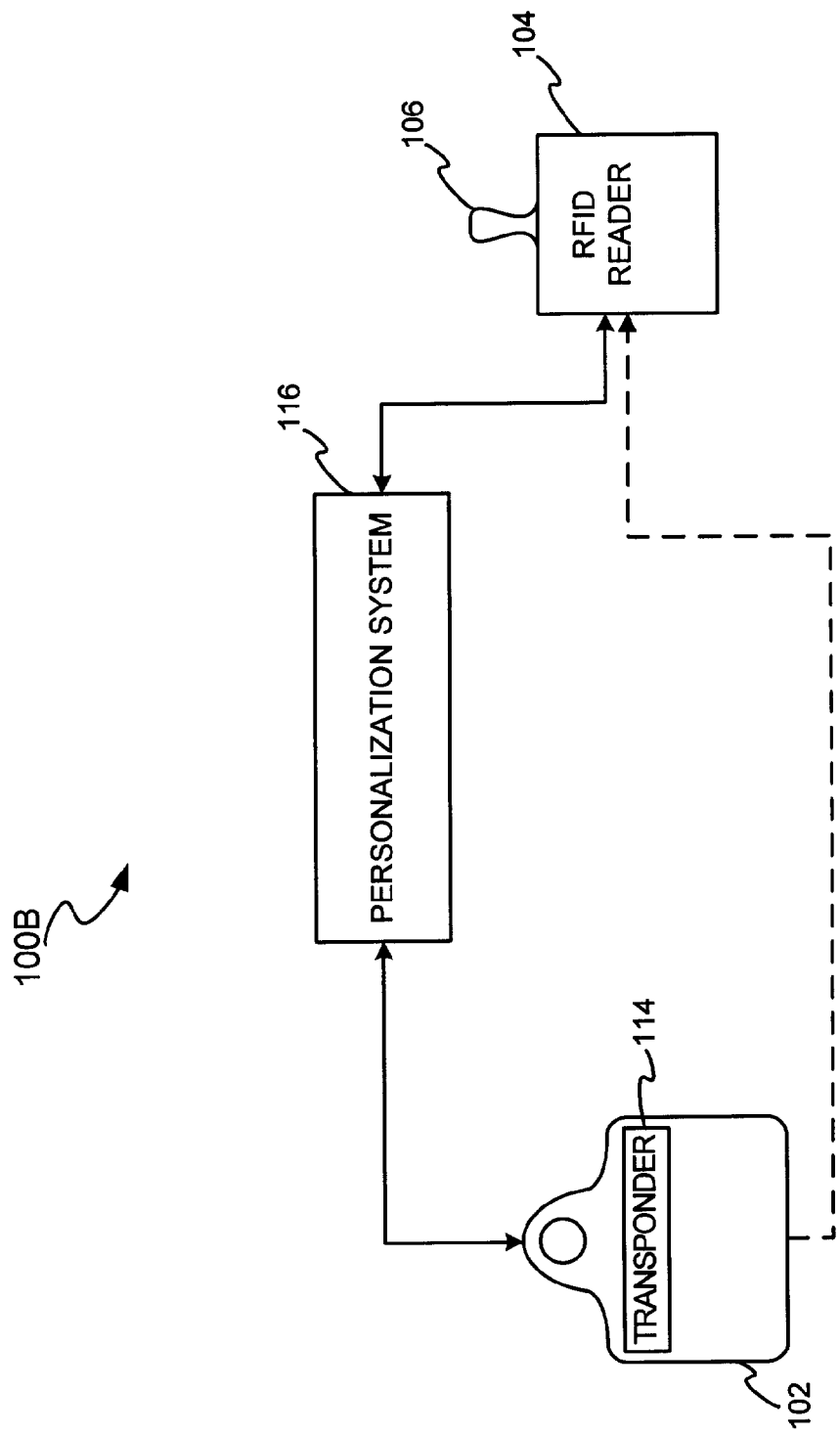
FIG. 1B illustrates an exemplary personalization system in accordance with the present invention.

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by john Wiley & Sons (second edition, 1996), herein incorporated by reference.

In addition, many applications of the present invention could be formulated. The exemplary network disclosed herein may include any system for exchanging data or transacting business, such as the internet, an intranet, an extranet, WAN, LAN, satellite communications, and/or the like. It may be noted that the network may be implemented as other types of networks, such as an interactive television network (ITN).

Where required, the system user may interact with the system via any input device such as, a keypad, keyboard, mouse, kiosk, personal digital assistant, handheld computer (e.g., Palm Pilots®, Blueberry®), cellular phone and/or the like. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates, the use, sale, or distribution of any goods, services or information over any network having similar functionality described herein.

FIG. 1A illustrates an exemplary RFID transaction system 100A in accordance with the present invention, wherein exemplary components for use in completing a fob transaction using travel-related information are depicted. In general, the operation of system 100A may begin when fob 102 may be presented for payment, and may be interrogated by RFID reader 104 or, alternatively, interface 134. Fob 102 and RFID reader 104 may then engage in mutual authentication after which the transponder 102 may provide the transponder identification, account identifier and/or travel-related information to the RFID reader 104 which may further provide the information to the merchant system 130 POS device 110.

System 100A may include a fob 102 having a transponder 114 and a RFID reader 104 in RF communication with fob 102. Although the present invention may be described with respect to a fob 102, the invention may be not to be so limited. Indeed, system 100 may include any device having a transponder which may be configured to communicate with a RFID reader 104 via RF communication. Typical devices may include, for example, a key ring, tag, card, cell phone, wristwatch or any such form capable of being presented for interrogation.

The RFID reader 104 may be configured to communicate using a RFID internal antenna 106. Alternatively, RFID reader 104 may include an external antenna 108 for communications with fob 102, where the external antenna may be made remote to the RFID reader 104 using a suitable cable and/or data link 120. RFID reader 104 may be further in communication with a merchant system 130 via a data link 122. The system 100A may include a transaction completion system including a point of interaction device such as, for example, a merchant point of sale (POS) device 110 or a computer interface (e.g., user interface) 134. In one exemplary embodiment the transaction completion system may include a merchant system 130 including the POS device 110 in communication with a RFID reader 104 (via data link 122). As described more fully below, the transaction completion system may include the user interface 134 connected to a network 136 and to the transponder via a USB connector 132.

Although the point of interaction device may be described herein with respect to a merchant point of sale (POS) device, the invention may be not to be so limited. Indeed, a merchant POS device may be used herein by way of example, and the point of interaction device may be any device capable of receiving fob account data. In this regard, the POS may be any point of interaction device enabling the user to complete a transaction using a fob 102. POS device 110 may be in further communication with a customer interface 118 (via data link 128) for entering at least a customer identity verification information. In addition, POS device 110 may be in communication with a merchant host network 112 (via data link 124), an issuer host network, and/or any other access point for processing any transaction request. In this arrangement, information provided by RFID reader 104 may be provided to the POS device 110 of merchant system 130 via data link 122. The POS device 110 may receive the information (and alternatively may receive any identity verifying information from customer interface 118 via data link 128) and provide the information to host system 112 for processing.

A variety of conventional communications media and protocols may be used for data links 120, 122, 124, and 128. For example, data links 120, 122, 124, and 128 may be an Internet Service Provider (ISP) configured to facilitate communications over a local loop as may be typically used in connection with standard modem communication, cable modem, dish networks, ISDN, Digital Subscriber Lines (DSL), or any wireless communication media. In addition, the merchant system 130 including the POS device 110 and host network 112 may reside on a local area network which interfaces to a remote network (not shown) for remote authorization of an intended transaction. The merchant system 130 may communicate with the remote network via a leased line, such as a T1, D3 line, or the like. Such communications lines are described in a variety of texts, such as, "Understanding Data Communications," by Gilbert Held, which may be incorporated herein by reference.

An account number, as used herein, may include any identifier for an account (e.g., credit, charge debit, checking, savings, reward, loyalty, travel or the like) which may be maintained by a transaction account provider (e.g., payment authorization center) and which may be used to complete a financial transaction. A typical account number (e.g., account data) may be correlated to a credit or debit account, loyalty account, travel or rewards account maintained and serviced by such entities as American Express, Visa and/or MasterCard or the like. For ease in understanding, the present invention may be described with respect to a credit card account. However, it should be noted that the invention may be not so limited and other accounts permitting an exchange of goods and services for an account data value may be contemplated to be within the scope of the present invention.

In addition, the account number (e.g., account data) may be associated with any device, code, or other identifier/indicia suitably configured to allow the consumer to interact or communicate with the system, such as, for example, authorization/access code, personal identification number (PIN), Internet code, digital certificate, biometric data, and/or other identification indicia. The account number may be optionally located on a rewards card, charge card, credit card, debit card, prepaid card, telephone card, smart card, magnetic stripe card, bar code card, and/or the like. The account number may be distributed and stored in any form of plastic, electronic, magnetic, and/or optical device capable of transmitting or downloading data to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". In a typical example, the first five to seven digits are reserved for processing purposes and identify the issuing bank, card type and etc. In this example, the last sixteenth digit may be used as a sum check for the sixteen-digit number. The intermediary eight-to-ten digits are used to uniquely identify the customer. The account number stored as Track 1 and Track 2 data as defined in ISO/IEC 7813, and further may be made unique to fob 102. Track 1 and Track 2 data may be described in more detail below. In one exemplary embodiment, the account number may include a unique fob serial number and user identification number, as well as specific application applets. The account number may be stored in fob 102 inside a database 214, as described more fully below. Database 214 may be configured to store multiple account numbers issued to the fob 102 user by the same or different account providing institutions. Where the account data corresponds to a loyalty or rewards account, the database 214 may be configured to store the attendant loyalty or rewards points data.

Figure 2:
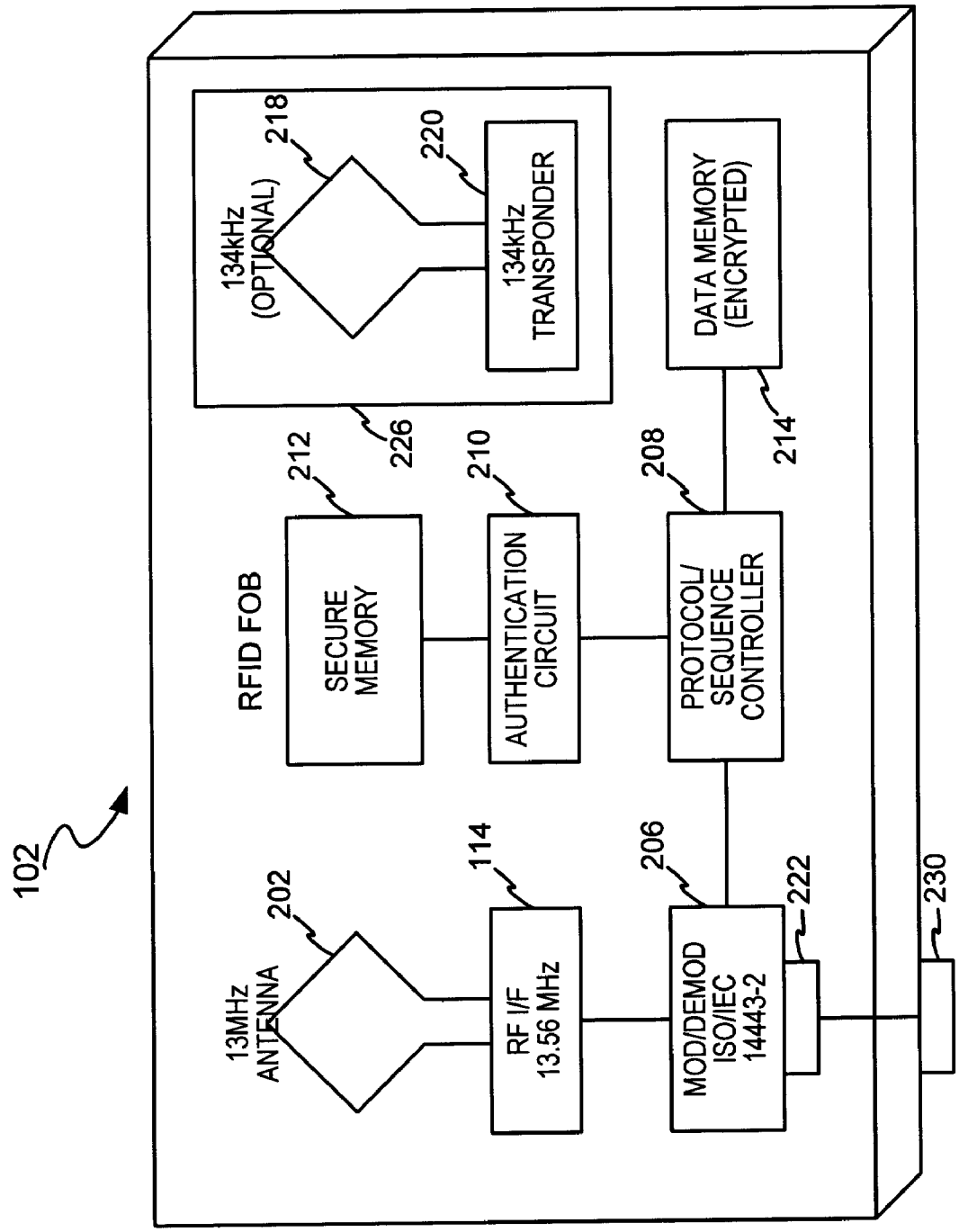
FIG. 2 is a schematic illustration of an exemplary fob in accordance with the present invention.

FIG. 2 illustrates a block diagram of the many functional blocks of an exemplary fob 102 in accordance with the present invention. Fob 102 may be a RFID fob 102 which may be presented by the user to facilitate an exchange of funds or points, etc., for receipt of goods or services. As described herein, by way of example, the fob 102 may be a RFID fob which may be presented for facilitating payment for goods and/or services.

Fob 102 may include an antenna 202 for receiving an interrogation signal from RFID reader 104 via antenna 106 (or alternatively, via external antenna 108). Fob antenna 202 may be in communication with a transponder 114. In one exemplary embodiment, transponder 114 may be a 13.56 MHz transponder compliant with the ISO/IEC 14443 standard, and antenna 202 may be of the 13 MHz variety. The transponder 114 may be in communication with a transponder compatible modulator/demodulator 206 configured to receive the signal from transponder 114 and configured to modulate the signal into a format readable by any later connected circuitry. Further, modulator/demodulator 206 may be configured to format (e.g., demodulate) a signal received from the later connected circuitry in a format compatible with transponder 114 for transmitting to RFID reader 104 via antenna 202. For example, where transponder 114 may be of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of the fob 102 account number. In this regard, protocol/sequence controller 208 may be any suitable digital or logic driven circuitry capable of facilitating determination of the sequence of operation for the fob 102 inner-circuitry. For example, protocol/sequence controller 208 may be configured to determine whether the signal provided by the RFID reader 104 may be authenticated, and thereby providing to the RFID reader 104 the account number stored on fob 102.

Protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB 2 by IBM (White Plains, N.Y.), any of the database products available from Oracle Corporation (Redwood Shores, Calif.), Microsoft Access or MSSQL by Microsoft Corporation (Redmond, Wash.), or any other database product. Database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables may be, in one embodiment, the same. However, data tables having similar, though not identical, data in the key fields may also be merged by using AGREP, for example.

The data may be used by protocol/sequence controller 208 for data analysis and used for management and control purposes, as well as security purposes. Authentication circuitry may authenticate the signal provided by RFID reader 104 by association of the RFID signal to authentication keys stored on database 212. Encryption circuitry may use keys stored on database 212 to perform encryption and/or decryption of signals sent to or from the RFID reader 104.

In addition, protocol/sequence controller 208 may be in communication with a database 214 for storing at least a fob 102 account data, and a unique fob 102 identification code. Protocol/sequence controller 208 may be configured to retrieve the account number from database 214 as desired. Database 214 may be of the same configuration as database 212 described above. The fob account data and/or unique fob identification code stored on database 214 may be encrypted prior to storage. Thus, where protocol/sequence controller 208 retrieves the account data, and or unique fob identification code from database 214, the account number may be encrypted when being provided to RFID reader 104. Further, the data stored on database 214 may include, for example, an unencrypted unique fob 102 identification code, a user identification, Track 1 and 2 data, as well as specific application applets.

In accordance with another exemplary embodiment, the account number may be stored in magnetic stripe format. For example, where the account number may be in magnetic stripe format, the account number portions are governed by the International Standards Organization ISO/IEC 7811, et al. standard, which are hereby incorporated by reference. The standard requires the magnetic stripe information to be encoded in three "tracks" (i.e., track 1, track 2, and track 3).

Data stored in track 1 may be typically used to verify the user's identity. Track 1 may be reserved for encoding the transaction account identifier, the name of the accountholder, and at least the expiration date of the transaction account or the transaction device. The information encoded in track 1 may be alpha-numeric and may be encoded at about 7 Bits/Character. In an exemplary layout of the data stored in track 1, track 1 may be segmented into several distinct predetermined portions (e.g., "fields") for encoding the various account identifying information. The following table may be useful for determining the field definitions of the information provided.

TABLE 1

Table of Field Codes for Track 1

Figure 19:
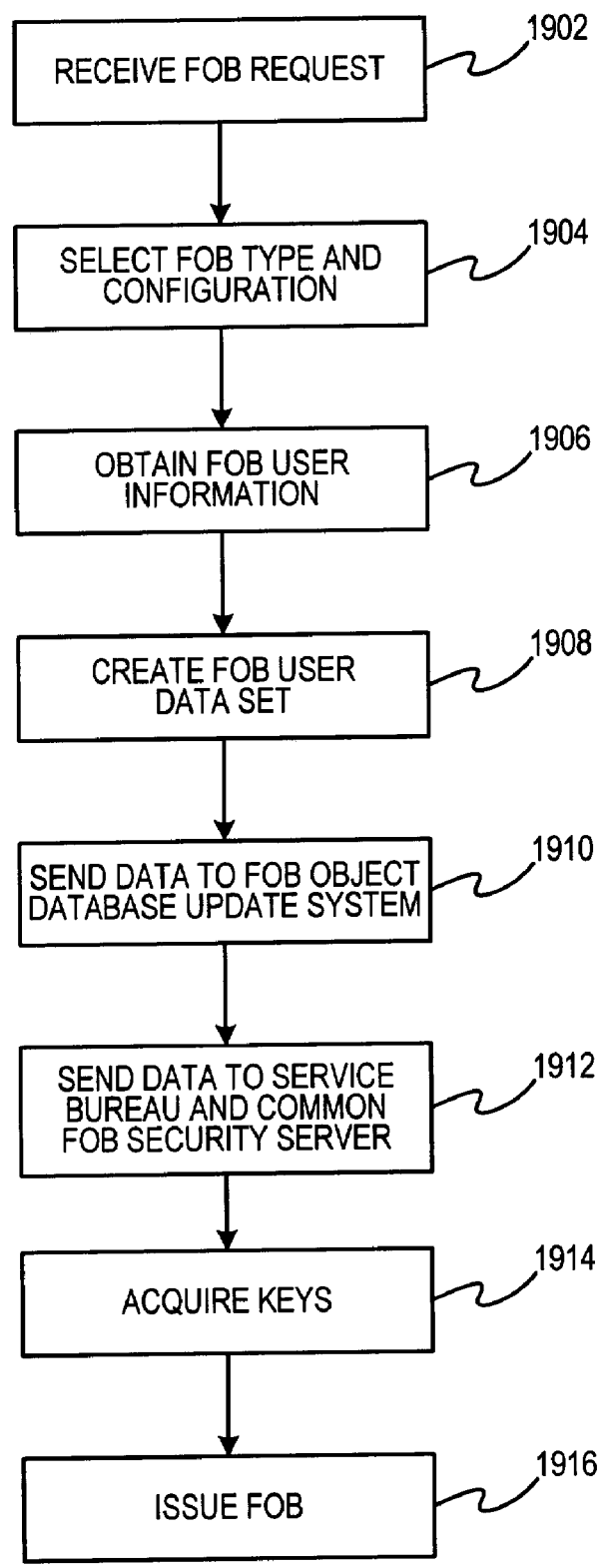
FIG. 19 is an exemplary layout of the data stored in track 2 format.

SS = Start Sentinel "%"
FC = Format Code
PAN = Primary Acct. # (19 digits max)
FS = Field Separator "^"
Name = 26 alphanumeric characters max.
Additional Data = Expiration Date, offset, encrypted PIN, etc.
ES = End Sentinel "?"
LRC = Longitudinal Redundancy Check Track 2 may be the track most commonly used by the American Banking Association associated banking institutions. Track 2 may be typically reserved for a duplicate version of the transaction account identifier and the expiration date of the transaction account or the transaction device stored in track 1. In addition, track 2 may include an encrypted Personal Identification Code, and other discretionary data. However, the data in track 2 may be encoded at a lower Bit per Character density than the data encoded in track 1. The data in track 2 may be numeric only and may be encoded at about 5 Bits/Character. The lower density ratio in track 2 may be designed to ensure compatibility with older technology readers and to provide redundancy when reading with newer technology readers. FIG. 19 illustrates an exemplary layout of the data stored in track 2, wherein track 2 may be segmented into several distinct predetermined portions for encoding the various account identifying information. As shown, the following table may be useful for determining the definitions of the information provided.

TABLE 2

Table of Field Codes for Track 2

SS = Start Sentinel "%"
SS = Start Sentinel ";"
PAN = Primary Acct. # (19 digits max)
FS = Field Separator "="
Additional Data = Expiration Date, offset, encrypted PIN, etc.
ES = End Sentinel "?"
LRC = Longitudinal Redundancy Check Track 3 may be of similar description as Track 2. With the International Standards Organization adoption of standard ISO/IEC 4909, track 3 of the magnetic stripe format was no longer used by the banking industry. However, other transaction devices including a magnetic stripe, such as drivers licenses, use track 3, which may include both numeric only and alpha numeric characters. Track 3 may be unique in that track 3 was intended to have data read and WRITTEN on it. Cardholders would have account information UPDATED right on the magnetic stripe. The present invention anticipates that a fob user's travel-related information profile and/or account information may be updated using track 3. Unfortunately, track 3 may be almost an orphaned standard, since most readers currently in operation are not configured to write data onto a magnetic stripe. The original design of track 3 was to control off-line ATM transactions by recording transaction data for later reference by the banking institution. But since ATMs are now on-line, the usage of track 3 has been drastically reduced.

The most common technique used to encode data in magnetic stripe format may be known as Aiken Biphase, or "two-frequency coherent-phase encoding." The American National Standards Institute (ANSI) and the International Standards Organization (ISO) have chosen two standards to guide the encoding process. The ISO encoding protocol specifies that each of tracks 1, 2 and 3 must begin and end with a length of all Zero bits, called CLOCKING BITS. These are used to synch the self-clocking feature of bi-phase decoding. In addition, most transaction devices which use magnetic stripe encoding protocol use either the ANSI/ISO ALPHA Data format or the ANSI/ISO BCD Data format. For example, track 1 may be typically encoded in ANSI/ISO ALPHA Data format which may be a 7 bit, 6 data bits+1 parity bit (odd) format, where the data may be read least significant bit first. The ANSI/ISO ALPHA format character set contains 64 characters, 43 alphanumeric, 3 framing/field characters and 18 control/special characters. On the other hand, tracks 2 and 3 are typically encoded in ANSI/ISO BCD Data format, which may be a 5 bit, 4 data bits+1 parity bit(odd) format. The character set for the ANSI/ISO BCD Data format character set contains 16 characters, 10 alphanumeric, 3 framing/field characters and 3 control/special characters.

Ordinarily, a proxy account number (e.g., a portion of the transaction account number) includes essential identifying information, such as, for example, any information that may be common to the account provider. The common information (also called "common character," herein) may include the account provider routing number, or common source indicator such as the character spaces reserved to indicate the identification of the issuing bank. Thus, where the proxy transaction account identifier corresponds to an American Express account, the proxy transaction account identifier may include the common character number 3, encoded the field location where such common character may be ordinarily encoded in traditional magnetic stripe format.

FIG. 12 illustrates the encoding of which would ordinarily be done by an entity, such as, for example, MasterCard in track 2 format. FIG. 12 shows the encoding of a MasterCard account number 3111 2222 3333 4444 with expiration date 12/99 in traditional track 1 format. Since MasterCard uses the number 3 to identify its transaction accounts, the proxy account identifier will also use the number 3 so that the receiving system (e.g., reader 104 or merchant system 130, or account provider) further recognizes that the proxy account identifier may be from a MasterCard transaction device. It should be noted that in this example, the "3" and the "101" may be common characters to all MasterCard transaction accounts. For a more detailed explanation of magnetic stripe format data exchange, see U.S. patent application Ser. No. 10/810,473, filed on Mar. 26, 2004, entitled "SYSTEM AND METHOD FOR ENCODING INFORMATION IN MAGNETIC STRIPE FORMAT FOR USE IN RADIO FREQUENCY IDENTIFICATION TRANSACTIONS," incorporated herein by reference.

Fob 102 may be configured to respond to multiple interrogation frequency transmissions provided by RFID reader 104. That is, as described more fully below, RFID reader 104 may provide more than one RF interrogation signal. In this case, fob 102 may be configured to respond to the multiple frequencies by including in fob 102 one or more additional RF signal receiving/transmitting units 226. RF signal receiving/transmitting unit 226 may include an antenna 218 and transponder 220 where the antenna 218 and transponder 220 are compatible with at least one of the additional RF signals provided by RFID reader 104. For example, in one exemplary embodiment, fob 102 may include a 134 kHz antenna 218 configured to communicate with a 134 kHz transponder 220. In this exemplary configuration, an ISO/IEC 14443-2 compliant modulator/demodulator may not be required. Instead, the 134 kHz transponder may be configured to communicate directly with the protocol/sequence controller 208 for transmission and receipt of authentication and account number signals as described above.

In another embodiment, fob 102 may further include a universal serial bus (USB) connector 132 for interfacing fob 102 to a user interface 134. User interface 134 may be further in communication with a POS device 110 via a network 136. Network 136 may be the Internet, an intranet, or the like as may be described above with respect to network 112. Further, the user interface 134 may be similar in construction to any conventional input devices and/or computing systems aforementioned for permitting the system user to interact with the system. In one exemplary embodiment, fob 102 may be configured to facilitate online Internet payments. A USB converter 222 may be in communication with a USB connector 232 for facilitating the transfer of information between the modulator/demodulator 206 and USB connector 132. Alternatively, USB converter 222 may be in communication with protocol/sequence controller 208 to facilitate the transfer of information between protocol/sequence controller 208 and USB connector 132.

Where fob 102 includes a USB connector 132, fob 102 may be in communication with, for example, a USB port on user interface 134. The information retrieved from fob 102 may be compatible with credit card and/or smart card technology enabling usage of interactive applications on the Internet. No RFID reader may be required in this embodiment since the connection to POS device 110 may be made using a USB port on user interface 134 and a network 136.

Fob 102 may include means for enabling activation of the fob by the user. In one exemplary embodiment, a switch 230 which may be operated by the user of the fob 102. The switch 230 on fob 102 may be used to selectively or inclusively activate the fob 102 for particular uses. In this context, the term "selectively" may mean that the switch 230 enables the user to place the fob 102 in a particular operational mode. For example, the user may place the fob 102 in a mode for enabling purchase of a good or of a service using a selected account number. Alternatively, the fob may be placed in a mode as such that the fob account number may be provided by USB port 132 (or serial port) only and the fob transponder 114 may be disabled. In addition, the term "inclusively" may mean that the fob 102 may be placed in an operational mode permitting the fob 102 to be responsive to the RF interrogation and interrogation via the USB connector 132. In one particular embodiment, the switch 230 may remain in an OFF position ensuring that one or more applications or accounts associated with the fob 102 are non-reactive to any commands issued by RFID reader 104. As used herein, the OFF position may be termed the "normal" position of the activation switch 230, although other normal positions are contemplated.

In another exemplary embodiment, when the switch 230 may be moved from the OFF position, the fob 102 may be deemed activated by the user. That is, the switch 230 may activate internal circuitry in fob 102 for permitting the fob to be responsive to RF signals (e.g., commands from RFID reader 104). In this way, switch 230 may facilitate control of the active and inactive states of the fob 102. Such control increases the system security by preventing inadvertent or illegal use of the fob 102.

In one exemplary embodiment, switch 230 may be a simple mechanical device in communication with circuitry which may electrically prevent the fob from being powered by a RFID reader. That is, when switch 230 may be in its normal position, switch 230 may provide a short to the fob 102 internal circuitry, preventing fob 102 from being responsive to interrogation by RF or via the USB connector 230. In this arrangement, the switch 230 may be, for example, a "normally closed" (NC) configured switch, which may be electrically connected to the antenna 202 at the interface of the antenna 202 and the transponder 114. The switch 230 may be depressed, which may open the switch 230 fully activating the antenna 202.

In yet another exemplary embodiment, the fob 102 may include a biometric sensor and biometric membrane configured to operate as switch 230 and activate the fob 102 when provided biometric signal from the fob 102 user. Such biometric signal may be the digital reading of a fingerprint, thumbprint, or the like. Typically, where biometric circuitry may be used, the biometric circuitry may be powered by an internal voltage source (e.g., battery). In this case, the switch may not be a simple mechanical device, but a switch which may be powered. In yet another exemplary embodiment, switch 230 may be battery powered though no biometric circuitry may be present in the fob 102.

In yet another embodiment, the switch 230 may be a logic switch. Where switch 230 may be a logic switch the switch 230 control software may be read from the sequence controller 208 to selectively control the activation of the various fob 102 components.

Figure 3:
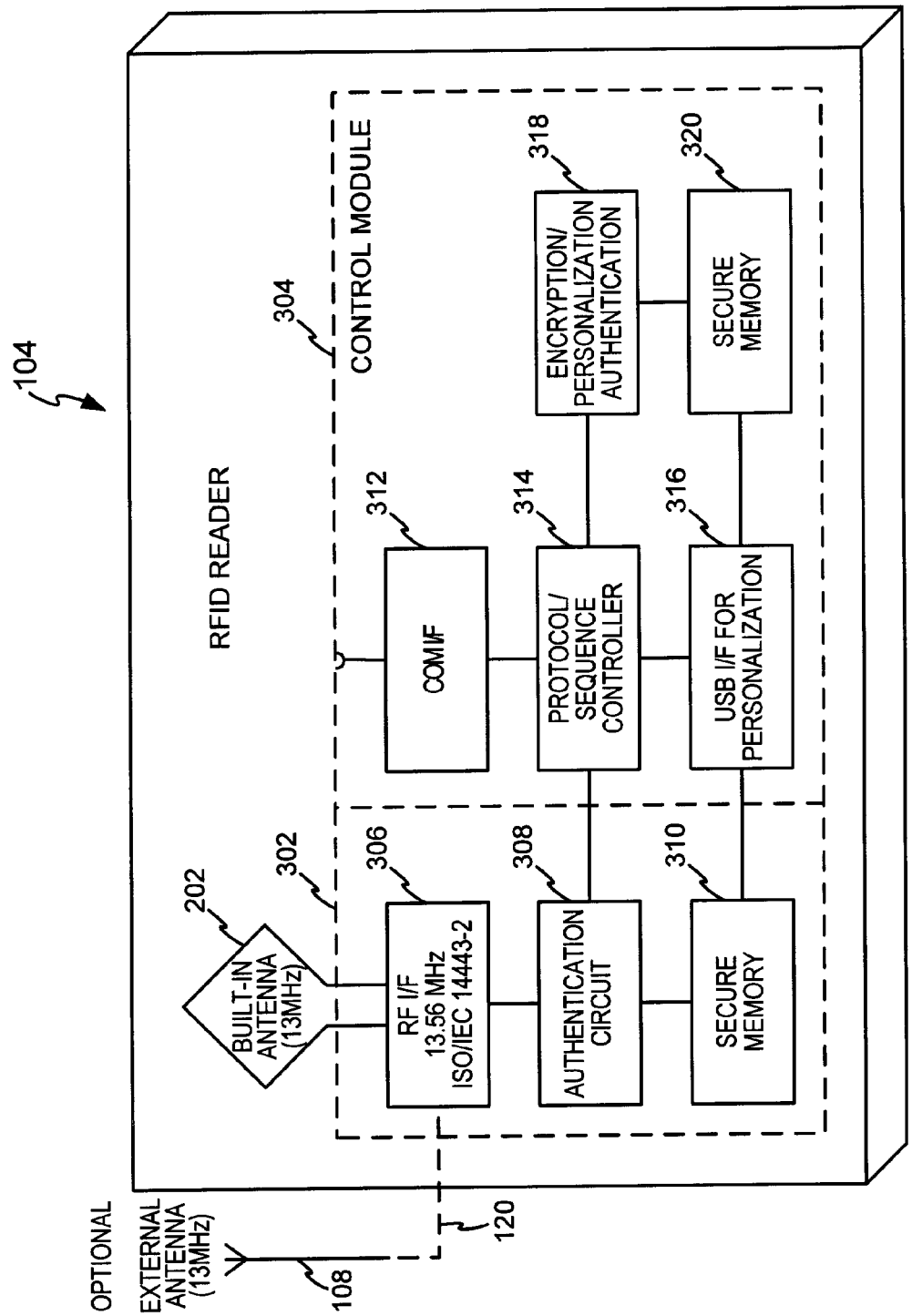
FIG. 3 is a schematic illustration of an exemplary RFID reader in accordance with the present invention.

FIG. 3 illustrates an exemplary block diagram of a RFID reader 104 in accordance with an exemplary embodiment of the present invention. RFID reader 104 includes, for example, an antenna 106 coupled to a RF module 302, which may be further coupled to a control module 304. In addition, RFID reader 104 may include an antenna 108 positioned remotely from the RFID reader 104 and coupled to RFID reader 104 via a suitable cable 120, or other wire or wireless connection.

RF module 302 and antenna 106 may be suitably configured to facilitate communication with fob 102. Where fob 102 may be formatted to receive a signal at a particular RF frequency, RF module 302 may be configured to provide an interrogation signal at that same frequency. For example, in one exemplary embodiment, fob 102 may be configured to respond to an interrogation signal of about 13.56 MHz. In this case, RFID antenna 106 may be 13 MHz and may be configured to transmit an interrogation signal of about 13.56 MHz. That is, fob 102 may be configured to include a first and second RF module (e.g., transponder) where the first module may operate using a 134 kHz frequency and the second RF module may operate sing a 13.56 MHz frequency. The RFID reader 104 may include two receivers which may operate using the 134 kHz frequency, the 13.56 MHz frequency or both. When the reader 104 may be operating at 134 kHz frequency, only operation with the 134 kHz module on the fob 102 may be possible. When the reader 104 may be operating at the 13.56 MHz frequency, only operation with the 13.56 MHz module on the fob 102 may be possible. Where the reader 104 supports both a 134 kHz frequency and a 13.56 MHz RF module, the fob 102 may receive both signals from the reader 104. In this case, the fob 102 may be configured to prioritize selection of the one or the other frequency and reject the remaining frequency. Alternatively, the reader 104 may receive signals at both frequencies from the fob upon interrogation. In this case, the reader 104 may be configured to prioritize selection of one or the other frequency and reject the remaining frequency.

Further, protocol/sequence controller 314 may include an optional feedback function for notifying the user of the status of a particular transaction. For example, the optional feedback may be in the form of an LED, LED screen and/or other visual display which may be configured to light up or display a static, scrolling, flashing and/or other message and/or signal to inform the fob 102 user that the transaction may be initiated (e.g., fob may be being interrogated), the fob may be valid (e.g., fob may be authenticated), transaction may be being processed, (e.g., fob account number may be being read by RFID reader) and/or the transaction may be accepted or denied (e.g., transaction approved or disapproved). Such an optional feedback may or may not be accompanied by an audible indicator (or may present the audible indicator singly) for informing the fob 102 user of the transaction status. The audible feedback may be a simple tone, multiple tones, musical indicator, and/or voice indicator configured to signify when the fob 102 may be being interrogated, the transaction status, or the like.

RFID antenna 106 may be in communication with a transponder 306 for transmitting an interrogation signal and receiving at least one of an authentication request signal and/or an account data from fob 102. Transponder 306 may be of similar description as transponder 114 of FIG. 2. In particular, transponder 306 may be configured to send and/or receive RF signals in a format compatible with antenna 202 in similar manner as was described with respect to fob transponder 114. For example, where transponder 306 may be 13.56 MHz RF rated antenna 202 may be 13.56 MHz compatible. Similarly, where transponder 306 may be ISO/IEC 14443 rated, antenna 106 may be ISO/IEC 14443 compatible.

RF module 302 may include, for example, transponder 306 in communication with authentication circuitry 308 which may be in communication with a secure database 310. Authentication circuitry 308 and database 310 may be of similar description and operation as described with respect to authentication circuitry 210 and secure memory database 212 of FIG. 2. For example, database 310 may store data corresponding to the fob 102 which are authorized to transact business over system 100. Database 310 may additionally store RFID reader 104 identifying information for providing to fob 102 for use in authenticating whether RFID reader 104 may be authorized to be provided the fob account number stored on fob database 214.

Authentication circuitry 308 may be of similar description and operation as authentication circuitry 210. That is, authentication circuitry 308 may be configured to authenticate the signal provided by fob 102 in similar manner that authentication circuitry 210 may be configured to authenticate the signal provided by RFID reader 104. As may be described more fully below, fob 102 and RFID reader 104 engage in mutual authentication. In this context, "mutual authentication" may mean that operation of the system 100 may not take place until fob 102 authenticates the signal from RFID reader 104, and RFID reader 104 authenticates the signal from fob 102.

Figure 4:
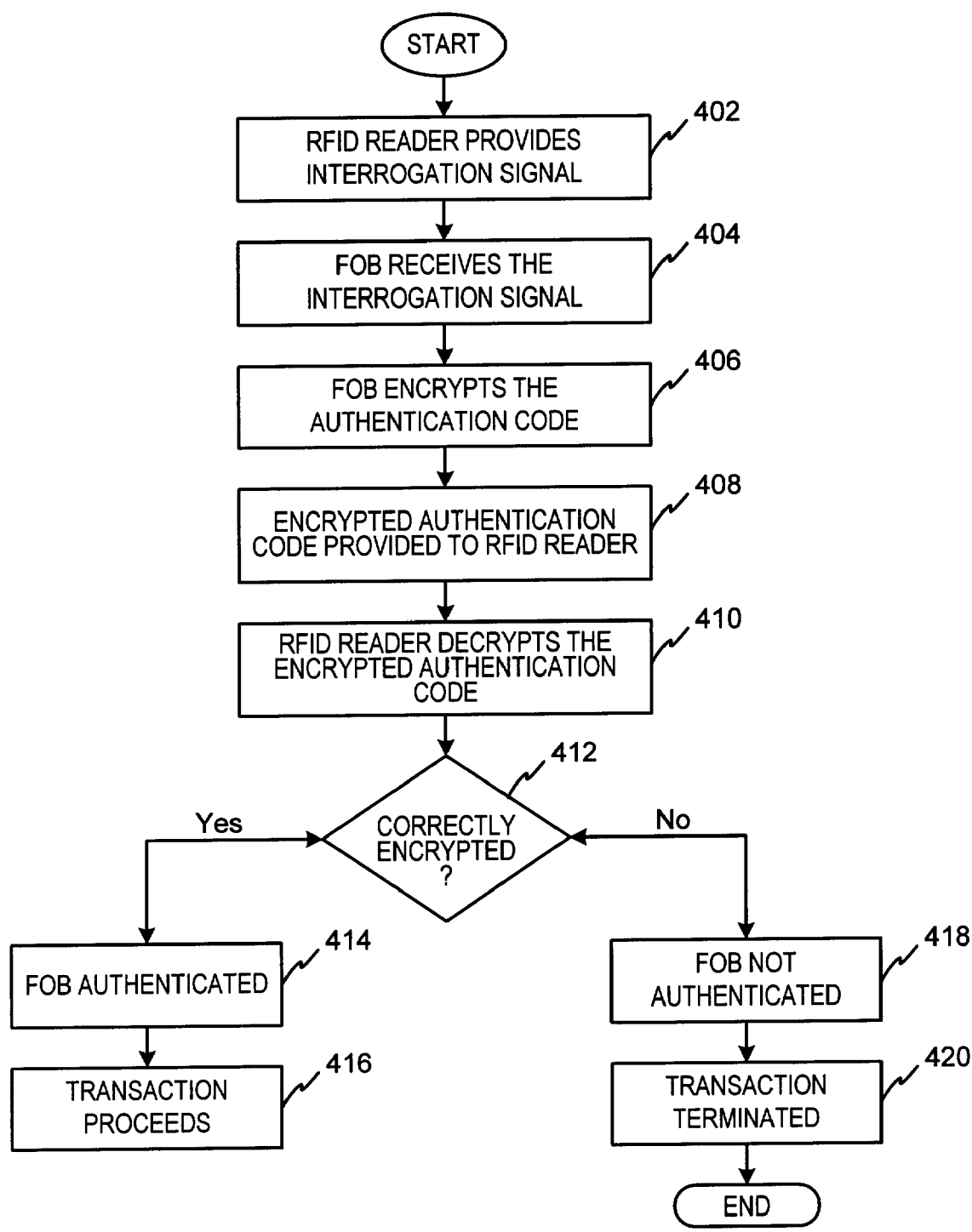
FIG. 4 is an exemplary flow diagram of an exemplary authentication process in accordance with the present invention.

FIG. 4 may be a flowchart of an exemplary authentication process in accordance with the present invention. The authentication process may be depicted as one-sided. That is, the flowchart depicts the process of the RFID reader 104 authenticating the fob 102, although similar steps may be followed in the instance that fob 102 authenticates RFID reader 104.

As noted, database 212 may store security keys for encrypting or decrypting signals received from RFID reader 104. In an exemplary authentication process, where RFID reader 104 may be authenticating fob 102, RFID reader 104 may provide an interrogation signal to fob 102 (step 402). The interrogation signal may include a random code generated by the RFID reader authentication circuit 210, which may be provided to the fob 102 and which may be encrypted using an unique encryption key corresponding to the fob 102 unique identification code. For example, the protocol/sequence controller 314 may provide a command to activate the authentication circuitry 308. Authentication circuitry 308 may provide from database 310 a fob interrogation signal including a random number as a part of the authentication code generated for each authentication signal. The authentication code may be an alphanumeric code which may be recognizable (e.g., readable) by the RFID reader 104 and the fob 102. The authentication code may be provided to the fob 102 via the RFID RF interface 306 and antenna 106 (or alternatively antenna 108).

Fob 102 receives the interrogation signal (step 404). The interrogation signal including the authorization code may be received at the RF interface 114 via antenna 202. Once the fob 102 may be activated, the interrogation signal including the authorization code may be provided to the modulator/demodulator circuit 206 where the signal may be demodulated prior to providing the signal to protocol/sequence controller 208. Protocol/sequence controller 208 may recognize the interrogation signal as a request for authentication of the fob 102, and provide the authentication code to authentication circuit 210. The fob 102 may then encrypt the authentication code (step 406). In particular, encryption may be done by authentication circuit 210, which may receive the authentication code and encrypt the code prior to providing the encrypted authentication code to protocol/sequence controller 208. Fob 102 may then provide the encrypted authentication code to the RFID reader 104 (step 408). That is, the encrypted authentication code may be provided to the RFID reader 104 via modulator/demodulator circuit 206, RF interface 114 (e.g., transponder 114) and antenna 202.

RFID reader 104 may then receive the encrypted authentication code and decryption it (step 410). That is, the encrypted authentication code may be received at antenna 106 and RF interface 306 and may be provided to authentication circuit 308. Authentication circuit 308 may be provided a security authentication key (e.g., transponder system decryption key) from database 310. The authentication circuit may use the authentication key to decrypt (e.g., unlock) the encrypted authorization code. The authentication key may be provided to the authentication circuit based on the fob 102 unique identification code. For example, the encrypted authentication code may be provided along with the unique fob 102 identification code. The authentication circuit may receive the fob 102 unique identification code and retrieve from the database 310 a transponder system decryption key correlative to the unique fob 102 identification code for use in decrypting the encrypted authentication code.

Once the authentication code may be decrypted, the decrypted authentication code may be compared to the authentication code provided by the RFID reader 104 at step 402 (step 412) to verify its authenticity. If the decrypted authorization code may be not readable (e.g., recognizable) by the authentication circuit 308, the fob 102 may be deemed to be unauthorized (e.g., unverified) (step 416) and the operation of system 100 may be terminated (step 418). Contrarily, if the decrypted authorization code may be recognizable (e.g., verified) by the fob 102, the decrypted authorization code may be deemed to be authenticated (step 412), and the transaction may be allowed to proceed (step 414). In one particular embodiment, the proceeding transaction may mean that the fob 102 may authenticate the RFID reader 104, although, it should be apparent that the RFID reader 104 may authenticate the fob 102 prior to the fob 102 authenticating the RFID reader 104.

It should be noted that in an exemplary verification process, the authorization circuit 308 may determine whether the unlocked authorization code may be identical to the authorization code provided in step 402. If the codes are not identical then the fob 102 may be not authorized to access system 100. Although, the verification process may be described with respect to identicality, identicality may be not required. For example, authentication circuit 308 may verify the decrypted code through any protocol, steps, or process for determining whether the decrypted code corresponds to an authorized fob 102.

Figure 5:
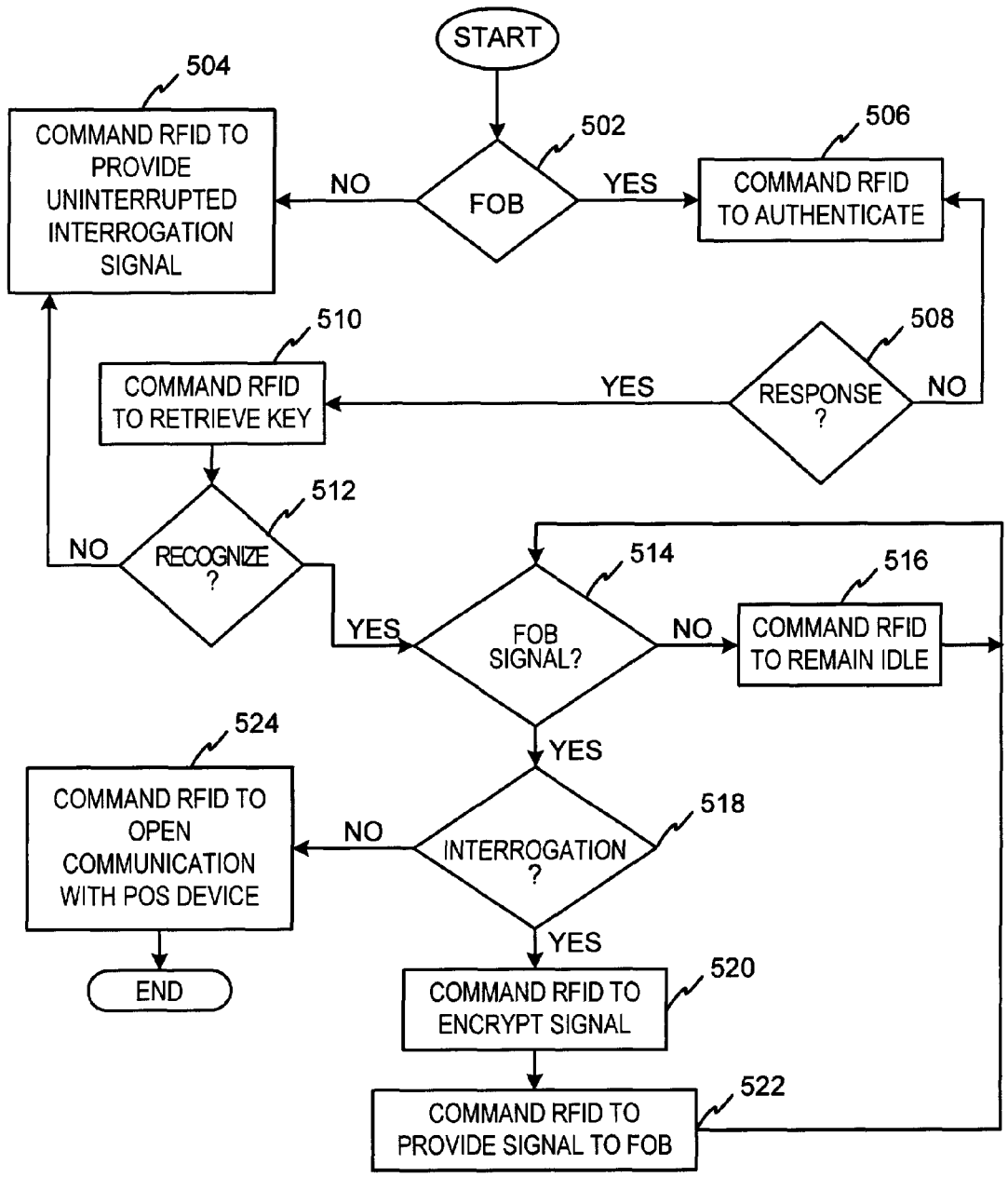
FIG. 5 is an exemplary flow diagram of an exemplary decision process for a protocol/sequence controller in accordance with the present invention.

Authentication circuitry 308 may additionally be in communication with a protocol/sequence controller 314 of similar operation and description as protocol/sequence controller 208 of FIG. 2. That is, protocol/sequence device controller 314 may be configured to determine the order of operation of the RFID reader 104 components. For example, FIG. 5 illustrates and exemplary decision process under which protocol/sequence controller 314 may operate. Protocol/sequence controller 314 may command the different components of RFID reader 104 based on whether a fob 102 may be present (step 502). For example, if a fob 102 may be not present, then protocol/sequence controller 314 may command the RFID reader 104 to provide an uninterrupted interrogation signal (step 504). That is, the protocol/sequence controller may command the authentication circuit 308 to provide an uninterrupted interrogation signal until the presence of a fob 102 may be realized. If a fob 102 may be present, the protocol/sequence controller 314 may command the RFID reader 104 to authenticate the fob 102 (step 506).

As noted above, authentication may mean that the protocol/sequence controller 314 may command the authentication circuit 308 to provide fob 102 with an authorization code. If a response may be received from fob 102, protocol/sequence controller may determine if the response may be a response to the RFID reader 104 provided authentication code, or if the response may be a signal requiring authentication (step 508). If the signal requires authentication, then the protocol/sequence controller 314 may activate the authentication circuit as described above (step 506). On the other hand, if the fob 102 signal may be a response to the provided authentication code, then the protocol/sequence controller 314 may command the RFID reader 104 to retrieve the appropriate security key for enabling recognition of the signal (step 510). That is, the protocol/sequence controller 314 may command the authentication circuit 308 to retrieve from database 310 a security key (e.g., transponder system decryption key), unlock the signal, and compare the signal to the signal provided by the RFID reader 104 in the authentication process (e.g., step 506). If the signal may be recognized, the protocol/sequence controller 314 may determine that the fob 102 may be authorized to access the system 100. If the signal may be not recognized, then the fob may be considered not authorized. In which case, the protocol/sequence controller 314 may command the RFID controller to interrogate for authorized fobs (step 504).

Once the protocol/sequence controller determines that the fob 102 may be authorized, the protocol/sequence controller 314 may seek to determine if additional signals are being sent by fob 102 (step 514). If no additional signal may be provided by fob 102, then the protocol/sequence controller 314 may provide all the components of RFID reader 104 to remain idle until such time as a signal may be provided (step 516). Contrarily, where an additional fob 102 signal may be provided, the protocol/sequence controller 314 may determine if the fob 102 may be requesting access to the merchant point of sale terminal 110 (e.g., POS device) or if the fob 102 may be attempting to interrogate the RFID reader 104 for return (e.g., mutual) authorization (step 518). Where the fob 102 may be requesting access to a merchant point of sale terminal 110, the protocol/sequence controller 314 may command the RFID reader to open communications with the point of sale terminal 110 (step 524). In particular, the protocol/sequence controller may command the point of sale terminal communications interface 312 to become active, permitting transfer of data between the RFID reader 104 and the merchant point of sale terminal 110.

On the other hand, if the protocol/sequence controller determines that the fob 102 signal may be a mutual interrogation signal, then the protocol/sequence controller may command the RFID reader 104 to encrypt the signal (step 520). The protocol/sequence controller 314 may command the encryption authentication circuit 318 to retrieve from database 320 the appropriate encryption key in response to the fob 102 mutual interrogation signal. The protocol/sequence controller 314 may then command the RFID reader 104 to provide the encrypted mutual interrogation signal to the fob 102. The protocol/sequence controller 314 may command the authentication circuit 318 to provide an encrypted mutual interrogation signal for the fob 102 to mutually authenticate. Fob 102 may then receive the encrypted mutual interrogation signal and retrieve from authentication circuitry 212 a RFID reader decryption key.

Although an exemplary decision process of protocol/sequence controller 314 may be described, it should be understood that a similar decision process may be undertaken by protocol/sequence controller 208 in controlling the components of fob 102. Indeed, as described above, protocol/sequence controller 314 may have similar operation and design as protocol/sequence controller 208. In addition, to the above, protocol/sequence controllers 208 and 314 may incorporate in the decision process appropriate commands for enabling USB interfaces 222 and 316, when the corresponding device may be so connected.

Encryption/decryption component 318 may be further in communication with a secure account number database 320 which stores the security keys necessary for decrypting the encrypted fob account number. Upon appropriate request from protocol/sequence controller 314, encryption/decryption component (e.g., circuitry 318) may retrieve the appropriate security key, decrypt the fob account number and forward the decrypted account number to protocol sequence controller 314 in any format readable by any later connected POS device 110. In one exemplary embodiment, the account number may be forwarded in a conventional magnetic stripe format compatible with the ISO/IEC 7813 standard. Upon receiving the account number in magnetic stripe format, protocol/sequence controller 314 may forward the account number to POS device 110 via a communications interface 312 and data link 122, as best shown in FIG. 1A. POS device 110 may receive the decrypted account number and forward the magnetic stripe formatted account number to a merchant network 112 for processing under the merchant's business as usual standard. In this way, the present invention eliminates the need of a third-party server. Further, where the POS device 110 receives a response from network 112 (e.g., transaction authorized or denied), protocol/sequence controller 314 may provide the network response to the RF module 302 for optically and/or audibly communicating the response to the fob 102 user.

RFID reader 104 may additionally include a USB interface 316, in communication with the protocol/sequence controller 314. In one embodiment, the USB interface may be a RS22 serial data interface. Alternatively, the RFID reader 104 may include a serial interface such as, for example, a RS232 interface in communication with the protocol/sequence controller 314. The USB connector 316 may be in communication with a personalization system 116 (shown in FIG. 1B) for initializing RFID reader 104 to system 100 application parameters. That is, prior to operation of system 100, RFID reader 104 may be in communication with personalization system 116 for populating database 310 with a listing of security keys belonging to authorized fobs 102, and for populating database 320 with the security keys to decrypt the fob 102 account numbers placing the account numbers in ISO/IEC 7813 format. In this way, RFID reader 104 may be populated with a unique identifier (e.g., serial number) which may be used by fob authentication circuitry 210 to determine if RFID reader 104 may be authorized to receive a fob 102 encrypted account number.

FIG. 1B illustrates an exemplary personalization system 100B, in accordance with the present invention. In general, typical personalization system 100B may be any system for initializing the RFID reader 104 and fob 102 for use in system 100A. With reference to FIG. 1B, the similar personalization process for fob 102 may be illustrated. For example, personalization system 116 may be in communication with fob 102 via RF ISO 14443 interface 114 for populating fob database 212 with the security keys for facilitating authentication of the unique RFID reader 104 identifier. In addition, personalization system 116 may populate on database 212 a unique fob 102 identifier for use by RFID reader 104 in determining whether fob 102 may be authorized to access system 100. Personalization system 116 may populate (e.g., inject) the encrypted fob 102 account number into fob database 214 for later providing to authenticated RFID reader 104. Personalization system 116 may additionally populate travel-related information into fob database 212 for later providing to RFID reader 104, third-party travel partners, and/or issuer systems.

In one exemplary embodiment, personalization system 116 may include any standard computing system as described above. For example, personalization system 116 may include a standard personal computer containing a hardware security module operable using any conventional graphic user interface. Prior to populating the security key information account number, unique identifying information, and travel-related information into the fob 102 or RFID reader 104, the hardware security module may authenticate the fob 102 and RFID reader 104 to verify that the components are authorized to receive the secure information.

Figure 6A:
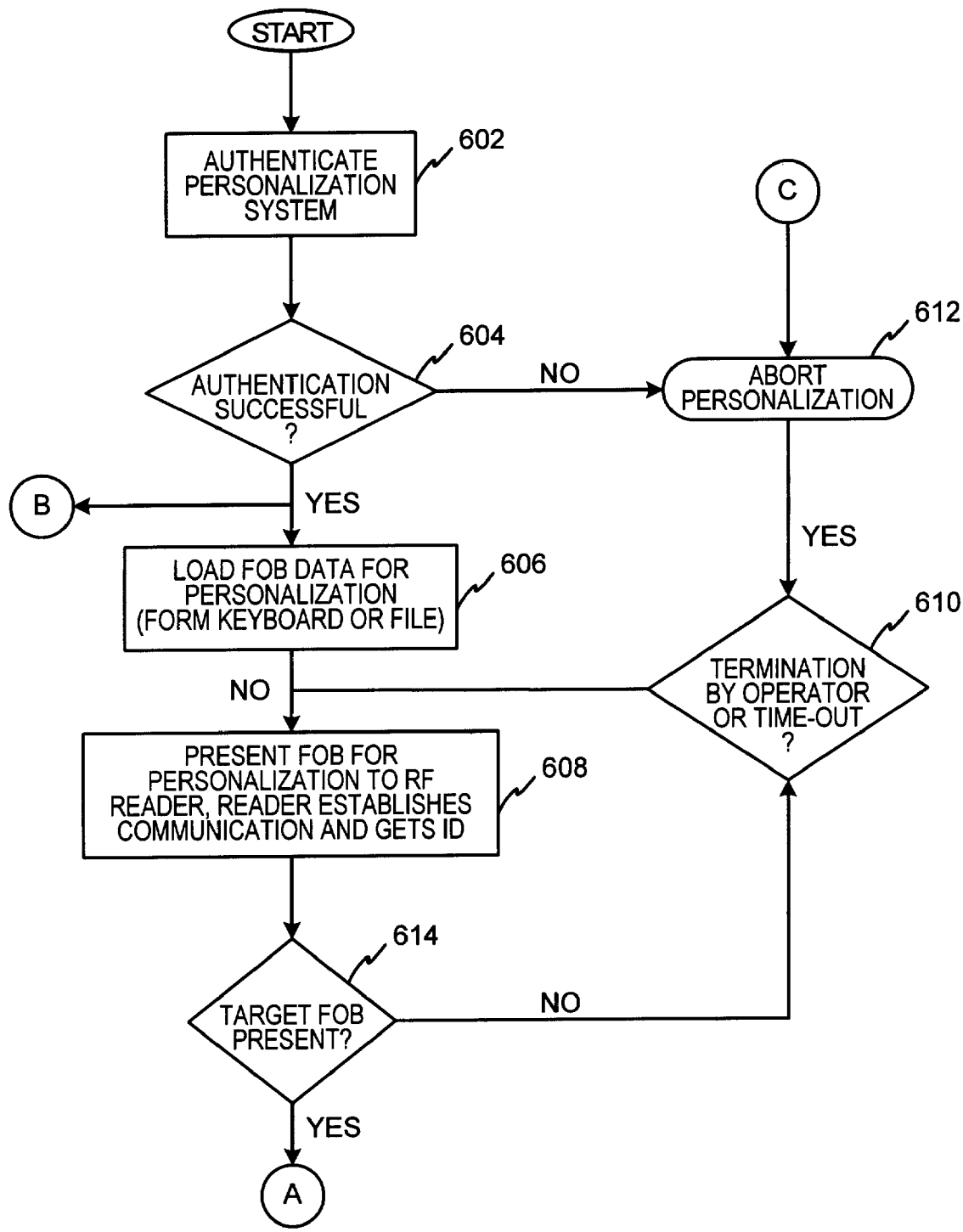
FIGS. 6A-B are an exemplary flow diagram of a fob personalization process in accordance with the present invention.
Figure 6B:
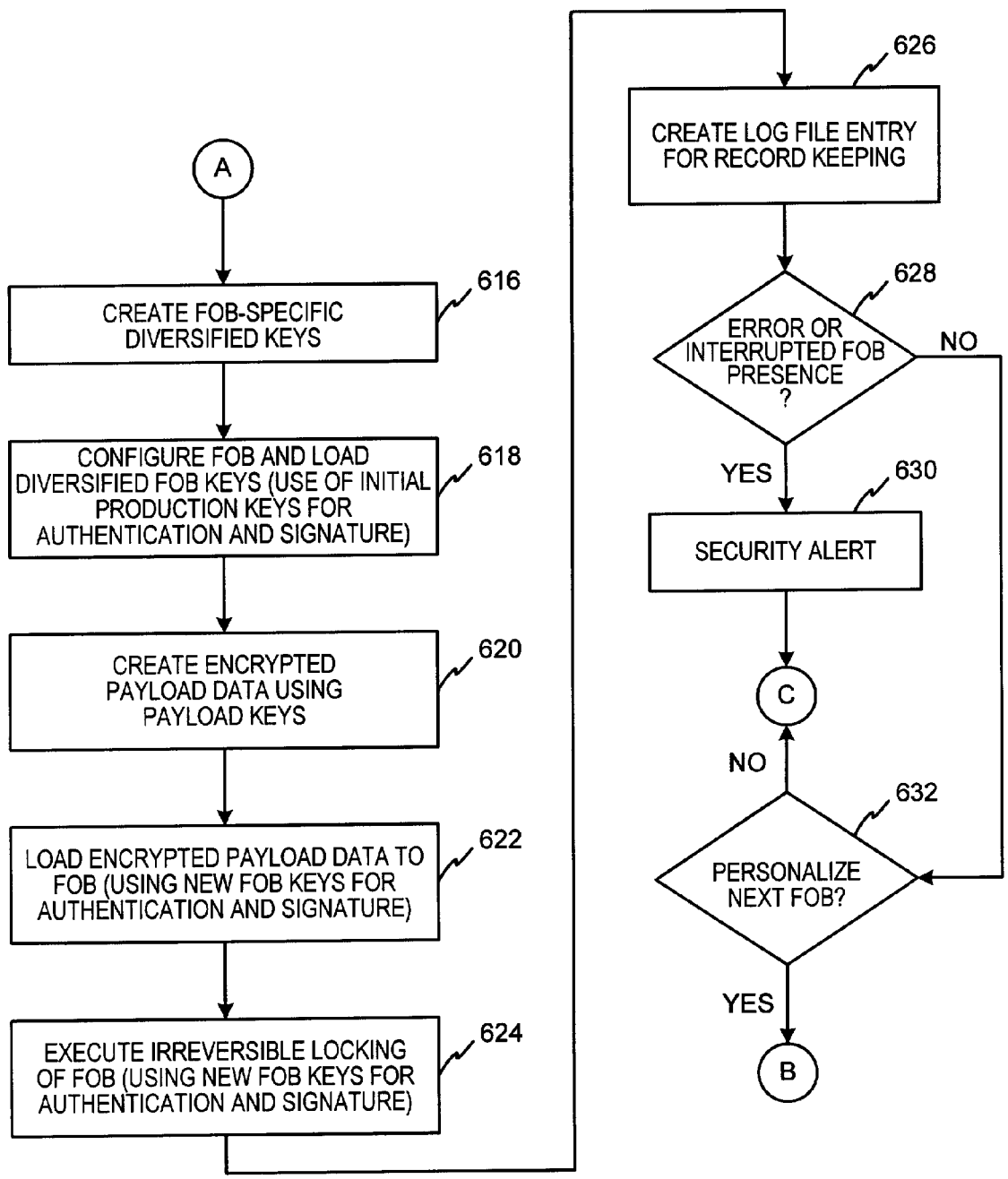

FIGS. 6A-B illustrate an exemplary flowchart of a personalization procedure which may be used to personalize fob 102 and/or RFID reader 104. Although the following description discusses mainly personalization of fob 102, RFID reader 104 may be personalized using a similar process. The personalization process, which occurs between the personalization system 116 and the device to be personalized (e.g., fob 102 or RFID reader 104), may begin, for example at step 602. Mutual authentication may occur between the personalization system 116 and the device to be authenticated in much the same manner as was described above with regard to fob 102 mutually authenticating with RFID reader 104. That is, personalization system 116 may transmit a personalization system 116 identifier to the device to be authenticated which may be compared by the device authentication circuitry 210, 308 against personalization system identifiers stored in the device database 212, 310. Where a match does not occur (step 604), the personalization process may be aborted (step 612). Where a match occurs (step 604), the personalization system may prepare a personalization file to be provided to the device to be personalized (step 606). If the personalization system may be operated manually, the personalization file may be entered into the personalization system 116 using any suitable system interface such as, for example, a keyboard (step 606). Where the personalization system 116 operator elects to delay the preparation of the personalization files, the system 116 may abort the personalization process (step 610). In this context, the personalization file may include the unique fob 102 or RFID reader 104 identifier, security key for loading into database 212 and 310, security keys for decrypting a fob account number which may be loaded in database 320, and/or travel-related information.

Fob 102 may be personalized by direct connection to the personalization system 116 via RF ISO/IEC 14443 interface face 114, or the fob 102 may be personalized using RFID reader 104. Personalization system 116 and RFID reader 104 may engage in mutual authentication and RFID reader 104 may be configured to transmit the fob personalization file to fob 102 via RF. Once the fob 102 may be presented to RFID reader 104 (steps 608, 614) for personalization, fob 102 and RFID reader 104 may engage in mutual authentication (step 614). Where the fob 102 may be not presented to the RFID reader 104 for personalization, the personalization process may be aborted (step 610).

If the fob 102 may be detected, the personalization system 116 may create as a part of the personalization file, a unique identifier for providing to the fob 102 (step 616). The identifier may be unique in that one identifier may be given only to a single fob. That is, no other fob may have that same identifier. The fob may then be configured and loaded with that identifier (step 618).

The encrypted fob 102 account number may be populated into fob 102 in the same manner as may be described with respect to the fob 102 unique identifier. That is, personalization system 116 may pre-encrypt the account data (step 620) and inject the encrypted account into fob database 214 (step 622). The encrypted account data may be loaded (e.g., injected) into the fob 102 using RFID reader 104 as discussed above.

Once the personalization file may be populated into the fob 102, the populated information may be irreversibly locked to prevent alteration, unauthorized reading and/or unauthorized access (step 624). Personalization system 116 may then create a log of the personalization file information for later access and analysis by the personalization system 116 user (step 626).

It should be noted that in the event the personalization system 116 process may be compromised or interrupted (step 628), the personalization system may send a security alert to the user (step 630) and the personalization process may be aborted (step 612). On the other hand, where no such compromising or interruption exists, the personalization system may be prepared to begin initialization on a second device to be personalized (step 632).

Figure 7A:
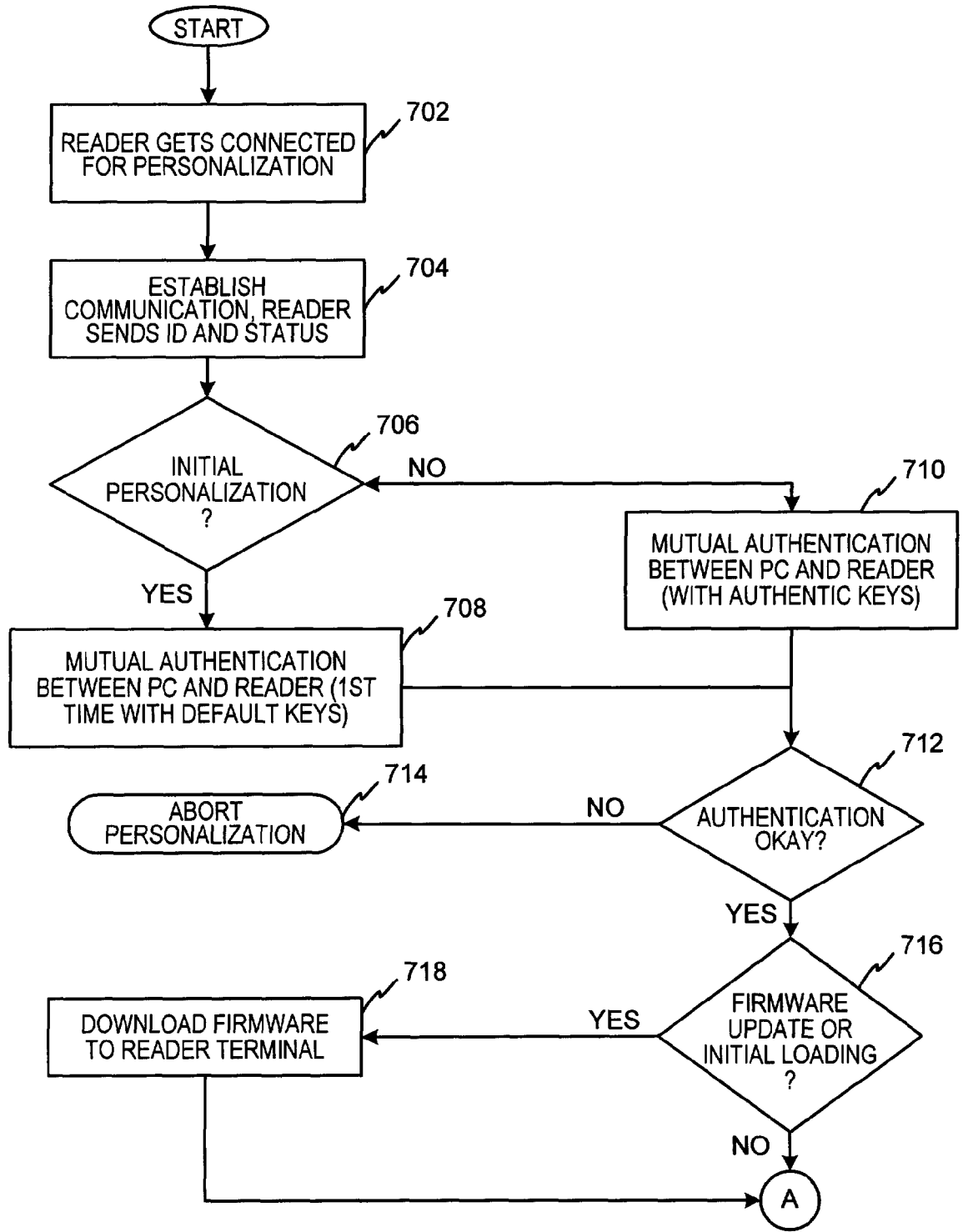
FIGS. 7A-B are an exemplary flow diagram of a RFID reader personalization process in accordance with the present invention.
Figure 7B:
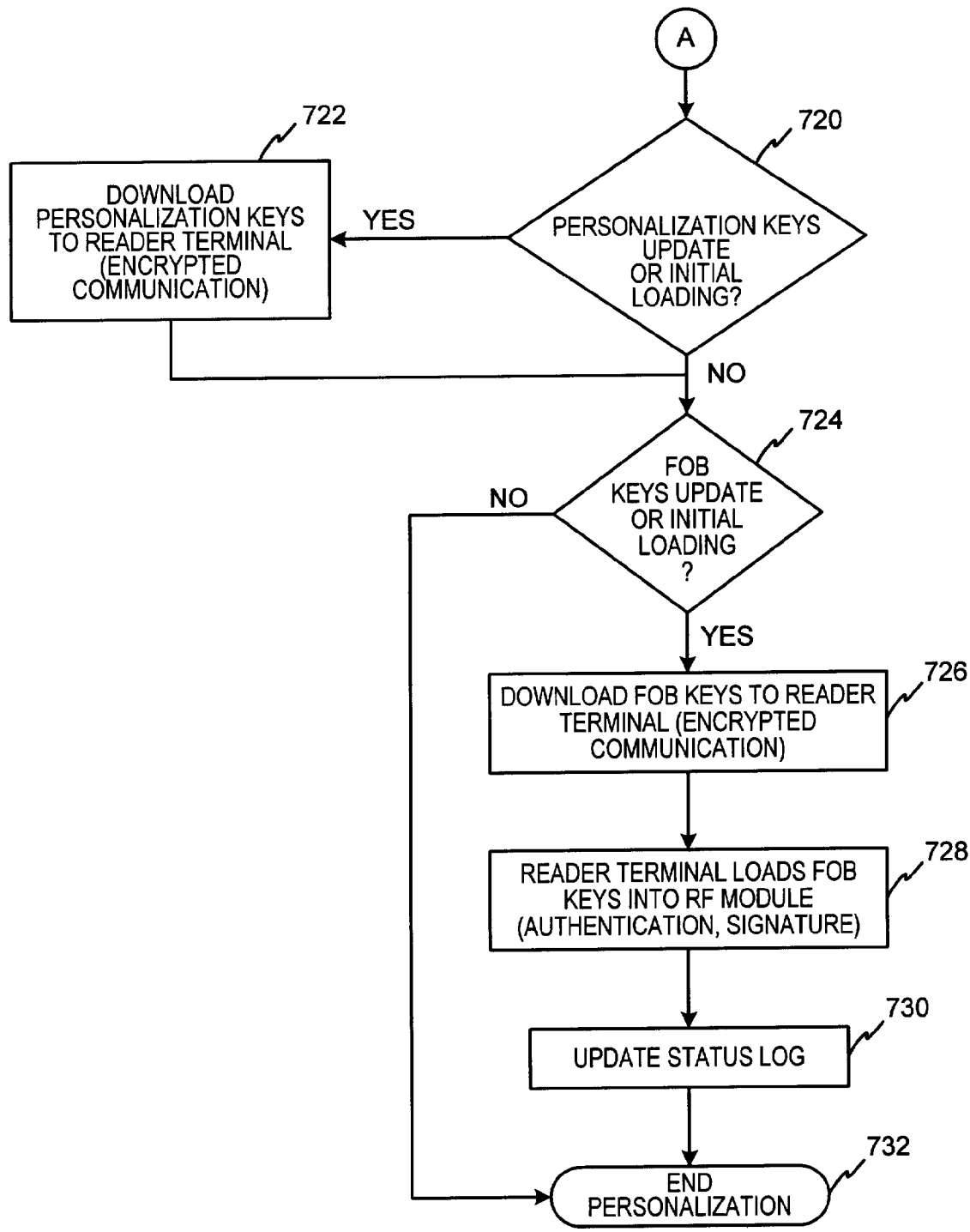

FIGS. 7A-B illustrate another exemplary embodiment of a personalization process which may be used to personalize RFID reader 104. RFID reader 104 may be in communication with a personalization system 116 via RFID reader USB connection 316 (step 702). Once connected, personalization system 116 may establish communications with the RFID reader 104 and RFID reader 104 may provide personalization system 116 any RFID reader 104 identification data presently stored on the RFID reader 104 (step 704). In accordance with step 708, where the RFID reader 104 may be being personalized for the first time (step 706) the RFID reader 104 and the personalization system 116 may engage in mutual authentication as described above with respect to FIGS. 6A-B. After the mutual authentication may be complete, personalization system 116 may verify that RFID reader 104 may be properly manufactured or configured to operate within system 100. The verification may include evaluating the operation of the RFID reader 104 by determining if the RFID reader will accept predetermined default settings. That is, the personalization system 116 may then provide the RFID reader 104 a set of default settings (step 708) and determine if the RFID reader 104 accepts those settings (step 712). If RFID reader 104 does not accept the default settings, personalization system 116 may abort the personalization process (step 714).

If the personalization system 116 determines that the personalization process may be not the first personalization process undertaken by the RFID reader 104 (step 706), personalization system 116 and RFID reader 104 may engage in a mutual authentication process using the existing security keys already stored on RFID reader 104 (step 710). If authentication may be unsuccessful (step 712), the personalization system may abort the personalization process (step 714).

Where the personalization system 116 and the RFID reader 104 successfully mutually authenticate, the personalization system 116 may update the RFID reader 104 security keys (step 716). Updating the security keys may take place at any time as determined by a system 100 manager. The updating may take place as part of a routine maintenance or merely to install current security key data. The updating may be performed by downloading firmware into RFID reader 104 (step 718). In the event that the personalization system determines in step 706 that the RFID reader 104 may be undergoing an initial personalization, the firmware may be loaded into the RFID reader 104 for the first time. In this context, "firmware" may include any file which enables the RFID reader 102 to operate under system 100 guidelines. For example, such guidelines may be directed toward the operation of RFID reader protocol/sequence controller 314.

Personalization system 116 may then determine if the personalization keys (e.g., security keys, decryption keys, RFID identifier, travel-related information) need to be updated or if the RFID reader 104 needs to have an initial installation of the personalization keys (step 720). If so, then personalization system 116 may download the personalization keys as appropriate (step 722).

Personalization system 116 may then check the RFID reader 104 to determine if the fob 102 identifiers and corresponding security keys should be updated or initially loaded (step 724). If no updating may be necessary the personalization system may end the personalization procedure (step 732). Contrarily, if the personalization system 116 determines that the fob 102 identifiers and corresponding keys need to be updated or installed, the personalization system may download the information onto RFID reader 104 (step 726). The information (e.g., fob security keys, identifiers, and travel-related information) may be downloaded in an encrypted format and the RFID reader 104 may store the information in the RFID reader database 310 as appropriate (step 728). The personalization system may then create or update a status log cataloging for later use and analysis by the personalization system 116 user (step 730). Upon updating the status log, the personalization process may be terminated (step 732).

It should be noted that, in some instances it may be necessary to repersonalize the RFID reader in similar manner as described above. In that instance, the personalization method described in FIGS. 7A and 7B may be repeated.

Figure 8:
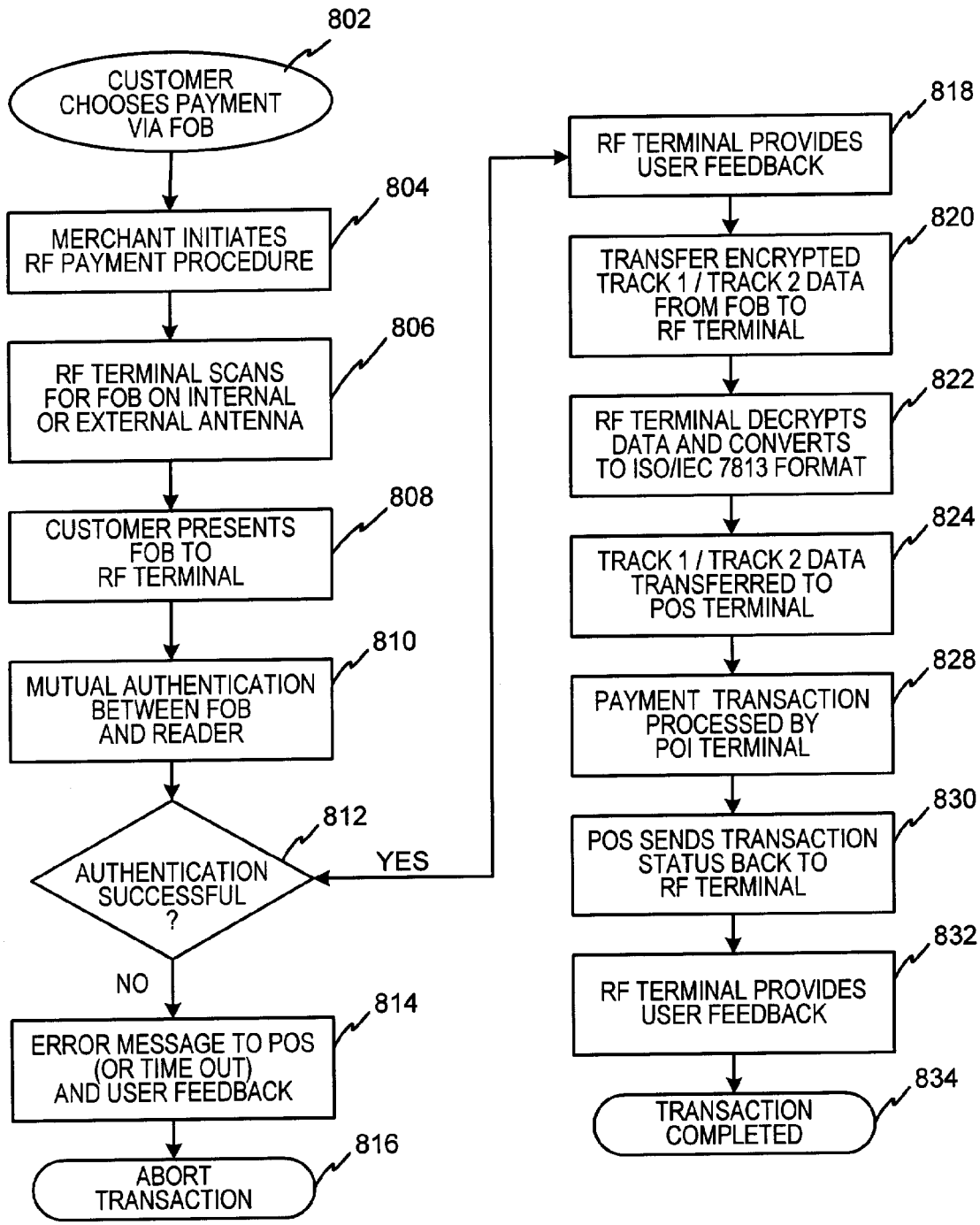
FIG. 8 is a flow diagram of an exemplary payment/transaction process in accordance with the present invention.

FIG. 8 illustrates an exemplary flow diagram for the operation of system 100A. The operation may be understood with reference to FIG. 1A, which depicts the elements of system 100A which may be used in an exemplary transaction. The process may be initiated when a customer desires to present a fob 102 for payment (step 802). Upon presentation of the fob 102, the merchant initiates the RF payment procedure via an RFID reader 104 (step 804). In particular, the RFID reader sends out an interrogation signal to scan for the presence of fob 102 (step 806). The RF signal may be provided via the RFID reader antenna 106 or optionally via an external antenna 108. The customer then may present the fob 102 for payment (step 808) and the fob 102 may be activated by the RF interrogation signal provided.

The fob 102 and the RFID reader 104 may then engage in mutual authentication (step 810). Where the mutual authentication may be unsuccessful, an error message may be provided to the customer via the RFID optical and/or audible indicator (step 814) and the transaction may be aborted (step 816). Where the mutual authentication may be successful (step 812), the RFID reader 104 may provide the customer with an appropriate optical and/or audible message (e.g., "transaction processing" or "wait") (step 818). The fob protocol/sequence controller 208 may then retrieve from database 214 an encrypted fob account number and provide the encrypted account number to the RFID reader 104 (step 820).

The RFID reader 104 may then decrypt the account number and convert the account number into magnetic stripe (ISO/IEC 7813) format (step 822) and provide the unencrypted account number to the merchant system 130 (step 828). In particular, the account number may be provided to the POS 110 device for transmission to the merchant network 112 for processing under known business transaction standards. The POS device 110 may then send an optical and/or audible transaction status message to the RFID reader 104 (step 830) for communication to the customer (step 832) and the transaction completed (step 834).

It should be noted that the transaction account associated with the fob 102 may include a restriction, such as, for example, a per purchase spending limit, a time of day use, a day of week use, certain merchant use and/or the like, wherein an additional verification may be required when using the fob outside of the restriction. The restrictions may be personally assigned by the fob 102 user, or the account provider. For example, in one exemplary embodiment, the account may be established such that purchases above $X (i.e., the spending limit) must be verified by the customer. Such verification may be provided using a suitable personal identification number (PIN) which may be recognized by the RFID reader 104 or a payment authorization center (not shown) as being unique to the fob 102 holder (e.g., customer) and the correlative fob 102 transaction account number. Where the requested purchase may be above the established per purchase spending limit, the customer may be required to provide, for example, a PIN, biometric sample and/or similar secondary verification to complete the transaction.

Where a verification PIN may be used as secondary verification the verification PIN may be checked for accuracy against a corroborating PIN which correlates to the fob 102 transaction account number and/or the fob user's travel-related information. The corroborating PIN may be stored locally (e.g., on the fob 102, or on the RFID reader 104) or may be stored on a database (not shown) at the payment authorization center. The payment authorization center database may be any database maintained and operated by the fob 102 transaction account provider.

The verification PIN may be provided to the POS device 110 using a conventional merchant (e.g., POS) PIN key pad 118 in communication with the POS device 110 as shown in FIG. 1, or a RFID keypad in communication with the RFID reader 104. PIN keypad may be in communication with the POS device 110 (or alternatively, RFID reader 104) using any conventional data link described above. Upon receiving the verification PIN, the RFID reader 104 may seek to match the PIN to the corroborating PIN stored on the RFID reader 104 at database 310 or 320. Alternatively, the verification PIN may be provided to a payment authorization center to determine whether the PIN matches the PIN stored on the payment authorization center database which correlates to the fob 102 account. If a match may be made, the purchase may no longer be restricted, and the transaction may be allowed to be completed.

In another exemplary embodiment of the present invention, system 100 may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. While the example discussed herein may include a particular biometric system or sample, the invention contemplates any of the biometrics discussed herein in any of the embodiments.

The biometric system may be configured as a security system and may include a registration procedure in which a user of transaction instrument (e.g., fob 102) proffers a sample of his fingerprints, DNA, retinal scan, voice, and/or other biometric sample to an authorized sample receiver (ASR). An ASR may include a local database, a remote database, a portable storage device, a host system, an issuer system, a merchant system, a fob issuer system, an employer, a financial institution, a non-financial institution, a loyalty point provider, a company, the military, the government, a school, a travel entity, a transportation authority, a security company, and/or any other system or entity that is authorized to receive and store biometric samples and associate the samples with specific biometric databases and/or transaction instruments (e.g., fobs 102). As used herein, a user of a fob, fob user, or any similar phrase may include the person or device holding or in possession of the fob, or it may include any person or device that accompanies or authorizes the fob owner to use the fob. By proffering one or more biometric samples, a biometric may be scanned by at least one of a retinal scan, iris scan, fingerprint scan, hand print scan, hand geometry scan, voice print scan, vascular scan, facial and/or ear scan, signature scan, keystroke scan, olfactory scan, auditory emissions scan, DNA scan, and/or any other type of scan to obtain a biometric sample.

Upon scanning the sample, the system may submit the scanned sample to the ASR in portions during the scan, upon completing the scan or in batch mode after a certain time period. The scanned sample may include a hardcopy (e.g., photograph), digital representation, an analog version or any other configuration for transmitting the sample. The ASR receives the sample and the ASR may also receive copies of a fob user's biometric data along with the sample or at a different time (or within a different data packet) from receiving the sample.

The ASR and/or fob user 102 may store the sample in digital and/or any storage medium known in the art and correlate and/or register the sample with fob user information. By storing the sample in digital format, the ASR may digitize any information contained in one of the biometric scans described herein. By storing the sample in any storage medium, the ASR may print and/or store any biometric sample. Hardcopy storage may be desirable for back-up and archival purposes. As used herein, registered samples may include samples that have been proffered, stored and associated with user information.

The biometric sample may also be associated with user information. The sample may be associated with user information at any step in the process such as, for example, prior to submission, during submission and/or after submission. In one embodiment, the user may input a PIN number or zip code into the POS terminal, then scan the biometric to create the biometric sample. The local POS system may associate the biometric sample data with the PIN and zip code, then transmit the entire packet of information to the ASR. In another embodiment, the POS may facilitate transmitting the sample to an ASR, and during the transmission, the sample may be transmitted through a third system which adds personal information to the sample.

The information associated with the biometric sample may include any information such as, for example, fob user information, fob 102 information, fob 102 identifier information, fob 102 vender information, fob 102 operability information, and/or fob 102 manufacturing information. Fob 102 information is not limited to transponder information and may include information related to any transaction instrument such as smart cards, credit cards, debit cards, merchant-specific cards, loyalty point cards, cash accounts and any other transaction instruments and/or accounts. The fob user information may also contain information about the user including personal information—such as name, address, and contact details; financial information—such as one or more financial accounts associated with the fob user; loyalty point information—such as one or more loyalty point accounts (e.g., airline miles, charge card loyalty points, frequent diner points) associated with the fob user; and/or non-financial information—such as employee information, employer information, medical information, family information, and/or other information that may be used in accordance with a fob user.

For example, fob user may have previously associated a credit card account, a debit card account, and a frequent flier account with his biometric sample which is stored at an ASR. Later, when fob user desires to purchase groceries, fob user may submit his biometric sample while using fob 102 for the purchase at a POS. The POS may facilitate sending the biometric sample to the ASR such that the ASR authorizes the biometric sample and checks a look-up table in the ASR database to determine if any information is associated with the sample. If information (e.g., financial accounts) is associated with the sample, the ASR may transmit the information to the POS terminal. The POS terminal may then present fob user with a list of the three accounts associated with the biometric sample. Fob user and/or a merchant may then chose one of the accounts in order to continue and finalize the transaction.

The ASR and/or fob user may associate a specific fob 102 identifier with the biometric sample by any method known in the art for associating an identifier (e.g., through the use of software, hardware and/or manual entry.) The ASR may additionally verify the fob user and/or fob 102 by using one or more forms of the user's secondary identification. For example, the ASR may verify the fob user by matching the fob information to information retrieved from scanning information from a fob user's driver's license. The ASR may verify fob 102 by contacting the vendor of fob 102 to confirm that fob 102 was issued to a specific fob user. In another embodiment, the ASR may activate fob 102 during the registration procedure to confirm that the fob 102 transponder identifier and other information is properly associated with the fob user and the fob user's specific biometric samples. The ASR may additionally employ one or more verification methods to confirm that the biometric sample belongs to the user, such as, for example, the ASR may request from the user demographic information, further biometric samples and/or any other information. As used herein, "confirm", "confirmation" or any similar term includes verifying or substantially verifying the accuracy, existence, non-existence, corroboration, and/or the like of the information, component, or any portion thereof. The ASR may additionally employ one or more additional processing methods in order to facilitate association of a biometric sample. As used herein, the term processing may include scanning, detecting, associating, digitizing, printing, comparing, storing, encrypting, decrypting, and/or verifying a biometric and/or a biometric sample, or any portion thereof.

Upon association, authentication and/or verification of the biometric sample and fob 102, the system may store the sample and fob 102 identifier in one or more databases on and/or in communication with system 100 via a network, server, computer, or any other means of communicating as described herein. The database(s) may be any type of database described herein. For example, a biometric sample stored on fob 102 may be stored in database 212. The database(s) may be located at or operated by any of the entities discussed herein such as, for example, the ASR and/or by a third party biometric database operator.

The system may further protect the samples by providing additional security with the sample. The security may include, for example, encryption, decryption, security keys, digital certificates, firewalls and/or any other security methods known in the art and discussed herein. One or more security vendors may utilize the security methods to store and/or access the biometric samples. The present invention anticipates that storage of the biometric samples may be such that a sample is first encrypted and/or stored under a security procedure, such that the sample may only be accessed by a vendor with the proper level of access or security which corresponds to or provides access to the stored sample. The samples may be accessible by certain vendors such as, for example, fob 102 transaction account provider system, an issuer system, a merchant system, a fob issuer system, an employer, a financial institution, a non-financial institution, a loyalty-point provider, a company, the military, the government, a school, a travel entity, a transportation authority, and/or a security company.

Figure 9:
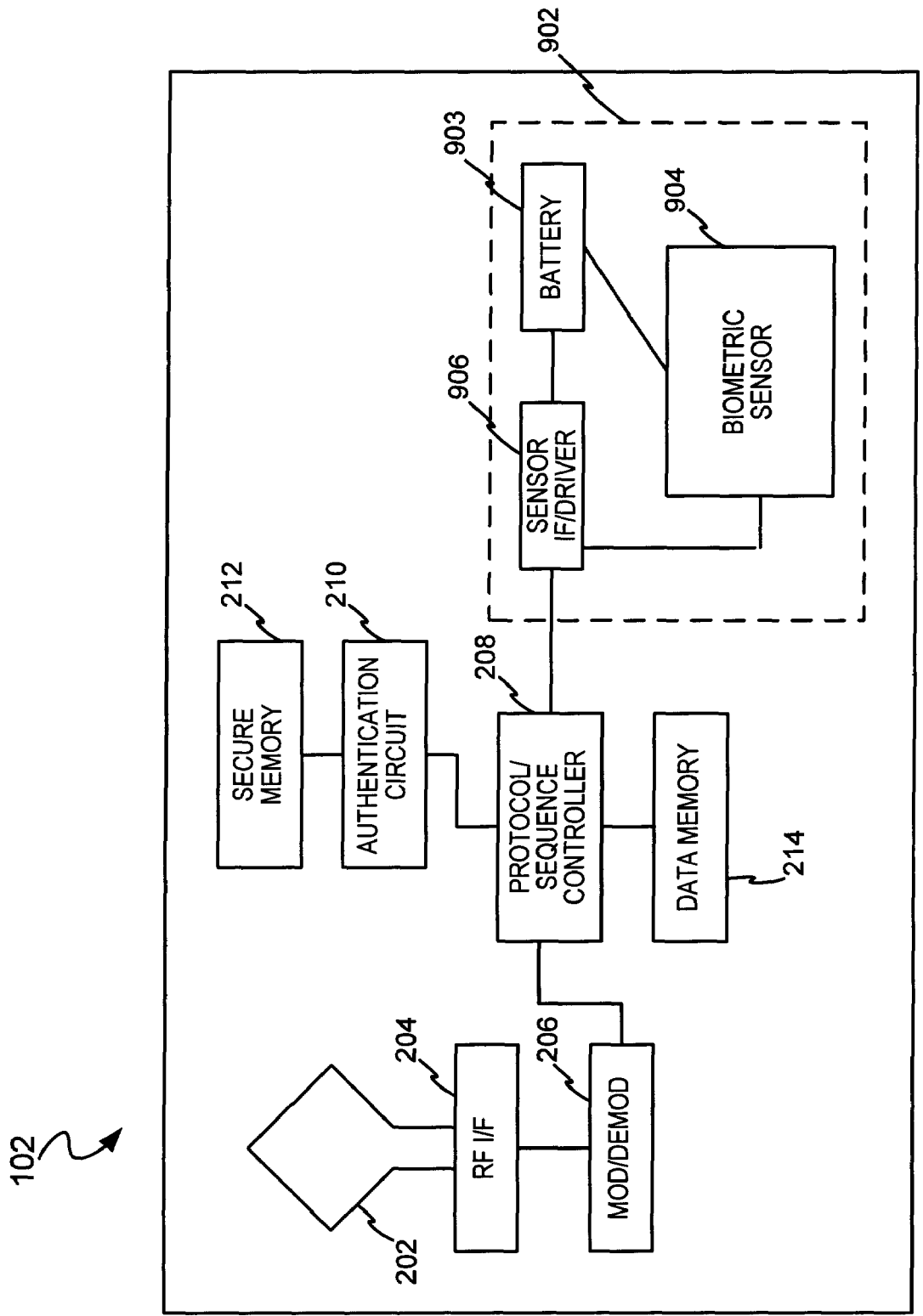
FIG. 9 is another schematic illustration of an exemplary fob in accordance with the present invention.

The fob of the invention may include a particular security system wherein the security system incorporates a particular biometric system. As shown in FIG. 9, fob 102 includes a biometric security system 902 configured for facilitating biometric security using, for example, fingerprint samples. As used herein, fingerprint samples may include samples of one or more fingerprints, thumbprints, palmprints, footprints, and/or any portion thereof. Biometric security system 902 may include a biometric sensor 904 which may be configured with a sensor and/or other hardware and/or software for acquiring and/or processing the biometric data from the person such as, for example, optical scanning, capacitance scanning, or otherwise sensing the portion of fob user. In one embodiment, biometric sensor 904 of the security system 902 may scan a finger of a fob user in order to acquire his fingerprint characteristics into fob 102. Biometric sensor 904 may be in communication with a sensor interface/driver 906 such that sensor interface 906 receives the fingerprint information and transmits a signal to controller 208 to facilitate activating the operation of fob 102. A power source (e.g., battery 903) may be in communication with biometric sensor 904 and sensor interface 906 to provide the desired power for operation of the biometric security system components.

In one exemplary application of fob 102 incorporating biometric security system 902, the user may place his finger on the biometric sensor to initiate the mutual authentication process between fob 102 and RFID reader 104, and/or to provide verification of the user's identity. Fob 102 may digitize the fingerprint and compare it against a digitized fingerprint stored in a database (e.g., security database 212) included on fob 102. The fingerprint information may additionally be compared with information from one or more third-party databases communicating with fob 102 through any communication software and/or hardware, including for example, RFID reader 104, a USB connection, a wireless connection, a computer, a network and/or any other means for communicating. This transfer of information may include use of encryption, decryption, security keys, digital certificates and/or other security devices to confirm the security of the sample. Fob 102 may additionally communicate with third-party databases to facilitate a comparison between fob 102 identifier and other fob identifiers stored with the biometric samples. As used herein, compare, comparison and similar terms may include determining similarities, differences, existence of elements, non-existence of elements and/or the like.

Protocol/sequence controller 208 may facilitate the local comparison to authenticate the biometric and authentication circuit 210 may validate the information. Any of the embodiments may alternatively or additionally include remote comparisons performed or controlled by one or more third-party security vendors. One or more comparison techniques and/or technologies may be used for comparisons. For example, for fingerprint comparisons, protocol/sequence controller 208 may utilize an existing database to compare fingerprint minutia such as, for example, ridge endings, bifurcation, lakes or enclosures, short ridges, dots, spurs and crossovers, pore size and location, Henry System categories such as loops, whorls, and arches, and/or any other method known in the art for fingerprint comparisons.

Fob 102 may additionally be configured with secondary security procedures to confirm that fake biometric samples are not being used. For example, to detect the use of fake fingers, fob 102 may be further configured to measure blood flow, to check for correctly aligned ridges at the edges of the fingers, and/or any other secondary procedure to reduce biometric security fraud. Other security procedures for ensuring the authenticity of biometric samples may include monitoring pupil dilation for retinal and/or iris scans, pressure sensors, blinking sensors, human motion sensors, body heat sensors and/or any other procedures known in the art for authenticating the authenticity of biometric samples.

After verifying the biometric information, fob 102 and RFID reader 104 may begin mutual authentication, and the transaction may proceed accordingly. However, the invention contemplates that the verification of biometric information may occur at any point in the transaction such as, for example, after the mutual authentication. At any point in the transaction, the system may additionally request fob user to enter a PIN and/or other identifier associated with the transaction account and/or biometric sample to provide further verification of fob user's identification. As part of the transaction, fob user payer may be requested to select from one of the financial accounts, loyalty accounts, credit accounts, debit account, and/or other accounts associated with the biometric sample. The user may be presented with a list of account options on a display associated with RFID reader 104, fob 102, a third-party security device and/or any other financial or transaction device association with a transaction. In another embodiment, a payee may select one of the accounts. For example, a department store payee may manually and/or automatically select a department store issued account, if available, for a transaction.

Figure 10:
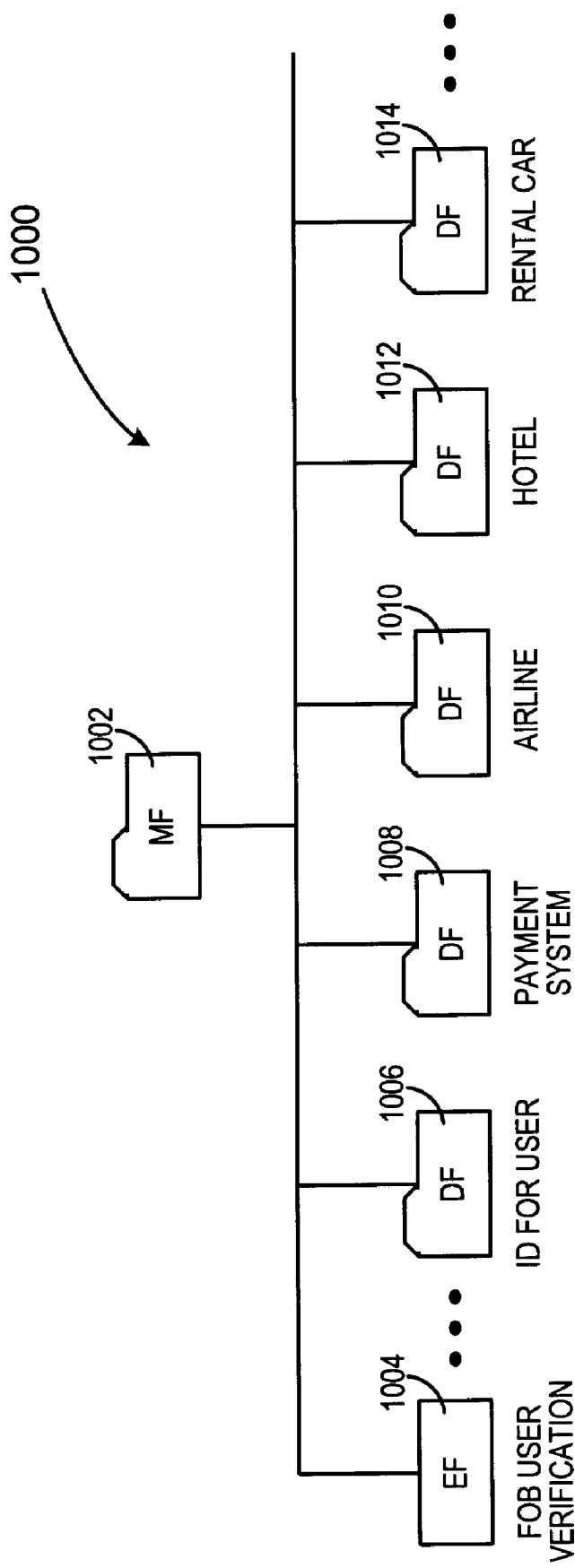
FIG. 10 sets forth an exemplary database structure in accordance with a preferred embodiment of the present invention.

Having thus described an exemplary fob 102 and databases 214, 310, an overview of a fob file structure contained on a database in accordance with the present invention will now be described. Referring now to FIG. 10, file structure 1000 may be used, in an exemplary embodiment, to store travel-related information related to fob user. As used herein, travel-related information refers to preferences and various data useful for securing and paying for air travel, rental cars, hotel reservations, activity reservations, transportation reservations, restaurant reservations and the like. File structure 1000 comprises, for example, fob/transponder user identification (ID) application 1006, payment system application 1008, airline application 1010, hotel system application 1012, rental car application 1014, and fob user verification data 1004. File structure 1000 is not limited to the applications depicted and may include, for example, activities, restaurant, and any other travel-related applications. It will be appreciated by those skilled in the art that the term "application" in this context refers to self-contained regions of data all directed at a particular function (e.g., airline, hotel, etc.) rather than a block of executable software code, although the use of executable modules as part of any particular application falls within the scope of the present invention.

Fob user verification data 1004 houses, in one embodiment, data useful in verifying fob user identity during a transaction. In a preferred embodiment, fob user verification data 1004 comprises a fob user verification number (i.e., PIN number).

Fob user ID application 1006 suitably comprises various files related to personal information of the fob user (e.g., name, addresses, payment accounts, driver's license, personal preferences and the like). Fob user ID application 1006 may also comprise various files relating to transponder 114, including a transponder identifier. The phrases "fob user identification" and "transponder user identification" may be used interchangeably. Fob user ID application 1006 may be described in greater detail below in conjunction with FIG. 11.

Payment system application 1008 suitably comprises information useful in effecting commercial transactions, e.g., account number and expiration date information traditionally stored on a magnetic-stripe credit card. Alternatively, payment system application 1008 comprises a full EMV-compliant application suitable for a wide range of financial transactions. Payment system application 1008 may be described further below in conjunction with FIG. 13.

Airline application 1010 suitably comprises data helpful in streamlining commercial airline travel; for example, relevant personal preferences, electronic tickets, and frequent flier information. Airline application 1010 may be discussed in greater detail below in conjunction with FIG. 14.

Hotel application 1012 suitably comprises information useful for securing and paying for hotel reservations, including an array of information and preferences associated with a list of preferred hotels as well space for electronic keys. Hotel application 1012 may be discussed in greater detail below in conjunction with FIG. 16.

Rental car application 1014 suitably comprises data useful in expediting the process of car rental and return, including, for example, car preference and frequent rental information. Rental car application 1014 may be described in further detail below in conjunction with FIG. 15.

In each of the above mentioned applications, sophisticated access and encryption schemes are, in one embodiment, utilized in order to allow multiple parties to make use of certain file structures while preventing unauthorized entry into others. More specifically, partnering organizations (e.g., hotel chains, airlines, and rental car agencies) may create their own tailor-made file structures (i.e., "partner file structures") within fob 102. Details of the various security measures employed are described in further detail below in conjunction with Table 39.

Figure 17:
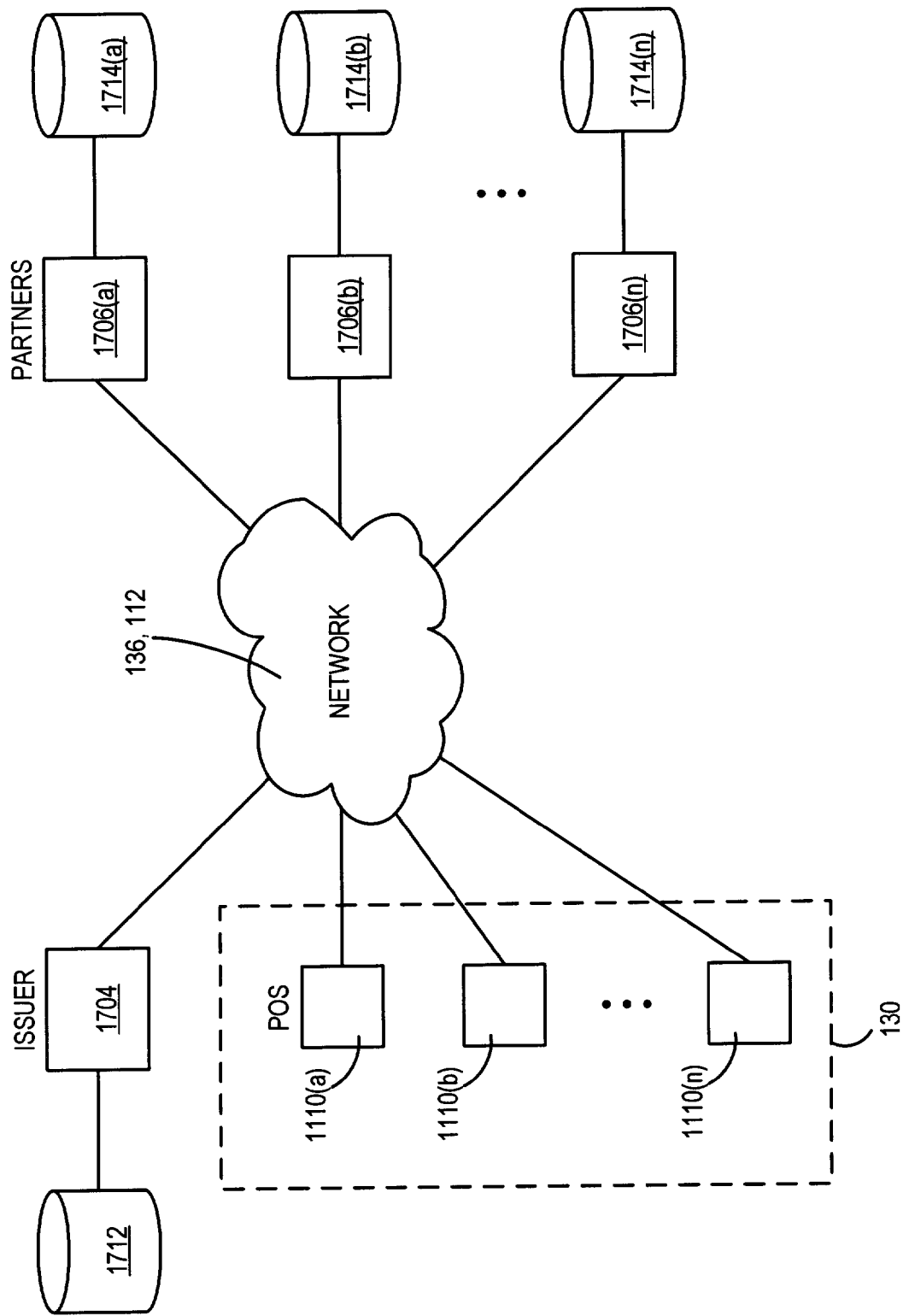
FIG. 17 illustrates an exemplary distributed transaction system useful in practicing the present invention.

Referring now to FIG. 17, fob 102 may be suitably used in the context of a distributed transaction system. Briefly, fob user's may employ fob 102 at various POS devices 110 which are connected via network 136 and/or network 112 to issuer system 1704 and at least one partnering organization 1706. Issuer 1704 may be in communication with merchant system 130. Issuer system 1704 may also be maintained by any entity (e.g., non-financial or financial institution, American Express®, Visa® and/or MasterCard®, etc.) which permits fob 102 user to store account information (e.g., data file) maintained on an issuer database 1712 of similar construction as database 212. As shown, POS device 110 (included in merchant system 130) may be in communication with issuer 1704 through network 136, 112 for receiving the fob account information from POS device 110. Issuer 1704 suitably comprises various hardware and software components suitable for client host communications as well as a database system 1712. In this context, the term "issuer" refers to the organization that actually issues the fob and retains some high-level access to certain areas of file structure 1000 (detailed below).

Partnering organizations 1706(*a*), 1706(*b*), and so on, comprise the various hotel chains, rental-car agencies, airlines, and the like, who have access to appropriate data regions within fob 102. Each partnering organization 1706 suitably comprises a database 1714 and appropriate hardware and software components necessary for completing a transaction over network 136, 112. Network 136, 112 may comprise one or more communication modes (e.g., the public switched telephone network (PSTN), the Internet, digital and analog wireless networks, and the like).

Each POS device 110 suitably comprises an appropriate RFID reader for interfacing with fob 102 as well as hardware and software suitable for interfacing with a fob user and performing a transaction over network 136, 112. POS devices 110 are, in one embodiment, located in areas providing convenient access for traveling fob user's or fob user's preparing travel arrangements. Such POS devices 110 may be located, for example, in airline ticketing and gate areas, rental car facilities, hotel lobbies, travel agencies, and stand-alone kiosks in malls. In addition, businesses might see fit to host POS device 110 to streamline their employees" business travel. Furthermore, an individual fob user might configure his or her personal computer to act as a POS using appropriate software and peripheral hardware.

Figure 18:
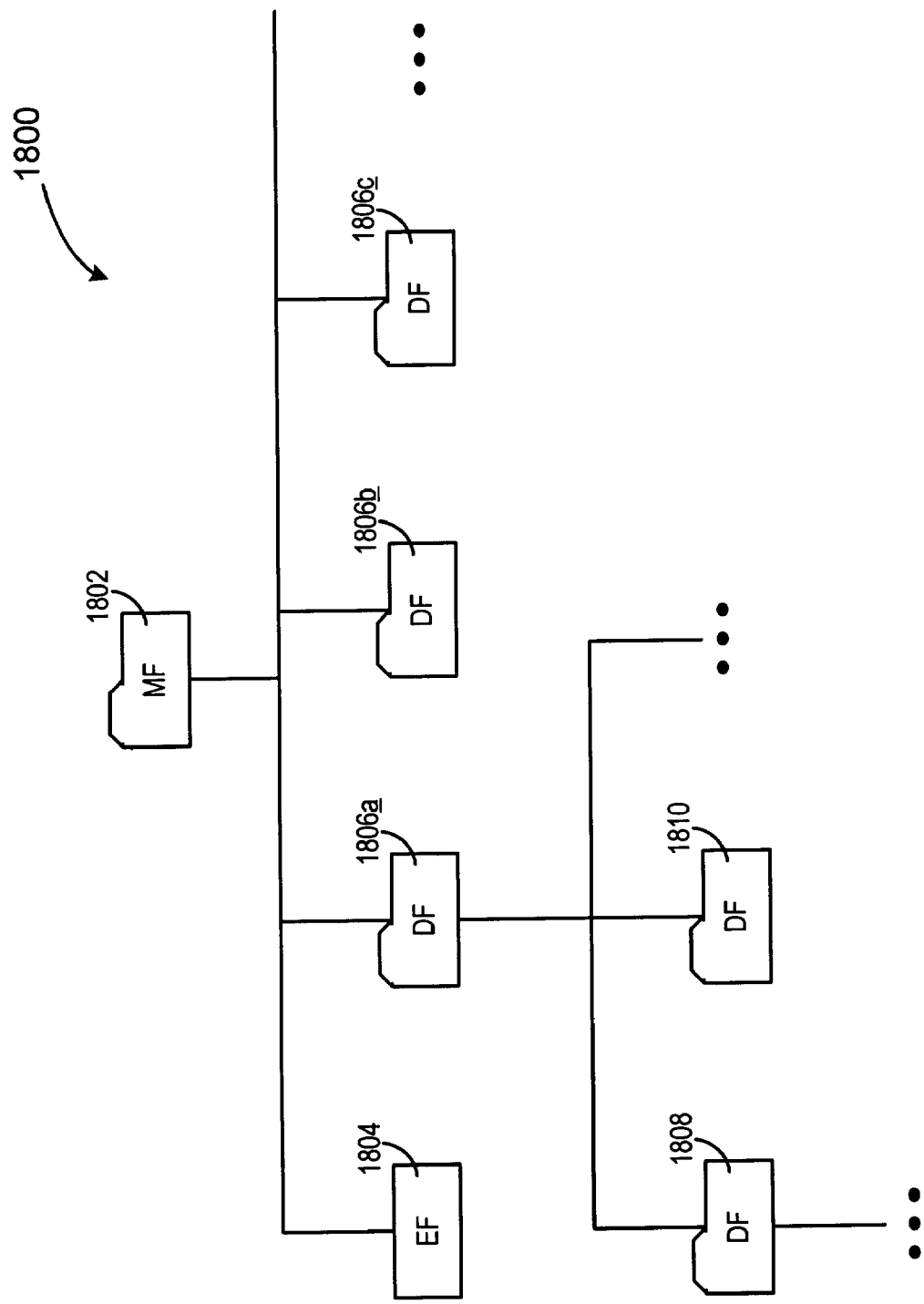
FIG. 18 is an exemplary diagram of files and directories arranged in a typical tree structure.

In a preferred embodiment of the present invention, data files and directories are stored in a "tree" structure as illustrated in FIG. 18. That is, the fob file structure resembles the well known MS-DOS (Microsoft Disk Operating System) file structure wherein files are logically organized within a hierarchy of directories. Specifically, three types of files are defined in ISO 7816-4: dedicated files (DF), elementary files (EF), and a master file (MF). The master file may be analogous to the MS-DOS "root" directory, and contains all other files and directories. Dedicated files are actually directories or "folders" for holding other DFs or EFs. Thus, MF 1802 may contain an arbitrary number of DFs 1806, and these DFs (e.g., DF 1806(*a*)) may or may not contain other DFs (e.g., DF 1808). Elementary files are used to store user data, and may exist within a dedicated file (e.g., EF 1810 within DF 1806(*a*)), or within the master file (e.g., EF 1804 within MF 1802). Higher level DFs (i.e., DFs which house particular applications) are often referred to as application dedicated files (ADFs).

The MF and each of the DFs and EFs are assigned a unique two-byte file identifier (FID). By convention, the MF may be traditionally assigned an FID of "3F00" hex. Selection of an EF or DF by the operating system may then be performed by tracing its entire path starting at the MF. Thus, if the MF contains a DF with a FID "A100", and this DF in turn contains an EF with a FID "A101", then this EF could be referenced absolutely by successive selection of FIDs 3F00, A100, and A101. It will be appreciated that the FID may be essentially a file name used by the operating system to select directories and files; it may be not intended to indicate a physical address within database 212.

Each file, in one embodiment, has an associated file header containing various indicia of the particular EF, DF, or MF. More particularly, the file header associated with a particular file, in one embodiment, includes the file identifier (FID), file size, access conditions, and file structure. In this regard, fob 102 suitably employs one of four file structures: transparent, linear fixed, linear variable, or cyclic. For the sake of completeness, the nature of these file structures will be briefly reviewed.

A transparent file structure consists of a string of bytes accessed by specifying an offset and byte count. For example, with reference to Table 1 below, given a n-byte string of data, bytes 7 through 10 would be accessed using an offset of six and a length of four.

TABLE 1

Transparent file structure
byte#

| 1 | 2 | 3 | 4 | 5 | 6 | 7 | 8 | 9 | 10 | 11 | 12 | 13 | 14 | ... | ... | n |
|---|---|---|---|---|---|---|---|---|----|----|----|----|----|-----|-----|---|
| ----------offset--------> | | | | | | <---- length ----> | | | | | | | | | | |

A linear fixed file structure comprises a plurality of records of equal length (e.g., a list of phone numbers), wherein access to an individual record may be achieved through reference to a record number. In addition, it may be possible to refer to the "next" or "previous" record relative to the "current" record (i.e., the most recently accessed record). In contrast, a linear variable file structure comprises records of arbitrary but known length, and may be therefore typically more compact than linear fixed data structures.

A cyclic file structure may be a type of linear fixed file wherein a pointer may be used to point to the last data set written to. After the last data record may be written to, the pointer returns to the first record. That is, a cyclic file comprises a series of records arranged in a "ring". A data structure particularly important with regard to storing records as well as secure messaging in fob applications may be the BER tag-length-value or "TLV" structure in accordance with ISO/IEC 8825, hereby incorporated by reference. In a TLV object, information regarding the type and length of the information may be included along with the actual data. Thus, a TLV object comprises a tag which identifies the type of data (as called out by the appropriate specification), a length field which indicates the length in bytes of the data to follow, and a value field, which comprises the primary data. For example, the TLV object illustrated in Table 2 below encodes the text "phoenix", which has a length of 7 bytes, and corresponds to a the "city" tag of "8C" hex (a hypothetical tag designation).

TABLE 2

Exemplary primitive TLV object

| Tag | Length | Value |
|-----|--------|-------|
| '8C' | '07' | p h o e n i x |

It will be appreciated that the meaning of the various tag values must be known to the system a priori. That is, in order for the tag field to be useful, the fob and any external systems communicating with the fob must conform to the same tag specification. In this regard, ISO/IEC 7816-6 defines a series of tags useful in the context of the present invention, as does the IBM MFC 3.2 specification. ISO/IEC 8825 sets forth the basic encoding rules for a TLV system and defines a "template" data object which can be used as a container for multiple TLV objects. That is, it may be often advantageous to encapsulate primitive TLV objects within a larger template which may be itself a TLV object.

Referring now to FIG. 10, a preferred fob data structure in accordance with the present invention will now be described in detail. Data structure 1000, in one embodiment, comprises a MF 1002 and five DFs: Fob user ID application 1006, Payment system application 1008, Airline application 1010, Hotel application 1012, and Rental car application 1014.

In the detailed description to follow, various acronyms and abbreviations will be used to refer to particular data types, formats, and the like. A key to these acronyms and abbreviations may be presented in Table 3 below.

TABLE 3

Key to acronyms

| AN | Alphanumeric |
|----|--------------|
| N | Numeric |
| B | Boolean |
| C | Convention |
| M | Matrix |
| D | Data |
| AR | Bits array |
| BIN | Binary |
| RJ | Right-justified |
| LJ | Left-justified |
| BCD | Binary coded decimal |

In the discussion that follows, the various features of a preferred data structure are in some cases described using particular file structure types (i.e., transparent, fixed, etc.). Those skilled in the art will realize, however, that any of the common fob file structure types are typically suitable for implementing any particular data structure. For example, when a file structure may be described as including "a plurality of records," it will be understood that such a structure may be designed, for example, using a list of records assembled in a linear fixed file wherein each record may be itself a transparent file (and offset values correspond to the various fields). Alternatively, such a structure may be designed using TLV strings assembled in a linear fixed file or within a larger template TLV. This may be the case notwithstanding the fact that particular tag values which are for the most part arbitrary are not explicitly listed in the tables that follow.

Figure 11:
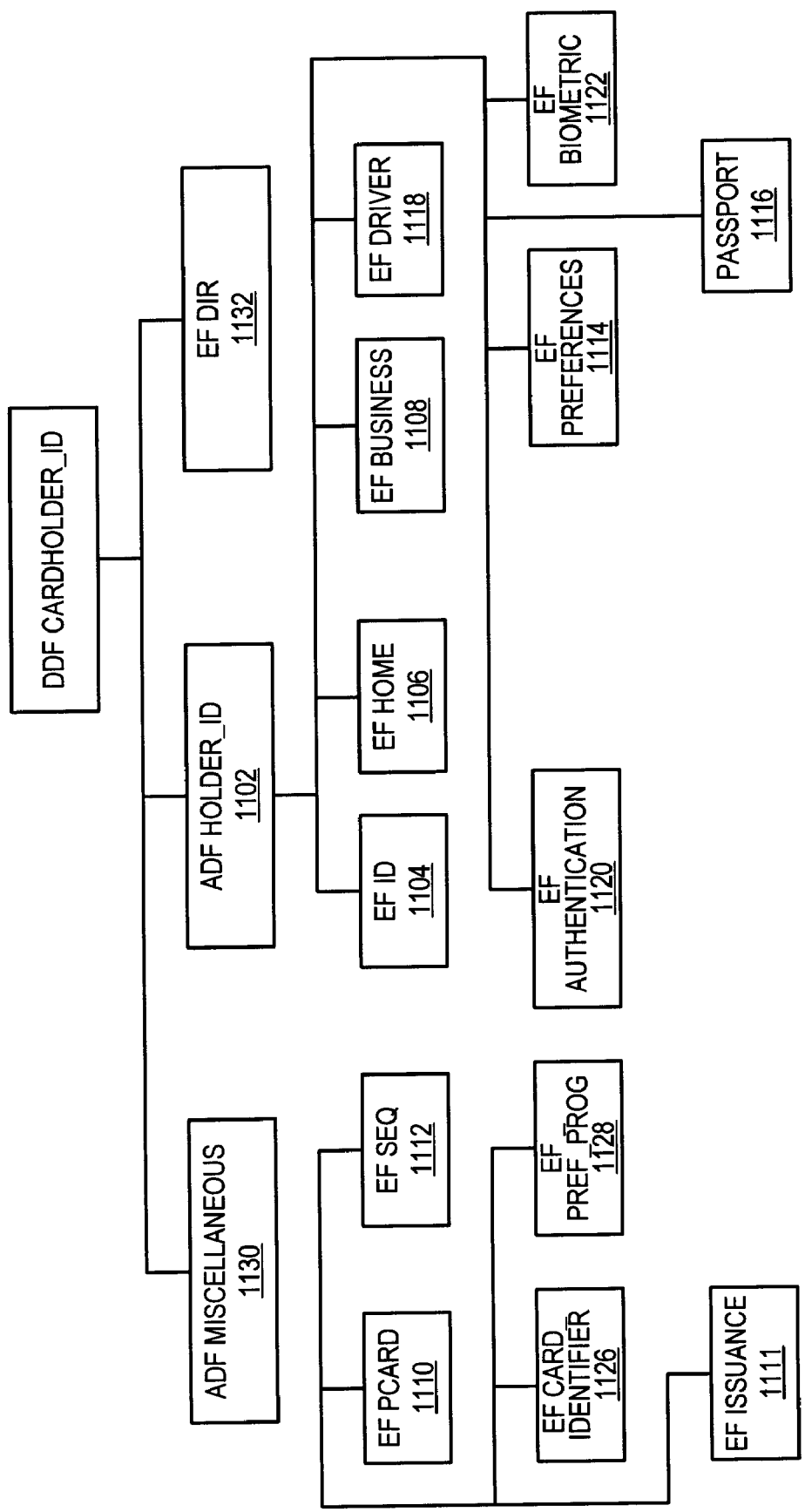
FIG. 11 sets forth a preferred cardholder ID data structure in accordance with the present invention.

Referring now to FIG. 11, Fob user ID application 1006 may be used to store various information related to the fob user. Portions of this information are freely available to the partnering organizations, thereby preventing the storage of redundant information.

More particularly, fob user ID application 1006, in one embodiment, comprises directory EF 1132, user_ID DF 1102 and miscellaneous DF 1130. User_ID DF 1102, in one embodiment, comprises ID EF 1104, home EF 1106, business EF 1108, preferences EF 1114, passport EF 1116, authentication EF 1120, biometric EF 1122, and driver EF 1118. Miscellaneous EF 1130, in one embodiment, comprises Payment account EF 1110, sequence EF 1112, issuance EF 1111, preferred programs EF 1128, and fob identifier EF 1126. These files and their respective functions are discussed in detail below.

Directory EF 1132 provides a list of application identifiers and labels for the various high-level DF's existing under fob user ID application 1006. That is, this file serves the function of a high-level directory listing which specifies the location (i.e., FID) and application label for each DF in this case, user_ID DF 1102 and miscellaneous DF 1130. In a particular embodiment, directory EF 1132 may be structured in accordance with EMV 3.0 as shown in Table 4 below. In one embodiment, each major application (e.g., hotel, airline, etc.) has an associated directory file with a substantially same file structure.

TABLE 4

Exemplary fob user ID directory EF

| | External format | | Internal format(bytes) | |
|---|---|---|---|---|
| Record description | Size | Type | Size | Type |
| Application ID for user_ID DF | 16 | AN | 16 | ASCII |
| Application label | 16 | AN | 16 | ASCII |
| Application ID for miscellaneous DF | 16 | AN | 16 | ASCII |
| Application label | 16 | AN | 16 | ASCII |

ID EF 1104 in one embodiment, includes personal information related to the fob user, e.g., name, date of birth, emergency contact, general preferences, and the like. In a particular embodiment, member EF 1104 comprises the fields set forth in Table 5 below. Italicized field names indicate a subcategory within a particular field.

TABLE 5

Exemplary ID EF data structure

| | External format | | Internal format(bytes) | |
|---|---|---|---|---|
| Record description | Size | Type | Size | Type |
| Last Name | 30 | AN | 30 | ASCII |
| First Name | 20 | AN | 20 | ASCII |
| Middle Name | 8 | AN | 8 | ASCII |
| Honorary Title | 8 | AN | 8 | ASCII |
| Name Suffix | 4 | AN | 4 | ASCII |
| Date of Birth | 8 | D | 4 | BCD |
| Social Security Number | 10 | AN | 10 | ASCII |
| *Emergency Contact* | | | | |
| Last Name | 20 | AN | 20 | ASCII |
| First Name | 10 | AN | 10 | ASCII |
| Relation | 1 | C | 1 | BIN |
| Phone | 20 | N | 10 | BCD |
| Gender | 1 | AN | 1 | ASCII |
| Special Personal Requirements | 12 | AN | 12 | M |
| Language Preference (ISO 639) | 2 | C | 2 | ASCII |

In the above table, and the tables to follow, both internal and external data formats are listed. As the conservation of database space may be of paramount importance, the "internal" format of data (i.e., within database 212) may be different from the "external" format of the data (i.e., as read by the RFID reader at POS device 110). Thus, for example, a date field might consist of a four-byte BCD record within the fob, but upon reading and processing by the terminal, this data might be converted to an eight-byte decimal value for more convenient processing.

Home EF 1106, in one embodiment, includes data related to one or more of the fob user's home addresses. In a particular embodiment, home EF 1106 comprising the fields set forth in Table 6 below. The personal travel charge account pointer may be, in one embodiment, used to designate a preferred payment account, and consists of a number corresponding to one of the payment account records within Payment account EF 1110 (detailed below).

TABLE 6

Exemplary home EF file structure

| Record description | External format | | Internal format(bytes) | |
|---|---|---|---|---|
| | Size | Type | Size | Type |
| Home Address 1 | 40 | AN | 40 | ASCII |
| Home Address 2 | 40 | AN | 40 | ASCII |
| Home Address City | 25 | AN | 25 | ASCII |
| Home Address State | 5 | AN | 5 | ASCII |
| Home Country (ISO 3166) | 2 | AN | 2 | ASCII |
| Home Address Zip Code | 10 | AN | 10 | ASCII |
| Home Address Telephone | 20 | N | 10 | BCD |
| Home Address FAX | 20 | N | 10 | BCD |
| Home E-mail address | 40 | AN | 40 | ASCII |
| Personal travel charge account number pointer | 2 | N | 1 | BCD |

Business EF 1108, in one embodiment, includes various data related to the fob user's business (i.e., addresses, phone numbers, and the like). In a particular embodiment, business EF 1108 comprising the fields set forth in Table 7 below. In this regard, the credit card pointer field may be, in one embodiment, used to point to a payment account record within Payment account EF 1110 (detailed below). The cost center, dept., division, and employee ID fields are employer-specific, and may or may not apply in a given case.

TABLE 7

Exemplary business EF file structure

| Record description | External format | | Internal format(bytes) | |
|---|---|---|---|---|
| | Size | Type | Size | Type |
| Business Address 1 | 40 | AN | 40 | ACSII |
| Business Address 2 | 40 | AN | 40 | ASCII |
| Business Address City | 25 | AN | 25 | ASCII |
| Business Address State | 5 | AN | 5 | |
| Business Country (ISO 3166) | 2 | AN | 2 | ASCII |
| Business Address Zip Code | 10 | AN | 10 | ASCII |
| Business Telephone No. | 20 | N | 10 | BCD |
| Business Address Fax | 20 | N | 10 | BCD |
| Business E-mail Address | 40 | AN | 40 | ASCII |
| Professional Title | 10 | AN | 10 | ASCII |
| Employee ID | 10 | AN | 10 | ASCII |
| Division | 20 | AN | 20 | ASCII |
| Dept | 20 | AN | 20 | ASCII |
| Cost Center | 12 | AN | 12 | ASCII |
| Professional travel account number pointer | 2 | N | 2 | BCD |
| Professional license data | 20 | AN | 20 | ASCII |

TABLE 7-continued

Exemplary business EF file structure

| Record description | External format | | Internal format(bytes) | |
|---|---|---|---|---|
| | Size | Type | Size | Type |
| Credit Card pointer | 2 | N | 1 | BCD |
| Company Name | 20 | AN | 20 | ASCII |

Preferences EF 1114, in one embodiment, comprises data related to the fob user's default personal preferences. In a particular embodiment, preferences EF 1114 includes a field comprising an array of preferences as set forth in Table 8 below. Preference values are, in one embodiment, chosen from a list of preference tags as set forth in Table 39.

TABLE 8

Exemplary preferences EF file structure

| Record description | External format | | Internal format(bytes) | |
|---|---|---|---|---|
| | Size | Type | Size | Type |
| Preferences Array | 20 | C | 20 | C |

Passport EF 1116 may be, in one embodiment, used to store fob user passport information. In a particular embodiment, passport EF 1116 comprises the fields set forth in Table 9 below.

TABLE 9

Exemplary passport EF file structure

| Record description | External format | | Internal format(bytes) | |
|---|---|---|---|---|
| | Size | Type | Size | Type |
| Passport Number | 20 | AN | 20 | ASCII |
| Passport Country - ISO 3166 | 2 | AN | 2 | ASCII |
| Issuance Date | 8 | D | 4 | BCD |
| City of Issuance | 20 | AN | 20 | AN |
| Expiration Date | 8 | D | 4 | BCD |

Driver EF 1116, in one embodiment, comprises fob user driver license data. In a particular embodiment, driver EF 1118 comprising the fields set forth in Table 10 below.

TABLE 10

Exemplary driver EF file structure

| Record description | External format | | Internal format(bytes) | |
|---|---|---|---|---|
| | Size | Type | Size | Type |
| Driver's License No. | 20 | a | 20 | ASCII |
| Driver's License Issuing State/Country | 2 | a | 2 | BCD |
| License Expiration Date | 8 | D | 4 | ASCII |
| License Type | 2 | C | 4 | BCD |

Biometric EF 1122 may be used to store biometric data (e.g., encoded) such as fingerprint data, retina scan data, or any other sufficiently unique indicia the fob user's physical or behavioral characteristics. In a particular embodiment, biometric EF 1122 comprises a single data string as set forth in Table 11 below.

TABLE 11

Exemplary biometric EF file structure

| | External format | | Internal format (bytes) | |
|---|---|---|---|---|
| Record description | Size | Type | Size | Type |
| Biometrics template | 100 | AN | 100 | BIN |

Authentication EF 1120, in one embodiment, comprises information for static authentication of the fob user ID 1006 application. This data may be unique for each fob, and may be sufficiently complex such that counterfeit values cannot feasibly be created. This prevents creation of "new" counterfeit fobs (i.e., fobs with new authentication data), but does not prevent creation of multiple copies of the current fob.

In a particular embodiment, authentication EF 1120 includes public key certificate fields as shown in Table 12 below, wherein the external format may be identical to the internal format. In one embodiment, the issuer RSA key may be 640 bits long, and the CA key may be 768 bits long.

TABLE 12

Exemplary authentication EF

| | Internal format(bytes) | |
|---|---|---|
| Record description | Size | Type |
| Signed Static Application Data | 80 | B |
| Static Data Authentication Tag List | 16 | B |
| Issuer Public Key Certificate | 96 | B |
| Issuer Public Key Exponent | 1 | B |
| Issuer Public Key Remainder | 20 | B |

Turning now to files under miscellaneous DF 1130, preferred programs EF 1128, in one embodiment, comprises data related to the fob user's preferences as to airline companies, hotels, and rental car agencies. Specifically, this EF, in a particular embodiment, comprises a plurality of records (e.g., three) indicating preferred companies for each type of travel partner as shown in Table 13. The actual data values conform to an arbitrary convention; that is, each airline, hotel, and rental car agency may be assigned an arbitrary three-byte code.

TABLE 13

Exemplary programs EF

| | External format | | Internal format(bytes) | |
|---|---|---|---|---|
| Record description | Size | Type | Size | Type |
| Preferred Airlines | 9 (3 × 3) | C | 9 | C |
| Preferred Hotels | 9 | C | 9 | C |
| Preferred Rental Cars | 9 | C | 9 | C |

Payment account EF 1110 may be, in one embodiment, used to catalog information related to the fob user's various payment accounts, i.e., debit accounts, credit card accounts, and the like. In a particular embodiment, Payment account EF comprises account numbers and expiration dates for two accounts as shown in Table 14. The "ISO" and "non-ISO" designations refer to ISO-7813, which specifies a particular payment account number format. Thus, in a preferred embodiment, either an ISO or non-ISO account number scheme may be used. Moreover, it will be appreciated that this data set may be sufficient only for "fob not present" transactions, for example, transactions taking place remotely where only the account number and expiration date are required to effect a transaction. Data stored within payment system application 1008 (described below) must be used to effect a "fob present" transaction.

TABLE 14

Exemplary Payment Account EF file structure

| | External format | | Internal format(bytes) | |
|---|---|---|---|---|
| Record description | Size | Type | Size | Type |
| First Payment Account# (ISO) | 19 | N | 10 | BCD |
| First Payment Account Expiration Date | 8 | D | 4 | BCD |
| Second Payment Account# (non-ISO) | 20 | AN | 20 | ASCII |
| Second Payment Account Expiration Date | 8 | D | 4 | BCD |

Sequence EF 1112, in one embodiment, includes information used to provide synchronization of the host and fob databases. In a particular embodiment, sequence EF 1112 comprises a plurality of records comprising the field set forth in Table 15 below. This number may be analogous to a "version" number for the data stored in the application.

TABLE 15

Exemplary sequence EF file structure

| | External format | | Internal format(bytes) | |
|---|---|---|---|---|
| Record description | Size | Type | Size | Type |
| Sequence Number | 16 | AN | 16 | ASCII |

Fob identifier EF 1126 may be used to record a unique identifier identifying the fob, and may also be used for key derivation (as described in further detail below). In one embodiment, fob identifier EF 1126 comprises a eight-byte string as set forth in Table 16 below.

TABLE 16

Exemplary Fob Identifier EF

| | External format | | Internal format(bytes) | |
|---|---|---|---|---|
| Record description | Size | Type | Size | Type |
| Fob Identifier | 8 | HEX | 8 | HEX |

Issuance EF 1111 may be used to record various details related to the manner in which the application (i.e., fob user ID DF 1006) was created. This file includes information related to the identity of the organization that created the application, as well as information related to the application itself. In a particular embodiment, issuance EF 1111 comprises fields as set forth in Table 17 below.

TABLE 17

Exemplary issuance EF file structure

| Field | External format | | Internal format (bytes) | |
|---|---|---|---|---|
| | Size | Type | Size | Type |
| Country Authority | | ISO 3166 | 2 | |
| Issuer Authority | 10 | RID - ISO 7816-5 | 5 | HEX |
| Application version | 5 | XX.YY | 2 | BCD |
| Application expiration date | 8 | YYYYMMDD | 4 | BCD |
| Application effective date | 8 | YYYYMMDD | 4 | BCD |
| Personalizer Code | 1 | AN | 1 | ASCII |
| Personalization Location | 1 | AN | 1 | ASCII |

The personalizer code field shown in Table 17 refers to the organization that actually "personalizes" the file. That is, before a fob may be issued to the fob user, the database structure must be created within database 212 (FIG. 2), and the initial data values (i.e., default preferences, fob user name, pin numbers, etc.) must be placed in the appropriate fields within the various EFs. It will be appreciated that, given the nature of the present invention, the fob "issuer" and "personalizer" for any given application may not be the same. Therefore, it may be advantageous to record various details of the personalization process within fob 102 itself. Similar issuance file structures may be provided for the other major applications.

Figure 13:
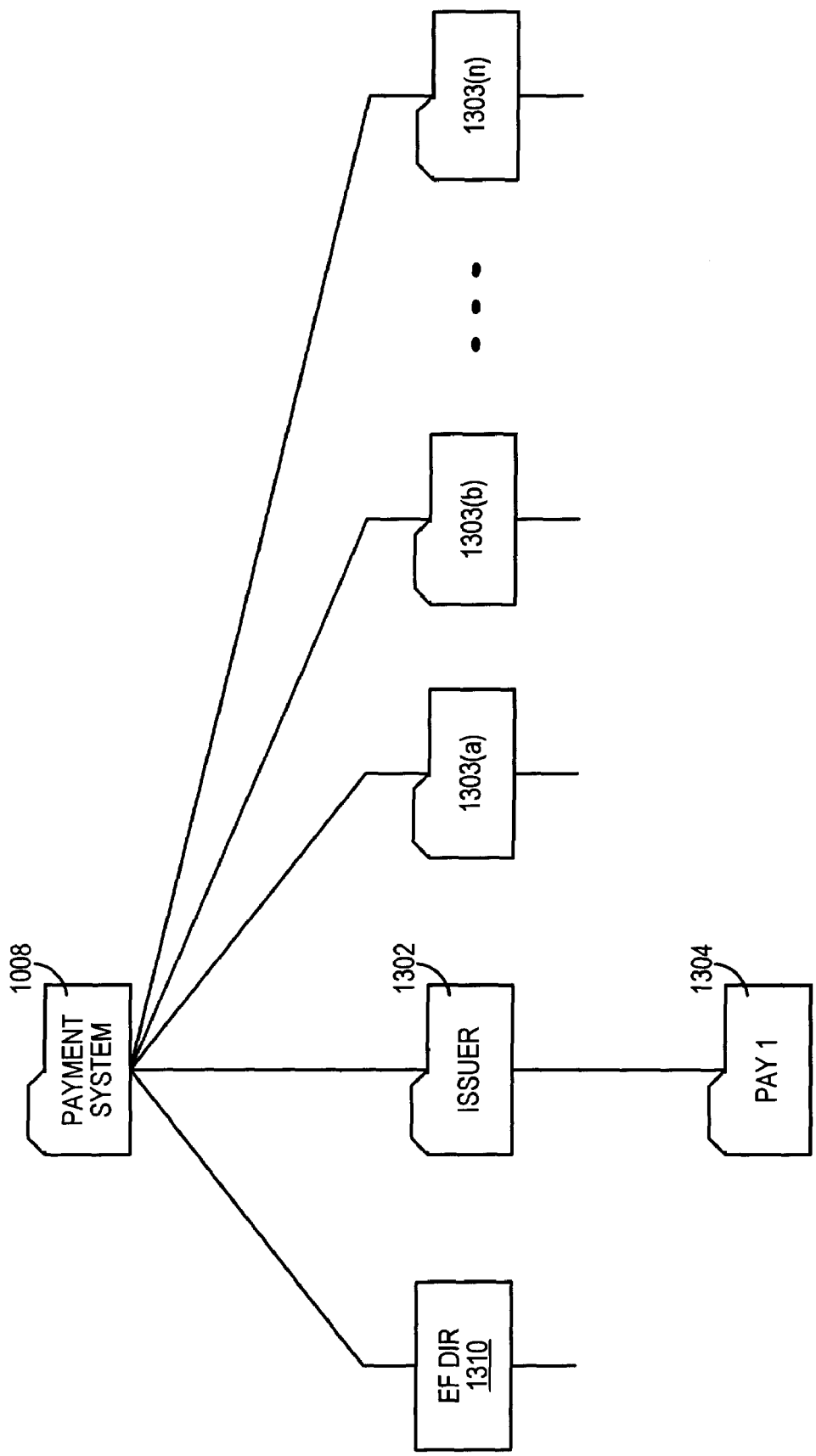
FIG. 13 sets forth a preferred payment system data structure in accordance with the present invention.

Referring now to FIG. 13, payment system application 1008, in one embodiment, comprises a directory EF 1310, issuer DF 1302, and a number of optional DFs 1303(*a*)-(*n*) for use by partnering financial organizations.

Directory EF 1310, in one embodiment, includes a list of application identifiers and labels as described above in the context of fob user ID application 1006.

Issuer DF 1302 comprises pay1 DF 1304, which includes data that would traditionally be stored within tracks on a magnetic stripe card (i.e., debit cards, charge cards, and the like). In a preferred exemplary embodiment, pay1 DF 1304 comprises a plurality of records having commonly known magnetic-stripe fields as specified in Table 18 below.

TABLE 18

Exemplary Pay1 EF file structure

| Record description | External format | | Internal format(bytes) | |
|---|---|---|---|---|
| | Size | Type | Size | Type |
| Format Code (Track 1) | 1 | AN | 1 | ASCII |
| PAN (Track 2) | 15 | N | 8 | BCDF right padding |
| Expiration date (Track 1 or 2) | 4 | YYMM | 2 | BCD |
| Effective date (Track 1 or 2) | 4 | YYMM | 2 | BCD |
| Discretionary data (Track 1 or 2) | 5 | N | 3 | BCDF right padding |
| Name (Track 1) | 26 | AN | 26 | ASCII, LJ blank padding |

Figure 14:
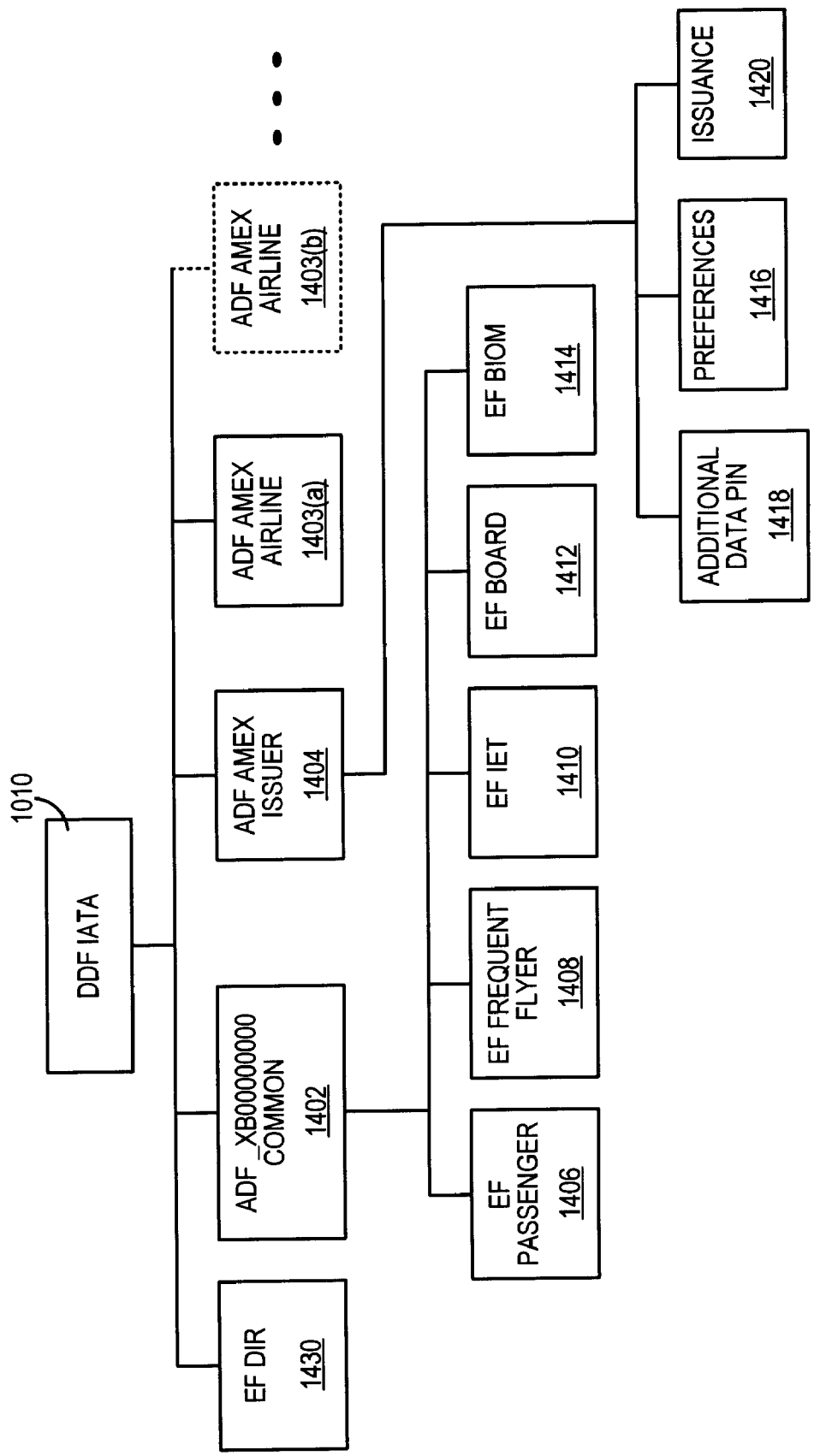
FIG. 14 sets forth a preferred airline data structure in accordance with the present invention.

Referring now to FIG. 14, airline application 1010, in one embodiment, comprises directory EF 1430, common DF 1402, and issuer DF 1404, and additional airline applications 1403(*a*), 1403(*b*), and so on.

Directory EF 1430, in one embodiment, includes a list of application identifiers and labels as described above in the context of fob user ID application 406.

Common DF 1402 generally includes data accessible to all participating airlines, while issuer DF 1404 generally includes data which can only be read or written to by the fob issuer. Airline application 1010, in one embodiment, further comprises at least one (may be three) additional DF 1403 for use by airline partnering organizations. That is, one airline partner may have access to and specify the structure of data stored within DF 1403(*a*) (as well as common EF 1402), while another airline might have similar access to DF 1403(*b*). These partner DFs, in one embodiment, conform to the relevant portions of the IATA specification.

Common DF 1402 suitably comprises common data which would be of use to any of the various partnering airlines, i.e., passenger EF 1406, frequent flier EF 1408, IET EF 1410, boarding EF 1412, and biometric EF 1414. Issuer DF 1404, in contrast, comprises information readable by all, but updateable only by the card issuer, i.e., preferences EF 1416, PIN EF 1418, and issuance EF 1420.

Referring now to information stored within common EF 1402, passenger EF 1406, in one embodiment, comprises various records related to the passenger as specified in Table 19 below.

TABLE 19

Exemplary passenger EF file structure

| Record description | External format | | Internal format (bytes) | |
|---|---|---|---|---|
| | Size | Type | Size | Type |
| Passenger Name | 49 | AN | 49 | ASCII |
| Gender | 1 | A | 1 | BIN |
| Language Preference | 2 | AN | 2 | ASCII |
| Unique ID | 24 | AN | 24 | ASCII |
| Airline ID (3 letters code) | 3 | AN | 3 | ASCII |
| Type code (2 letters) | 2 | AN | 2 | ASCII |
| Unique ID | 19 | AN | 19 | ASCII |
| Application version | 1 | N | 2 | BIN |

In a particular embodiment, frequent flyer EF 1408 comprises a plurality of frequent flier numbers (e.g., ten numbers) having the structure specified in Table 20 below.

TABLE 20

Exemplary frequent flyer EF file structure

| Record description | External format | | Internal format (bytes) | |
|---|---|---|---|---|
| | Size | Type | Size | Type |
| Airline Customer ID | 22 | AN | 22 | ASCII |

IET EF 1410, in one embodiment, comprises a plurality of electronic ticket records as set forth in Table 21 below. The format of these electronic tickets, in one embodiment, conforms to the IATA standard.

TABLE 21

Exemplary IET file structure

| Description of the records | External format | | Internal format (bytes) | |
|---|---|---|---|---|
| | Size | Type | Size | Type |
| IET 1 | 14 | AN | 14 | BIN |
| IET 2 | 14 | AN | 14 | BIN |
| IET 3 | 14 | AN | 14 | BIN |
| IET 4 | 14 | AN | 14 | BIN |
| IET 5 | 14 | AN | 14 | BIN |

In a particular embodiment, boarding EF 1412 comprises boarding data to be used during check in as specified in Table 22. The format of this data, in one embodiment, conforms to the IATA specification.

TABLE 22

Exemplary boarding EF file structure

| Record description | External format | | Internal format (bytes) | |
|---|---|---|---|---|
| | Size | Type | Size | Type |
| Boarding data | 40 | AN | 40 | ASCII |

Biometric EF 1414 may be suitably used to store biometric data associated with the fob user, e.g., retina scan data, fingerprint data, or any other sufficiently unique indicia of the fob user's physical or behavioral characteristics. In a particular embodiment, biometric EF 1414 comprises data as specified in Table 23 below.

TABLE 23

Exemplary biometric EF file structure

| Record description | External format | | Internal format (bytes) | |
|---|---|---|---|---|
| | Size | Type | Size | Type |
| Biometrics data | 100 | AN | 100 | BIN |

Issuance EF 1420 may be suitably used to hold data related to the issuance of the various applications. In a particular embodiment, issuance EF 1420 comprises a data structure as specified in Table 24 below.

TABLE 24

Exemplary issuance EF file structure

| Field | External format | | Internal format (bytes) | |
|---|---|---|---|---|
| | Size | Type | Size | Type |
| Country Authority (2 letters) | | ISO 3166 | 2 | |
| Issuer Authority | 10 | RID - ISO 7816-5 | 5 | HEX |
| Application version | 5 | XX.YY | 2 | BCD |
| Application expiration date | 8 | YYYYMMDD | 4 | BCD |
| Application effective date | 8 | YYYYMMDD | 4 | BCD |
| Personalizer Code | 1 | AN | 1 | ASCII |
| Personalization Location (custom code) | 1 | AN | 1 | ASCII |

PIN EF 1418 may be suitably used to store PIN values corresponding to each of the participating airline partners. In a particular embodiment, PIN EF 1418 comprises a plurality of records having the structure specified in Table 25 below, wherein each record may be related to the corresponding entry in frequent flyer EF 1408 (i.e., record one in EF 1418 corresponds to record one in EF 1408, and so on.)

TABLE 25

Exemplary PIN EF file structure

| Record description | External format | | Internal format (bytes) | |
|---|---|---|---|---|
| | Size | Type | Size | Type |
| PIN | 8 | AN | 8 | BIN |
| Expiration date | 8 | D | 4 | BCD |

Preferences EF 1416, in a particular embodiment, comprises a preferences array as shown in Table 26 below. The preference values stored in this file correspond to those discussed below in conjunction with Table 38.

TABLE 26

Exemplary preferences EF 1416 file structure

| Record description | External format | | Internal format (bytes) | |
|---|---|---|---|---|
| | Size | Type | Size | Type |
| Preferences Array | 8 | C | 8 | BIN |

Figure 15:
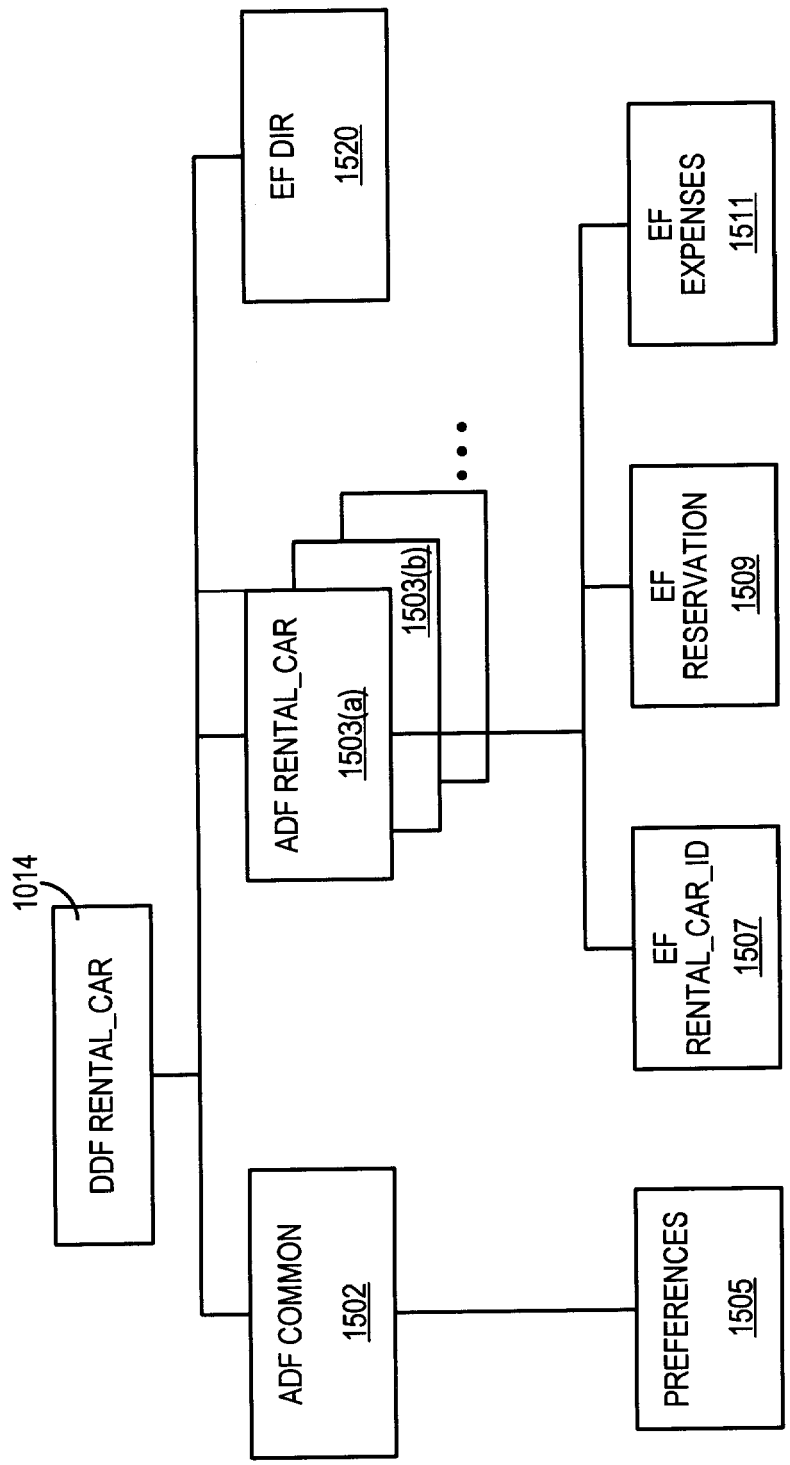
FIG. 15 sets forth a preferred rental car data structure in accordance with the present invention.

Referring now to FIG. 15, rental car application 1014, in one embodiment, comprises common DF 1502, directory EF 1520, and one or more rental_car DFs 1503 (i.e., 1503(*a*), 1503(*b*), and so on) corresponding to individual rental car agencies. Common DF comprises preferences EF 1505, which may be described in detail below. Rental_car DFs 1503 each comprise a rental_car_id EF 1507, reservation EF 1509, and expenses EF 1511. Directory EF 1520 includes a list of application identifiers and labels for the various DFs under rental car application 1514. The structure of this EF, in one embodiment, conforms to that described above in the context of fob user ID application 406.

In a particular embodiment, preferences EF 1505 comprises a set of preferences arrays file structure as shown in Table 27 below. A preferred list of preference codes for use in each of these arrays may be described below in conjunction with Table 38.

TABLE 27

Exemplary preferences EF

| Record description | External format | | Internal format(bytes) | |
|---|---|---|---|---|
| Preferences Array (Default) | 8 | C | 8 | BIN |
| Preferences Array (No. 2) | 8 | C | 8 | BIN |
| Preferences Array (No. 3) | 8 | C | 8 | BIN |
| Preferred limousine company | 12 | AN | 12 | ASCII |

Rental_car_id 1507 may be used to store frequent rental information, upgrade information, insurance information, and the like. In a particular embodiment, rental_car_id 1507 comprises a file structure as shown in Table 28 below.

TABLE 28

Exemplary rental_car_id EF

| Record description | External format | | Internal format(bytes) | |
|---|---|---|---|---|
| Frequent Rental ID# | 22 | A | 22 | ASCII |
| Company name | 3 | A | 3 | ASCII |
| Unique Customer ID | 19 | A | 19 | ASCII |
| CDP (Contract Disc. Program) | 10 | A | 10 | ASCII |
| Accumulated points | 8 | N | 3 | BIN |

TABLE 28-continued

Exemplary rental_car_id EF

| Record description | External format | Internal format(bytes) | |
|---|---|---|---|
| Rental features | AR | 2 | BIN |
| Car Type Upgrade | B | 1 bit | B |
| Week-end/Vacation Special | B | 1 bit | B |
| Guaranteed Late Reservation | B | 1 bit | B |
| Insurance | Array | 2 | BIN |
| Loss Damage Waiver (LDW) | B | 1 bit | B |
| Personal Automobile Insurance | B | 1 bit | B |
| Personal Effects Coverage | B | 1 bit | B |
| Personal Insurance | B | 1 bit | B |
| Corporate Insurance | B | 1 bit | B |

Reservation EF 1509 may be used to store confirmation numbers corresponding to one or more rental car reservations. In a particular embodiment, reservation EF 1509 comprises a plurality of records (e.g., two) having a file structure as shown in Table 29 below.

TABLE 29

Exemplary reservation EF

| Record description | External format | Internal format(bytes) | |
|---|---|---|---|
| Rental Car Company | 3 | A | 3 | ASCII |
| Location | 3 | A | 3 | ASCII |
| Date | 8 | D | 4 | BCD |
| Time | 4 | T | 2 | BCD |
| Reservation Number | 15 | A | 15 | ASCII |
| Flight Number | 5 | M | 5 | BIN |
| Airlines | 3 | AN | 3 | ASCII(RJ) |
| Flight number | 4 | N | 2 | BCD |
| Preferred profile | 1 | C | 1 | ASCII |

Expenses EF 1511 may be used to record expenses incurred by the fob user during car rental (e.g., the total rental charge). In a particular embodiment, expenses EF 1511 comprises a plurality of records (e.g., five) having a file structure as shown in Table 30 below.

TABLE 30

Exemplary expenses EF

| Record description | External format | Internal format(bytes) | |
|---|---|---|---|
| Type of expense | 1 | C | 1 | ASCII |
| Date | 8 | D | 4 | BCD |
| Location code | 3 | AN | 3 | ASCII |
| Amount | 7 | N | 3 | BIN |

Figure 16:
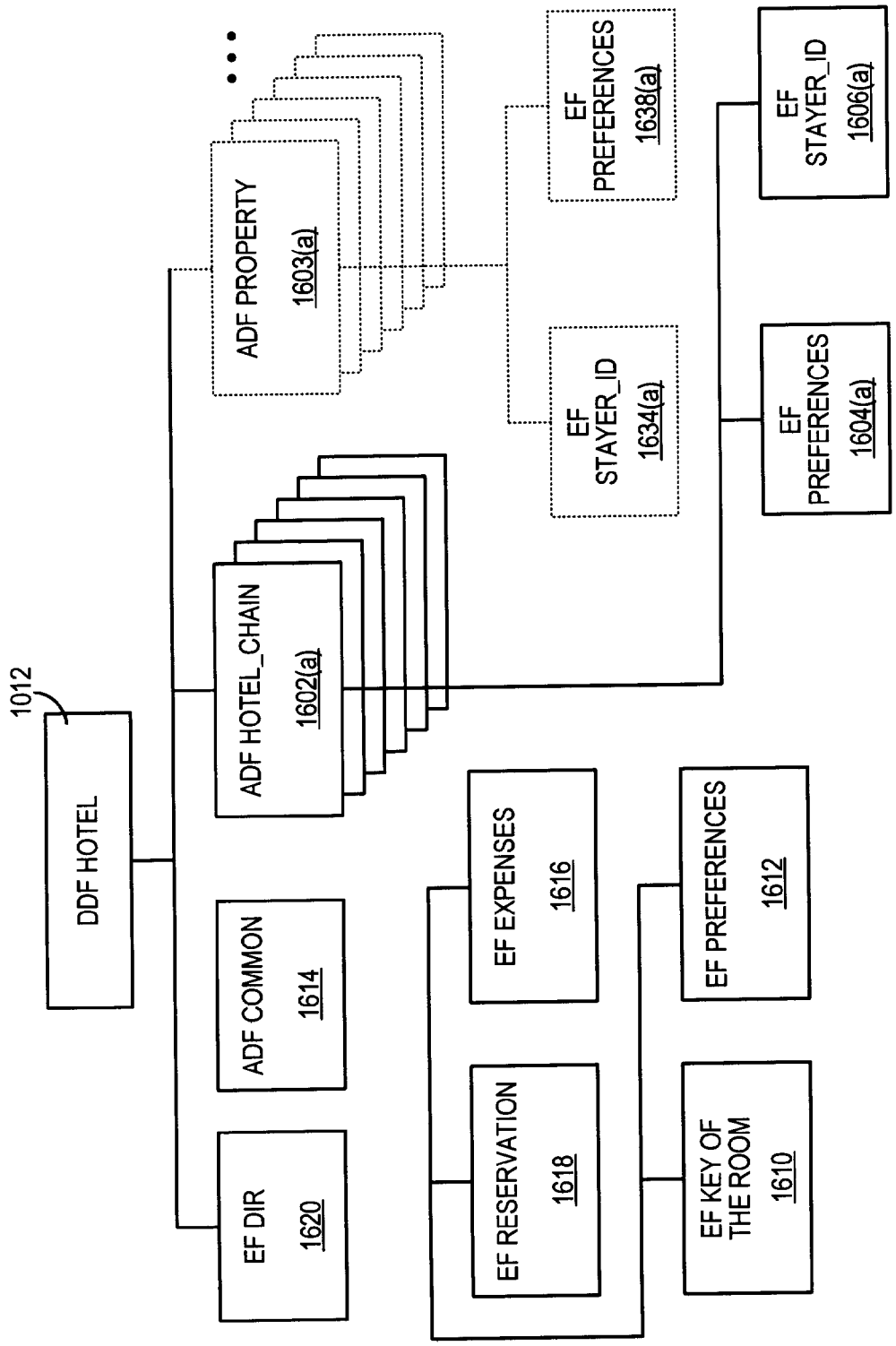
FIG. 16 sets forth a preferred hotel system data structure in accordance with the present invention.

Referring now to FIG. 16, hotel system application 1012, in one embodiment, comprises directory EF 1620, common DF 1614, one or more hotel chain DFs 1602, and one or more property DFs 1603. Common DF 1614 comprises reservation EF 1618, expenses EF 1616, key-of-the-room EF 1610, and preferences EF 1612.

Hotel chain EFs 1602(*a*), 1602(*b*), and so on, comprise preferences EF 1604 and stayer ID EF 1606 associated with individual hotel chains. In contrast, property EFs 1603(*a*), 1603(*b*), and so on, comprise a similar file structure associated with individual hotel properties (i.e., independent of whether the particular hotel may be a member of a nationwide chain).

In a particular embodiment, reservation EF 1618 comprises a plurality of records having the structure shown in Table 31 below. In general, this EF may be used to store confirmation numbers transmitted to fob 102 when the fob user makes a reservation at a given hotel (designated in the property code field). The date field stores the date on which the confirmation number was dispensed.

TABLE 31

Exemplary reservation EF

| | External format | | Internal format(bytes) | |
|---|---|---|---|---|
| Record description | Size | Type | Size | Type |
| Property Code | 3 | AN | 3 | ASCII |
| Date | 8 | D | 4 | BCD |
| Confirmation Number | 15 | AN | 15 | ASCII |

Preferences EF 1612, in one embodiment, comprises three sets of array preferences. The particular codes used in these arrays are discussed below in conjunction with Table 38.

TABLE 32

Exemplary preferences EF

| | External format | | Internal format(bytes) | |
|---|---|---|---|---|
| Record description | Size | Type | Size | Type |
| Preferences Array (default) | 8 | C | 8 | BIN |
| Preferences Array (number 2) | 8 | C | 8 | BIN |
| Preferences Array (number 3) | 8 | C | 8 | BIN |

Expenses EF 1616, in one embodiment, comprises a list of recent hotel expenses, for example, room costs, dinner expenses, and the like. In a particular embodiment, expenses EF 1616 comprises a plurality of records (for example, fifteen) arranged in a cyclic file structure and comprising the fields shown in Table 33 below. Thus, the fob user may be able to examine and print a list of recently incurred expenses by type (a code fixed by convention), date, amount, and property code.

TABLE 33

Exemplary expenses EF

| | External format | | Internal format(bytes) | |
|---|---|---|---|---|
| Record description | Size | Type | Size | Type |
| Type | 1 | C | 1 | ASCII |
| Date | 8 | D | 4 | BCD |
| Property Code | 3 | AN | 3 | ASCII |
| Amount | 7 | N | 3 | BIN |

Key-of-the-room EF 1610, in one embodiment, comprises electronic key values that can be used in conjunction with RFID readers to provide access to particular hotel rooms. In a particular embodiment, key-of-the-room EF 1610 comprises a plurality of alphanumeric key values as shown in Table 34 below.

TABLE 34

Exemplary key-of-the-room EF

| | External format | | Internal format(bytes) | |
|---|---|---|---|---|
| Record description | Size | Type | Size | Type |
| Key value | 40 | AN | 40 | BIN |

Stayer ID EF 1606, in one embodiment, comprises frequent stayer data for a particular hotel chain. In a particular embodiment, Stayer ID EF 1606 comprises frequent stayer information as shown in Table 35 below.

TABLE 35

Exemplary stayer ID EF

| Record description | External format | | Internal format(bytes) | |
|---|---|---|---|---|
| | Size | Type | Size | Type |
| Frequent stayer number | 19 | AN | 19 | ASCII |
| Frequent Stayer Level Code | 1 | AN | 1 | ASCII |
| Frequent Stayer Level Expiration Date | 6 | YYYYMM | 3 | BCD |
| CDP | 10 | AN | 10 | ASCII |
| Event Counter | 3 | N | 1 | BIN |
| Hotel Frequent Stayer PIN | 8 | AN | 8 | BIN |

Preferences EF 1604, in one embodiment, comprises three sets of array preferences as shown in Table 36. The particular codes used in these arrays are discussed below in conjunction with Table 38.

TABLE 36

Exemplary preferences EF

| Record description | External format | | Internal format(bytes) | |
|---|---|---|---|---|
| | Size | Type | Size | Type |
| Preferences Array (default) | 8 | C | 8 | BIN |
| Preferences Array (number 2) | 8 | C | 8 | BIN |
| Preferences Array (number 3) | 8 | C | 8 | BIN |

Property DFs 1603(*a*), 1603(*b*), etc., are used in cases where the partnering hotel may be not part of a major chain, or when the hotel chooses to employ its own data set independent of its affiliation. In one embodiment, these property DFs are identical in structure to hotel chain DFs 1602, except that much of the frequent stayer ID information may be removed. More specifically, a typical property DF 1603 comprises a preferences EF 1638 identical to preferences 1604 described above, along with a stayer ID EF 1634 which includes only the CDP, event counter, and hotel frequent stayer PIN fields described in conjunction with Table 33 above. Alternatively, a particular hotel chain or property might choose to implement a different file structure than that described above.

As mentioned briefly above, a preferred embodiment may be configured such that preferences are located in several files distributed throughout fob 102; i.e., in preferences EF 1114, airline preferences EF 1416, hotel preferences EF 1612 and 1604, and car preferences EF 1505. This allows apparently conflicting preferences to coexist within the fob depending on context. For example, it may be possible to opt for non-smoking in the fob user ID application while choosing the smoking option within the hotel application. In the case of conflict, preferences are read from the top level to the bottom level, and each level supersedes the previous one.

An exemplary set of codification rules are set forth in Table 37 below:

TABLE 37

Exemplary Preferences Code Ranges

| 0 | 49 | General purpose (Fob user ID 1006) |
| 50 | 99 | Hotel application 1012 |
| 100 | 149 | Rental car application 1014 |

TABLE 37-continued

Exemplary Preferences Code Ranges

| 150 | 199 | Airline application 1010 |
| 200 | 255 | Other |

More specifically, in a preferred exemplary embodiment, preference flags are coded as set forth in Table 38 below.

TABLE 38

Exemplary preference codes

| Preference | Code (decimal) |
|---|---|
| GENERAL PURPOSE | |
| Smoking | 00 |
| Non-smoking | 01 |
| Home as preferred address | 02 |
| Work as preferred address | 03 |
| Handicapped | 04 |
| Home as preferred e-mail address | 05 |
| Work as preferred e-mail address | 06 |
| HOTEL PREFERENCES | |
| King-size bed | 50 |
| Queen-size bed | 51 |
| Double bed | 52 |
| High floor room | 53 |
| Low floor room | 54 |
| Near elevator room | 55 |
| Away from elevator room | 56 |
| RENTAL CAR PREFERENCES | |
| Compact car | 100 |
| Standard car | 101 |
| Mid-size car | 102 |
| Luxury car | 103 |
| AIRLINE PREFERENCES | |
| Window seat preferred | 150 |
| Aisle seat preferred | 151 |
| Low calorie | 152 |
| Vegetarian | 153 |
| Diabetic | 154 |
| Low sodium | 155 |
| Kosher | 156 |

In the context of fob transactions, data security has five primary dimensions: 1) data confidentiality, 2) data integrity, 3) access control, 4) authentication, and 5) non-repudiation. Each of these dimensions may be addressed through a variety of security mechanisms. Data confidentiality, which deals with keeping information secret (i.e., unreadable to those without access to a key), may be substantially ensured using encryption technology. Data integrity (and data source verification) focuses on ensuring that data remains unchanged during transfer, and typically employs message authentication techniques. Access control involves fob user verification and other requirements necessary in order for a party to read or update a particular file. Authentication involves ensuring that the fob and/or the external device may be what it purports to be, and non-repudiation deals with the related task of ensuring that the source of the data or message may be authentic, i.e., that a consumer may not repudiate a transaction by claiming that it was "signed" by an unauthorized party.

Authentication may be, in one embodiment, performed using a "challenge/response" algorithm. In general, authentication through a challenge/response system involves: 1) generation of a random number by a first party; 2) transmission of the random number to a second party (the "challenge", 3) encryption of the random number by the second party in accordance with a key known to both parties, 4) transmission of the encrypted random number to the first party (the "response"), 5) encryption of the random number by the first party, and 6) comparison by the first party of the two resulting numbers. In the case where the two numbers match, authentication may be successful; if not, the authentication may be unsuccessful. Note that authentication can work both ways: the external world might request authentication of a fob (internal authentication), and a fob might request authentication of the external world (external authentication). A more detailed account of a preferred challenge/response algorithm can be found in the IBM MFC specification.

In a preferred embodiment, the DES algorithm (Data Encryption Standard) may be employed for the various security functions; however, it will be appreciated that any number of other symmetrical or asymmetrical techniques may be used in the context of the present invention. More particularly, there are two general categories of encryption algorithms: symmetric and asymmetric. Symmetric algorithms use the same key for encryption and decryption, for example, DEA (data encryption algorithm) which uses a 56-bit key to encrypt 64-bit blocks of data. Asymmetric algorithms, in contrast, use two different keys: one secret key and one public key. The RSA algorithm, for example, uses two such keys and exploits the computational complexity of factoring very large prime numbers. Additional information these and other cryptographic principles can be found in a number of standard texts, for example: Seberry & Pieprzyk, "Cryptography: An Introduction to Computer Security" (1989); Rhee, "Cryptography and Secure Communications" (1994); Stinson, "Cryptography: Theory and Practice" (1995); "Contemporary Cryptography: The Science of Information Integrity" (1992); and Schneier, "Applied Cryptography" (2d ed. 1996), the contents of which are hereby incorporated by reference.

Access control may be suitably provided by including access conditions within the header of each EF and DF. This prevents a particular operation (e.g., reading or updating) from being performed on a file unless the required access conditions have been fulfilled. Many different access conditions are appropriate in a fob context. For example, the fob might require fob user verification (i.e., request that the fob user enter a PIN) before a file operation may be allowed. Similarly, internal and/or external authentication as described above might be required.

Another important access condition (referred to herein as the SIGN condition) corresponds to the case where a particular file may be "protected" and where updating of a record requires "signing" of the data using a message authentication code (MAC). A MAC can be thought of as a form of electronic seal used to authenticate the content of the message. In a paradigmatic signing procedure, a shortened, encrypted representation of the message (the MAC) may be created using a message authentication algorithm (MAA) in conjunction with a key known to both the fob and external device. The MAC may be then appended onto the message and sent to the fob (or external device, depending on context), and the fob itself generates a MAC based on the received message and the known key. The fob then compares the received MAC with the its own internally-generated MAC. If either the message or MAC was altered during transmission, or the sending party did not use the correct key, then the two MACs will not match, and the access condition will not be fulfilled. If the two MACs correspond, then the access condition may be fulfilled, and the particular file operation can proceed.

A MAC may be generated using a variety of MAAs, for example, the ANSI X9.9 method using an eight-byte key, or the ANSI X9.19 method using a sixteen-byte key. Furthermore, the actual key may be "diversified" through encryption with a random number or other appropriate value. These and other details regarding MAC generation can be found in the references cited above as well as the IBM MFC specification.

Two other important access conditions are the NEVER and FREE conditions. The NEVER condition corresponds to the case where a certain file operation (typically updating) may be never allowed. The FREE condition, on the other hand, corresponds to the case where either updating or reading a file record may be always allowed, without any additional preconditions for access.

In contrast to the MAC techniques discussed briefly above, non-repudiation may be necessarily performed using asymmetrical techniques. That is, as symmetrical techniques such as MAC "sealing" use a key known to more than one party, such techniques can not be used by a third party to ascertain whether the source of the message may be correct. Thus, non-repudiation typically employs a public key encryption scheme (e.g., the Zimmerman's PGP system), wherein the sender uses a secret key to "sign" the message, and the receiving party uses the corresponding public key to authenticate the signature. In the context of the present invention, this function may be suitably performed by allocating an EF for public and secret key rings, which are well known in the art, along with suitable encryption software resident in the fob for assembling the signed message.

Having thus given a brief overview of typical fob security procedures, an exemplary set of access conditions may be set forth below in Table 39. In this regard, the various access conditions for each EF are tabulated with regard to whether the file may be being read or updated. In each case, the access condition (FREE, SIGN, etc.), key "owner" (issuer, partner, user, etc.), and key name are listed. In this regard, it will be appreciated that the key name may be arbitrary, and may be listed here for the sake of completeness.

TABLE 39

| | Exemplary access conditions | | | | | |
|---|---|---|---|---|---|---|
| | READING | | | UPDATING | | |
| | Access condition | Owner | Key | Access condition | Owner | Key |
| MF | | | | | | |
| DF Fob user ID 406 | | | | | | |
| DF User_ID 502 | | | | | | |
| EF ID 504 | FREE | | | SIGN | ISSUER | KEY1 |
| EF Home 506 | FREE | | | SIGN | ISSUER | KEY1 |

TABLE 39-continued

Exemplary access conditions

| | READING | | | UPDATING | | |
|---|---|---|---|---|---|---|
| | Access condition | Owner | Key | Access condition | Owner | Key |
| EF Business 508 | FREE | | | SIGN | ISSUER | KEY1 |
| EF Preferences 514 | FREE | | | SIGN | ISSUER | KEY1 |
| EF Passport 516 | FREE | | | SIGN | ISSUER | KEY1 |
| EF Biometrics 522 | FREE | | | SIGN | ISSUER | KEY1 |
| EF Driver 518 | FREE | | | SIGN | ISSUER | KEY1 |
| DF Miscellaneous | | | | | | |
| EF Payment account 510 | FREE | | | SIGN | ISSUER | KEY1 |
| EF Sequence 512 | FREE | | | FREE | | |
| EF Fob Number 526 | FREE | | | SIGN | ISSUER | KEY1 |
| DF Payment System 408 | | | | | | |
| DF Issuer 1302 | | | | | | |
| EF Pay1 1304 | FREE | | | FREE | | |
| DF Airline 410 | | | | | | |
| DF Common 1402 | | | | | | |
| EF Passenger 1406 | FREE | | | SIGN | ISSUER | KEY2 |
| EF Frequent flier 1408 | FREE | | | SIGN | ISSUER | KEY2 |
| EF IET 1410 | FREE | | | FREE | | |
| EF Boarding 1412 | FREE | | | FREE | | |
| EF Biometric 1414 | FREE | | | FREE | | |
| DF Issuer 1404 | | | | | | |
| EF Preferences 1416 | FREE | | | SIGN | ISSUER | KEY2 |
| EF PIN 1418 | FREE | | | SIGN | ISSUER | KEY2 |
| EF Issuance 1420 | FREE | | | SIGN | ISSUER | KEY2 |
| DF Rental car 414 | | | | | | |
| DF Common 1502 | | | | | | |
| EF Preferences 1505 | FREE | | | USER | IDENT | PIN |
| DF Rental_car 1503 | | | | | | |
| EF Rental_car_ID 1507 | FREE | | | SIGN | RENTCAR | KEY6 |
| EF Reservation 1509 | FREE | | | FREE | | |
| EF Expenses 1511 | FREE | | | SIGN (append) | RENTCAR (append) | KEY6 (append) |
| | | | | IDENT (erase) | USER (erase) | PIN (erase) |
| DF Hotel system 412 | | | | | | |
| DF Common 1614 | | | | | | |
| EF Reservation 1618 | FREE | | | FREE | | |
| EF Expenses 1616 | FREE | | | FREE (append) | USER (erase) | PIN (erase) |
| | | | | IDENT (erase) | | |
| EF Key-of-the-room 1610 | FREE | | | FREE | | |
| EF Preferences 1612 | FREE | | | SIGN | ISSUER | KEY1 |
| DF Hotel_chain 1602 | | | | | | |
| EF Preferences 1604 | FREE | | | SIGN | ISSUER | KEY1 |
| EF Stayer ID 1606 | FREE | | | SIGN | HOTEL | KEY5 |

Having thus given a detailed description of an exemplary fob 102 and a preferred data structure 1000, the various details related to transactions involving fob 102 will now be described. In general, a typical fob session involves: (1) activation of the RFID reader; (2) Information exchange between fob and host; and, at the conclusion of a session, (3) deactivation of RFID reader.

First, fob 102 communicates with RFID reader 104 provided at POS device 110, and suitable communications are made between transponder 114 on fob 102 and RFID reader 104 according to the methods described herein.

In the context of the present invention, command classes and instructions are provided for 1) working with application data (i.e., files stored within the various applications), 2) ensuring data security, 3) fob management, and 4) performing miscellaneous functions.

Application data commands are suitably directed at selecting, reading, and updating individual records or groups of records within files. Security commands suitably include commands for performing the challenge/response authentication process, generating random numbers, loading or updating cryptographic keys, and changing and verifying the fob user verification codes (e.g., PIN numbers). Fob management commands suitably include commands which allow for the creation and deletion of directories (DFs) and elementary files (EFs). Miscellaneous commands are suitably provided for modifying the baud rate and reading various fob statistics (e.g., data logged during production of the fob.) It will be appreciated that many different command sets could be designed for implementing these basic functions.

Referring again to FIG. 17, POS device 110, in one embodiment, comprises software which provides a user interface (for example, a graphical user interface) and may be capable of executing the appropriate commands in accordance with the particular transaction being effected. For example, consider the case where a fob user wishes to add a preference in car preferences EF 1505 within rental car application 1014 (shown in FIG. 15). In this instance, a fob user would locate a convenient POS device 110 (for example, a stand-alone kiosk in a mall) and use fob 102 to communicate with provided RFID reader 104 in order to initiate a transaction. After mutual authentication between fob 102 and the RFID reader has taken place, and after the fob user has been properly authenticated (i.e., the correct access conditions for updating car preferences EF 1505 have been fulfilled), the application program at POS device 110 queries the user with a choice of preference codes through customer interface 118 (for example, those listed in Table 39 above). The user then indicates a choice through textual or graphical means, and the appropriate value may be sent to fob 102 by the application program as part of a command string. This value may then be sent to the appropriate partnering organization 1706 (i.e., a rental car partner) and issuer system 1704 over network 136, 112 to be stored in their respective databases 1712 and 1714. Alternatively, this data may be sent later as part of a fob/database synchronization procedure, e.g., when the original transaction proceeds off-line.

Consider, as another example, the typical hotel transaction. As detailed above, the fob user uses fob 102 to communicate with RFID reader 104 deployed at a suitable POS device 110. After appropriate initialization procedures take place, the fob user may be presented, through the use of a graphical user interface, the option to make a hotel reservation. Upon choosing this option, the software may interrogate the hotel preferences field in preferred programs EF 1128 in fob user ID application 1006 and display these hotels first within the list of possible choices.

After the fob user selects a specific hotel property, the software contacts the appropriate partner 1706 over network 136, 112 and requests a hotel room for a particular set of dates. This step might involve an interrogation of the various files within hotel system application 1012 to which the particular hotel has access (i.e., a hotel chain DF 1602 or property DF 1603), or this step may be deferred until check-in (as described below).

Once a reservation has been made, the associated confirmation number supplied by the hotel may be downloaded into the confirmation number field in reservation EF 1618 along with the date and the property code of the hotel. This step might require the fob user to transmit appropriate credit card account information, which may be suitably retrieved from pay1 EF 1304.

Upon arrival at the hotel, the fob user may use fob 102 to access a kiosk or other convenient POS provided for check-in. Thus, check-in may take place unassisted by hotel personnel and/or may involve a more traditional person-to-person interaction where fob 102 may be used primarily to streamline the check-in process initiated by personnel at the front desk.

At check-in, the confirmation number information may be retrieved from reservation EF 1618., and a particular room may be assigned (if not assigned previously). This step will typically involve retrieving, from the appropriate preference file (i.e., preferences EF 1604 or 1612), a list of preferences regarding bed size, room type, and the like. This list may be matched against the hotel's database of available rooms, thereby helping to streamline the room assignment process.

Once a room is assigned, a digital key corresponding to the assigned room (e.g., a numeric value or alphanumeric string) may be stored in key-of-the-room EF 1610. RFID readers may then be employed as part of the door lock apparatus for each room, which are configured to open only upon receiving the correct key.

At check-out time, payment may take place using payment account information stored in Payment account EF 1110 and pay1 EF 1304. Again, a suitable fob reader (i.e., RFID reader 104 configured at POS device 110), may be provided in any location convenient for check out, e.g., the hotel lobby or within the individual hotel rooms them-selves. The fob user may then acquire frequent stayer points, which would involve updating one of the stayer ID EFs 1606 (or 1636). During the course of his stay at the hotel, the fob user may have incurred any number of expenses related to room-service, on-site dining, film viewing, and the like. These expenses, or a subset thereof, may be conveniently downloaded into expenses EF 1616 for later retrieval, printout, or archiving.

Use of fob 102 in a rental car context would necessarily involve many of the same steps described above. The task of assigning a car would involve retrieving car preferences stored within preferences EF 1505 and comparing them to a database of available automobiles. Upon returning the automobile, the fob user might then be awarded frequent rental points (through update of frequent renter EF 1507), and an expense record might be stored within expenses EF 1511.

In the airline context, fob 102 could be used to make reservations, record preferences, and provide a payment means as described above. In addition, electronic tickets may be downloaded (EF IET 1410), and boarding information may be supplied via boarding EF 1412. Frequent flyer EF 1408 may then be used to update the fob user's frequent flyer miles.

While the example transactions set forth above are described in general terms, the particular nature of data flow to and from the appropriate database locations within the fob will be apparent to those skilled in the art.

Moreover, although the inventions set forth herein have been described in conjunction with the appended drawing figures, those skilled in the art will appreciate that the scope of the invention may be not so limited. For example, although the preferred embodiment of the invention may be discussed in the context of a standard fob with external contacts, it will be appreciated that virtually any portable memory device suitably configured may be utilized to practice this invention, for example, smart cards, optical cards, minicards, "supersmart" cards, and the like. Hence, various modifications in the design and arrangement of the components and steps discussed herein may be made without departing from the scope of the invention as set forth in the appended claims. For a detailed explanation of storing travel-related data on a smartcard in accordance with the present invention, see U.S. Pat. No. 6,101,477, issued Aug. 8, 2000, entitled "A SYSTEM AND METHODS FOR A TRAVEL-RELATED MULTI-FUNCTION SMARTCARD," incorporated herein by reference.

The invention claimed is:

1. A transponder communicatively coupled to a transponder-reader to perform a transaction, said transponder comprising:
    a database that stores travel-related information and is communicatively coupled to said transponder-reader;
    wherein said travel-related information comprises:

a transponder user identification application and a second application that stores travel-related information of a transponder user; said second application comprising a common file structure and a partner file structure, wherein said partner file structure provides write access to a field within said partner file structure for a first partnering organization and denies write access to said field for a second partnering organization, and wherein said common file structure provides write access for both said first and second partners to at least one field in said common file structure.

2. A transponder in accordance with claim 1, wherein said second application comprises at least one of a payment system application, an airline application, a hotel application, a rental car application, an activity application, a transportation application and a restaurant application.

3. The transponder of claim 1, wherein said second application comprises a payment system application, and wherein said payment system application is configured to store an account number and an expiration date associated with a payment account.

4. The transponder of claim 1, wherein said second application comprises an airline application, and wherein said airline application is configured to store an electronic ticket.

5. The transponder of claim 1, wherein said second application comprises a hotel application, and wherein said hotel application is configured to store data associated with a hotel reservation.

6. The transponder of claim 1, wherein said second application comprises a rental car application, and wherein said rental car application is configured to store data associated with a car preference.

7. The transponder of claim 1, wherein said transponder user identification application comprises an application configured to store indicia of said transponder user's identity, and wherein said indicia of said transponder user's identity includes a name and an address.

8. The transponder of claim 1, wherein said second application comprises an airline application.

9. The transponder of claim 1, wherein said transponder user identification application provides general read access.

* * * * *